United States Patent [19]

Mendrala

[11] Patent Number: 4,553,176
[45] Date of Patent: Nov. 12, 1985

[54] VIDEO RECORDING AND FILM PRINTING SYSTEM QUALITY-COMPATIBLE WITH WIDESCREEN CINEMA

[76] Inventor: James A. Mendrala, 1048 Hollister St., San Fernando, Calif. 91340

[21] Appl. No.: 336,452

[22] Filed: Dec. 31, 1981

[51] Int. Cl.⁴ ............................................. H04N 9/495
[52] U.S. Cl. ..................................................... 358/334
[58] Field of Search ................................ 358/332, 334

[56] References Cited

U.S. PATENT DOCUMENTS 3,752,906  8/1973  Lowry ................................. 358/334
3,852,520  12/1974  Bruch ................................. 358/334

*Primary Examiner*—Richard Murray
*Attorney, Agent, or Firm*—Romney Golant Martin & Ashen

[57] ABSTRACT

Red, green, and blue signals from a video camera are separately recorded. In preparation for this, the three signals (advantageously generated at twenty-four frames per second and more than 655 noninterlaced raster lines per frame) are first applied to three separate low-pass filters, which pass up to at least eight and preferably more than fourteen megahertz. The filter output signals then frequency modulate three separate carriers, each of frequency at least two megahertz greater than the filter passband. The three frequency-modulated carriers are simultaneously recorded on parallel tracks. The three separately recorded FM carriers are subject to editing, traveling-matte combination with other triplets of carriers, and other special effects—while preserving wideband detail. The final three-track recording is used to generate a widescreen color film negative: The tracks can be conformed into a single monochrome video track, with each set of three color frames placed in sequence. This track is used in an electron-beam recorder to make a monochrome film, in turn used to create a color film negative or positive—by the dye-transfer process, or by exposing color negative stock to primary color lights through the monochrome frames. Alternatively the three-color film can be prepared directly from the three-track video tape by use of a three-light-beam apparatus that scans the film under control of the video recordings—preferably scanning only across the film, while the film is continuously advanced. Resulting film resolution can exceed that of conventional widescreen film.

32 Claims, 28 Drawing Figures

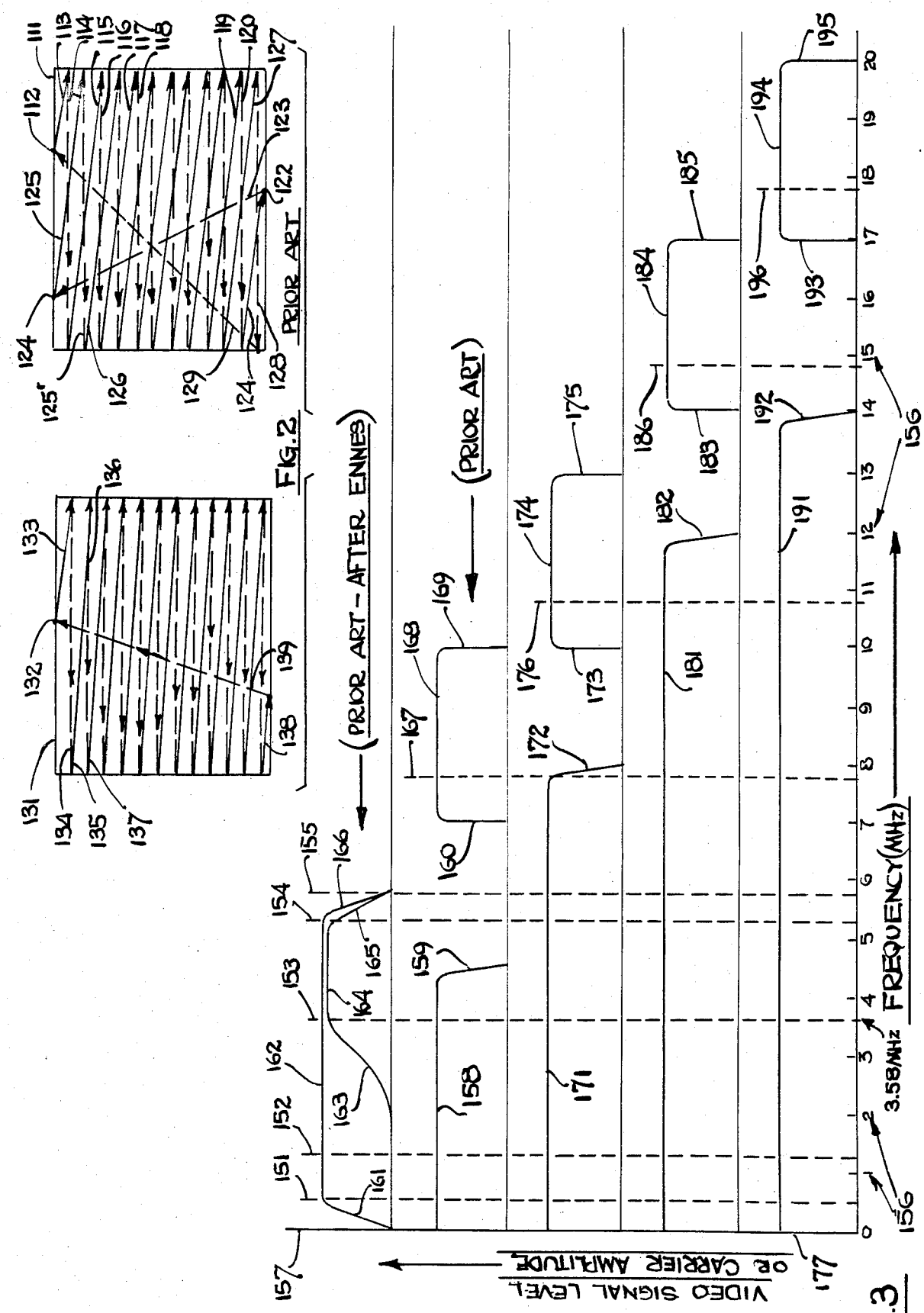

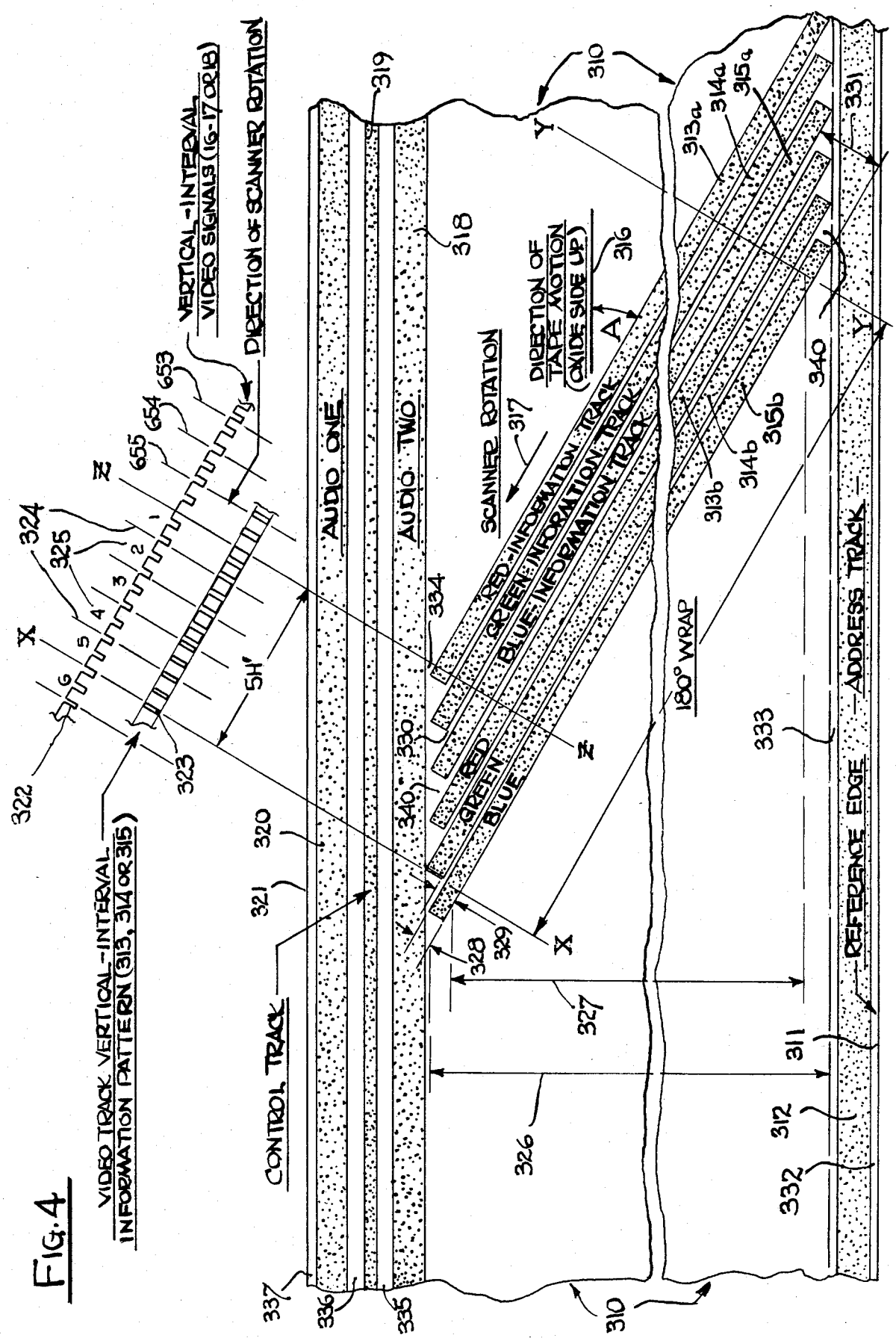

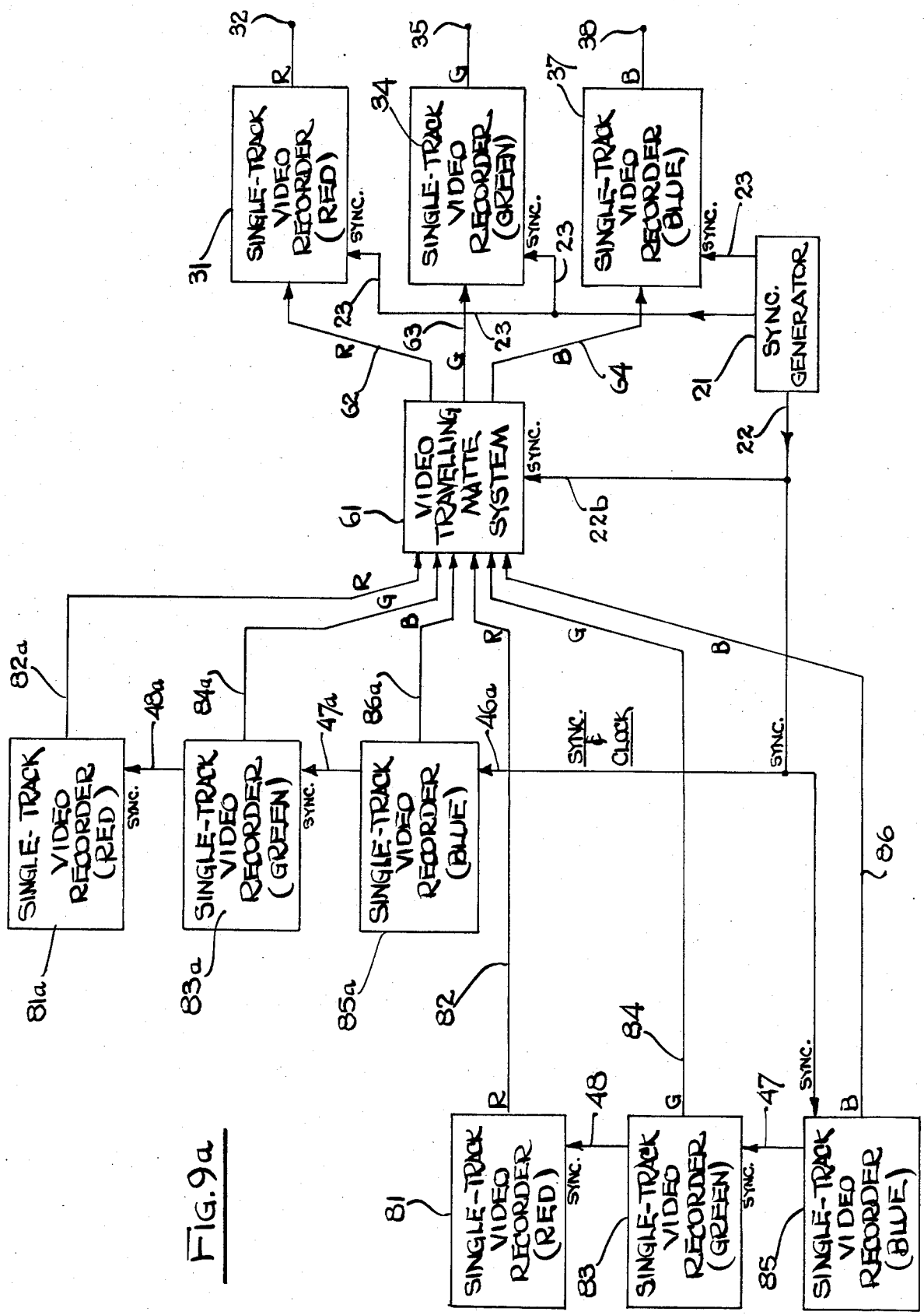

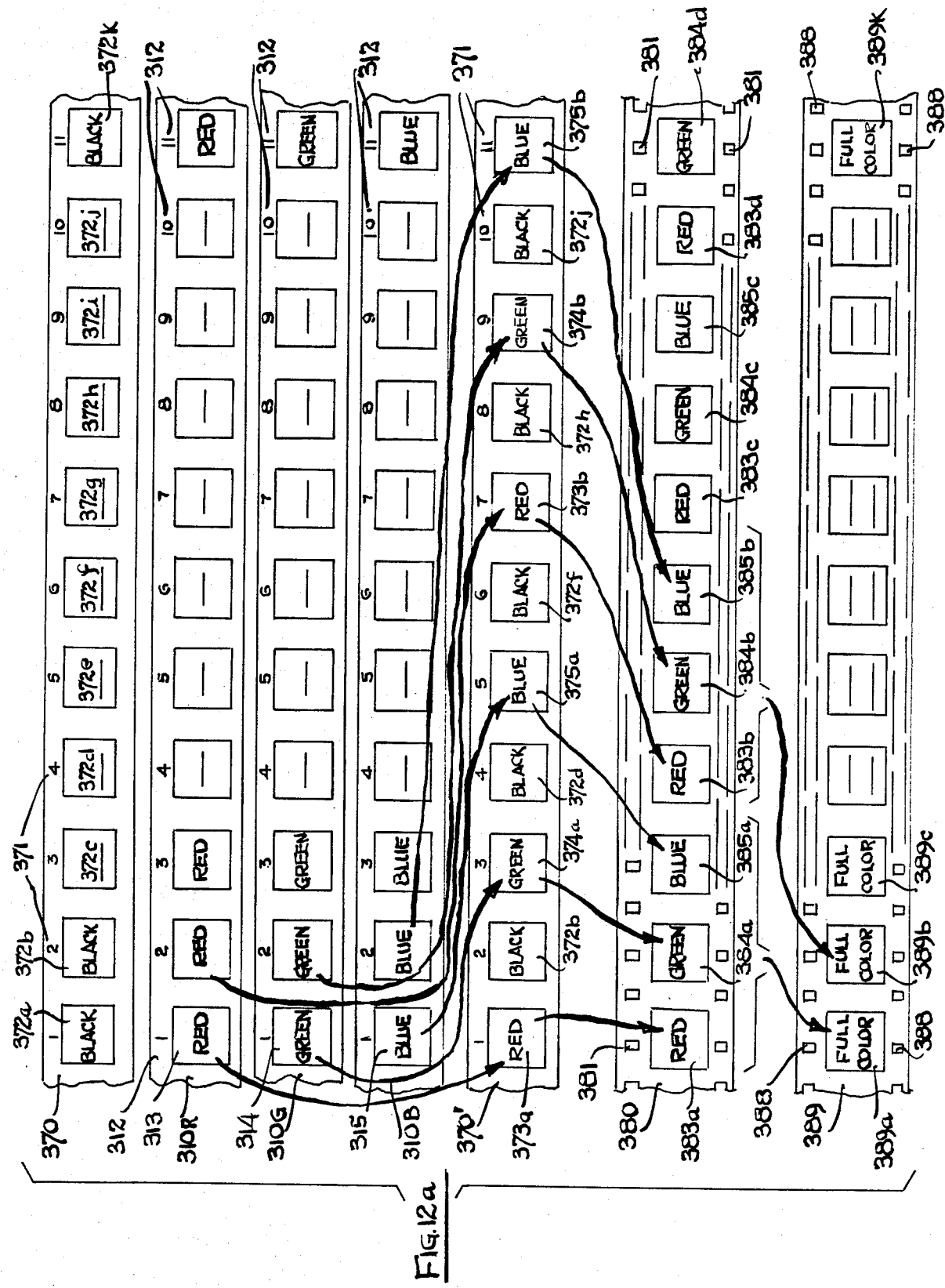

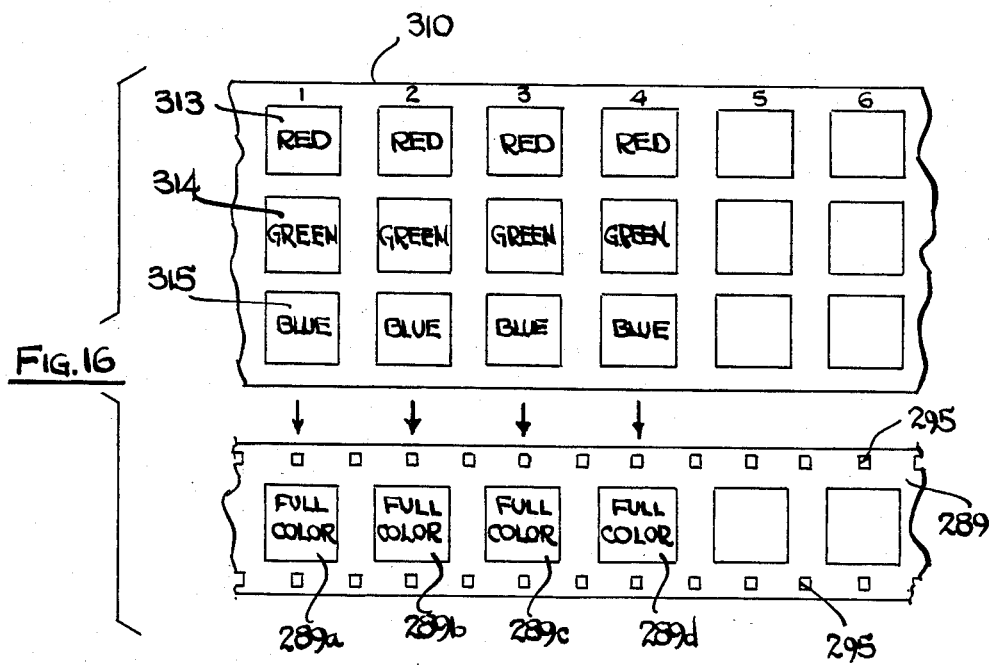

VIDEO RECORDING AND FILM PRINTING SYSTEM QUALITY-COMPATIBLE WITH WIDESCREEN CINEMA

BACKGROUND

1. Field of the Invention

This invention relates generally to apparatus, methods, and articles used in recording visual information, either for television broadcast or for widescreen theatre exhibition. In the latter case, the exhibition may be by video projection or by transfer to film and use of conventional film projectors.

More particularly, the invention is of apparatus for making video recordings whose information detail corresponds to visual resolution exceeding that of conventional widescreen film as typically exhibited in theaters. The invention further provides apparatus for using such recordings to generate projection film whose resolution betters that of conventional widescreen film typically exhibited. The invention additionally provides methods for making such video recordings and for using such recordings to generate such projection film; and the invention encompasses recordings and film made by these methods.

In the short run the principal application for the invention lies in the preparation of widescreen cinema film, because of the large number of film projectors now in commercial theater use; however, in the longer term the greater volume of application may be expected to be in theater and closed-circuit video projection units, with some application to video broadcast, as will be explained below.

2. Prior Art a. UNTAPPED POTENTIAL OF VIDEO CINEMATOGRAPHY—The most pressing demand for development of video systems that are quality-compatible with widescreen cinematographic film arises in the area of special effects. "Matte" technology—the process for superimposing portions of two or more moving picture scenes—is extremely cumbersome and slow in the film medium, but quite sophisticated and convenient in the video medium.

U.S. Pat. No. 4,109,278 to Mendrala and Peterson describes a video traveling matte system which eliminates telltale outlines between the different components of a matte composite, while importing even the shadows from the "foreground" image into the "background" image. Such a composite image can be viewed in "real time" while the action is being shot and recorded. The director can be viewing the composite image while giving instructions to the actors and equipment operators involved in the various images. This technique minimizes or eliminates the need for retakes arising from misalignments of the component images. Film matte techniques, on the other hand, require several film-development and other processing steps between the camera and the first viewing of the composite. A director must therefore wait several hours at a very minimum, and more typically one or more days, to see whether the composite "looks right" or whether it must be set up and shot all over again.

The term "special effects," however, may suggest incorrectly an area of use that is overly limited, for the term is usually heard in connection with, for example, showing a number of moving and talking human figures against an intrinsically fictitious background. The background may, for instance, be one that is provided by a separate shot of a model ship burning or skyscraper toppling, or a small animal made to look large, and so forth. Other examples of stereotypical special effects include people appearing to fly (without support) over a city, or to walk into or upon other people (made to appear much larger).

These uses occur, of course, only in a relatively small number of films, namely those which call for happenings that are essentially impossible in actuality. A much broader category of films, however, could be made by using matte techniques at a small fraction of the cost and in a small fraction of the time associated with conventional techniques. These uses are related to portrayal of happenings that are in actuality possible, but "merely" very inconvenient and expensive.

For example, a film that involves a sizable cast and crew on location in Africa, or a remote Pacific island, or a major European city, can involve monumental problems of logistics—housing, feeding, and transportation alone, plus assembly of set-building personnel and their equipment and materials, if structures are required. Nightmarish complexities are introduced when key members of the cast become ill or other unforeseen contingencies arise. All of these factors contribute heavily to the multimillion-dollar cost of typical major cinema productions.

These difficult factors can be virtually eliminated by use of matte techniques: a small crew makes background scenes on location, using locally available "extras" if required and in some cases shooting merely still views; a special-effects crew at the home studio builds models of structures, if necessary, for superposition on these scenes; and when these preparations are made the cast performs its action and recites its lines before a foreground camera while the director watches the fully assembled scene on a monitor. Even if the background scenes turn out to be unsatisfactory, the investment in them is relatively minimal and they can be reshot by a small camera crew later.

The result might be, for example, several key actors running along a beach on a coral lagoon, with breakers rolling in, with an elaborate temple (or a descending dirigible) on the shore in the background —and crowds of native extras running up the beach behind the lead actors.

It would be virtually unthinkable to make such scenes by cinematographic film matte techniques, because of the difficulty of predicting that the action will "assemble" well into the background—and also because of the extreme difficulty of assembling more than two or three elements (i.e., separately-shot scene components) satisfactorily. By video techniques success is virtually guaranteed, and as many as eight elements can be assembled without significant degradation of image quality.

b. REASONS FOR FAILURE TO TAP THE POTENTIAL—Despite these clear advantages, video cameras are almost completely unused in the preparation of cinema productions—outside the efforts, considered highly experimental and radical, of one major director to use video cameras and monitors for rehearsals, and in parallel with film cameras for the final takes and for editing purposes. In this latter system the film seems almost superfluous, but it is retained as the final production medium. The sole reason for all of the waste motion that is still retained in shooting and processing film, in "location" productions as well as special-effects work, is the relatively poor image quality, heretofore, of the video medium—or, as it is sometimes called, electronic photography.

The reasons and rationales for these conventional image-quality limitations will now be discussed in considerable detail. It is important to an appreciation of my invention to understand how thoroughly the conventional limitations are interwoven with each other, and with the broadcast-medium constraints, and how well entrenched they are.

Although film does of course have grain, it is much finer and less conspicuous than the poor resolution that is apparent even on a contemporary twenty-one-inch home video screen. This poor resolution, or image definition, arises from two phenomena:

(1) in the vertical direction, the image elements are constructed of discrete horizontal "scan lines" or "raster lines," of which there are an inadequate number;

(2) in the horizontal direction, although the image is reproduced on a continuous basis (there are no discrete image elements as such, above the molecular level), image detail nevertheless is limited by the information-gathering capacity of the video electronics, which is constrained by the signal bandwidth.

To minimize poor horizontal resolution, "image-enhancement" techniques are used—but such techniques themselves produce peculiarities which are evident when the image is viewed relatively closely. In particular, image enhancement often produces a cartoon-like artificial "outlining" effect.

Perhaps more significant than the poor resolution itself is the familiarly "electronic" way in which dots or lines in the video image seem to migrate or "crawl," sometimes almost like worms making their way along and among the raster lines, in the present state of the video art. Yet another familiar "electronic" defect is the appearance of multiple edges—a fringing or feathering effect—along what should be sharp lines.

(In nontechnical terms, these defects arise as follows. "Crawling dots" are produced by imperfections in the separation of color information from black-and-white information, in the video display device. Crawling "worms," or moire patterns, result from imperfections in the isolation of processed signals ready for recording, in a video recorder, from the incoming video signals. Fringing is sometimes caused by an electronic "ringing" effect in the circuits [delay lines] which match the timing of the black-and-white information to the timing of the color information.)

These characteristics are evident particularly in home video receivers, particularly in prerecorded broadcasts, and particularly in matte images, but somewhat less conspicuously even in single, unitary images, live from the camera and viewed on the best studio monitors.

Finally, the conventional video technology is saddled unavoidably with very coarse resolution as to the color constituents of the image. It is very appropriate to describe the color components of the resultant image as "broad brush"—almost like painting in watercolors with a broad brush the tones needed to make a sharply defined black-and-white photo pass under the description of "color picture."

Several constraints are imposed by the broadcast format and have been unquestioningly accepted as necessary by virtually all workers in video technology. For example, the standard number of raster lines composing each frame, in the United States, is 525. In other countries the number is different, but in every case it is unduly limited for the purposes of obtaining finely resolved detail along the vertical dimension in widescreen cinema.

Furthermore, the number of frames per second, in the United States, is thirty—again, different in other countries, but nowhere in the world equal to the frame rate universally used for widescreen cinema. Cinema film is advanced at twenty-four frames per second (though each frame is flashed twice by projection systems, to avoid visible flicker). This mismatch requires, in the video-to-film transfer process, discarding a fifth of all the video data—an obvious waste of recorded information, at the same time the video-to-film transfer process is starved for image resolution, particularly with respect to the color.

Other format constraints, particularly troublesome ones when some of the most knotty problems of high-image-quality technology are confronted, are the video "interlace" system, and a related phenomenon known as the "phase-advance" color encoding system.

c. INTERLACING, AND PHASE-ADVANCED COLOR—The interlace system involves dividing each frame of (in the United States) 525 raster lines into two "fields" of 262.5 raster lines each. Each of these fields consists of every other line in the image—that is to say, alternate lines. The video camera scans through a complete field of 262.5 lines, while this field is transmitted from the camera (and either recorded or broadcast for viewing); then the camera scans through the next complete field of 262.5 lines, filling in the blank spaces between the lines of the first field. This entire process takes (in the United States) approximately one-thirtieth of a second; thus the individual fields (or "half-frames") are completed in one-sixtieth of a second each.

In the broadcast context this arrangement has various advantages. It produces an effective flicker rate of sixty fields per second, which is fast enough to make effective use of the familiar phenomenon of visual persistence, to blend subsequent images as perceived by the eye and brain; yet it requires forming and transmitting only thirty frames per second. If the thirty frames each second were transmitted as entire frames, not separated into interlaced fields, the flicker would be quite noticeable and objectionable.

Moreover, the eye and brain tend to "integrate" the alternate fields into a single image, alternate fields filling in alternate horizontal raster lines, so that the effective vertical resolution is that of 525 raster lines (except for rapidly moving objects, and particularly those that move vertically); yet only half that number of lines is transmitted in each field. The advantages of this "spatial integration" are so well entrenched in the design philosophy of the video industry that they have been exported from the raster-interlace part of the system to other areas.

In particular, in the United States the standard "NTSC" video system the color signals (to be described in more detail below) are advanced in phase by ninety degrees every field. This arrangement tends to take advantage of spatial integration of the color signal to correct some of the "broad-brush" effect mentioned earlier. Unfortunately this repetitive phase advance introduces fresh problems, which will be described shortly.

The interlaced-field system, as previously noted, aggravates some of the knotty problems of achieving high image quality through electronic photography. As is familiar to television viewers who have watched very-slow-motion "instant replays" of fast action, the image sharpness in very-slow-motion replays is very poor relative to that of the action shown at actual speed. The reason is that in very-slow-motion "instant replays" the action must be shown one field at a time, and there are only half as many raster lines per field as there are per full frame. In other words, the advantage of spatial integration is lost when the images must be shown field-wise rather than framewise.

Yet it is absolutely necessary to show the fields one at a time, for precisely the reason that they represent different time intervals. This statement bears some explanation. If successive fields were shown in very slow motion but electronically assembled together, as the eye assembles them when they are shown at actual speed, each moving object would have two distinctly different (though overlapping) positions. A rapidly moving runner, for instance, or a traveling ball, would have two different "sub-images," shifted along the direction of motion, as traced out by the alternate interlaced raster lines. (This phenomenon will be described in a more graphic way shortly.) Such an image would be badly jumbled and confusing.

For cinematographic use it is necessary to be able to slow down action, or even freeze it, without losing either resolution or the single-image appearance. In film technology this is accomplished by exposing the film at a faster-than-normal frame rate, and playing it back at normal rate, or by repeating a particular frame many times. In video, as will be seen, it may be difficult or impossible to speed up the frame-acquisition rate without sacrificing resolution; however, the playback rate may be controllable in a much more versatile way than for film, provided that one can get around the Hobson's choice of resolution-loss or double-image, which is due to the interlace system.

Moreover, in assembling a cinema production it is often desirable to produce a series of identical frames, by duplicating a particular frame many times. This should be easy to do electronically, but the ninety-degree phase-advance system mentioned above, for color signals, makes it difficult or impossible to splice any field directly after itself—i.e., to replicate any particular frame in self-sequence—without sacrificing the benefits of spatial integration as to the color components of the image. Only every fourth field (every other full frame) can be edited into sequence with any particular field, so the entire editing process (even apart from the desire to replicate a particular field several times in succession) is increased in complexity.

The foregoing discussion of the interlace system will now be rendered more definite by reference to FIG. 2 of the appended drawings. FIG. 2 illustrates, in the right-hand half of the drawing, the pattern of raster lines used in the prior art to create a full image on a screen 111. The prior-art "interlacing" system may be understood by examining closely the pattern of lines in frame 111. As shown there, the deflection system of the electrooptical scanning devices within the camera—essentially duplicated by electrooptical scanning devices within every studio monitor or home video receiver—first makes a complete pass over the image while constructing every other "raster" line (scan line), and then "goes back" and makes a second complete pass over the image while filling in the alternate raster lines missed on the first pass.

More specifically, the scan of frame 111 starts at some point such as 112 at the top of the image, scans along a path 113 to the right side of the image frame, and then returns (without transfering any image information) more swiftly along a path such as 114 to the left side of the image frame. The scan then proceeds along a path 115 to the right side of the frame. It will be noticed that the scan paths (raster lines) 113 and 115 straddle an additional path 125 that has not yet been followed, except to cross over it during the flyback path 114.

Next the scan system traverses another flyback path 116 to the left side of the frame, forms another raster line along a yet lower path 117, flies back along another path 118, and continues in this fashion until the lower portion of the image is reached. Of course the number of raster lines in an actual video system is dozens of times greater than the number illustrated in FIG. 2, which is only intended to exemplify the concepts of the prior-art scanning system (and, in the left side of the drawing, the concepts of the present invention, to be discussed later).

As the scan progression reaches the lower part of the image it traces out a path such as 119 near the lower edge of the frame 111, flies back along a path 120, and then begins a final path 121. This final path ends at 122, in effect defining the lower edge of the image that will be constructed. The process so far has created one video "field." From the end point 122 of this last raster line the scan mechanism follows a path 123 back to the upper edge of the frame 111, where at point 124 a new raster line 125 is begun. This is the first line of the second field.

After following the path 125 for this raster line—which as previously noted lies between the raster lines 113 and 115 of the first field—the scan system deflects the scanning beam back along a path 125′ to the left side of the frame, then creates another raster line 126, and proceeds as before. Now the alternate raster lines skipped in the first field are filled in, eventually reaching the next-to-last raster line 127 in the frame. After flyback along a path 128 just above the bottom of the frame, the scanning beam is returned as along path 129 to point 112, at the top of the image, to begin another field. That field will be substantially identical to the first one that has been described here, as far as the pattern of raster lines is concerned.

The content of the image, however, will of course be different if the objects in the image have moved in the meantime. This new "first" field will contain all the image information that has accumulated since the previous "first" field was scanned. Next will come a new "second" field, containing all the image information that has accumulated since the previous "second" field was scanned. The time interval during which information is accumulated for each "first" field thus overlaps (by half) the time interval during which information is collected for the two adjacent "second" fields.

In this way the prior-art system constructs a half image at each pass from top to bottom of the received image, then proceeding to construct the other half image by means of raster lines that are "interlaced"—i.e., alternated—with the raster lines of the first pass. The two interlaced passes or fields, representing overlapping image-accumulation intervals, have been thus used in every commercial television system, whether broadcast, cable, or closed-circuit, since the earliest days of video technology. The interlace system far antedates the availability of any means for recording video signals; hence every video recorder that has ever appeared in any marketplace has been adapted to record interlaced signals—just as every color video recorder has been adapted to record encoded color (discussed below).

The interlace system is well-ingrained in commercial broadcast technology for good reasons, which have already been briefly outlined. More specifically, the phenomenon of visual persistence—which makes successive images seem to blend together into a simulation of motion—requires a "flicker" (that is, picture-presentation) rate of at least forty to forty-five images per second. Constructing and transmitting that many full frames per second would have required greater bandwidth than would "fit" within the broadcast band to be assigned each station, to achieve moderately acceptable image resolution (detail).

In any event, the designers of early video systems saw a way to get the benefits of sixty-image-per-second "flicker" while completely scanning the image only thirty times per second. The interlace system provides this benefit, and apparently does so satisfactorily for the purposes of home video—with the exception of the very-slow-motion "instant-replay" situations mentioned earlier.

Where an object is proceeding rapidly from right to left across the upper portion of an actual image that is scanned within frame 111, for example, and the object is tall enough to span raster lines 113, 125, 115, 126, and 117, each joint of the object appears as a line in each field—the line swept out by the object point during the image-accumulation interval. The line generated by each object point is shifted in position from each field to the next, but the lines in any two consecutive fields overlap, because of the overlap of time periods during which they are constructed. Accordingly the entire object will appear in two different overlapping positions if the two fields are—for slow-motion purposes—displayed together.

For example, let it be supposed that the object is near the right-hand edge of the frame 111 when raster lines 113, 115 and 117 are formed—so that the image portion constructed by these raster lines includes a "sub-image" of the object near the right-hand edge. This sub-image is blurred in the direction of motion, because it represents all the positions the object has moved through since the last previous scan of these same raster lines. These three raster lines are all formed relatively close together in time, so the general shape of the object is not badly distorted even though it is blurred because it is moving rapidly.

By the time the deflection system traces raster lines 125 and 126, however, about a sixtieth of a second has elapsed, and the object has moved a significant distance toward the left edge of the frame. Raster lines 125 and 126 therefore construct an image portion which includes a second blurred sub-image of the same object—whether the object is a baseball, a broken-field runner (and his several pursuers and defenders), or a moving vehicle. Because of the overlapping lines generated by each point of the moving object, the blurs of the two sub-images overlap.

When the two sub-images are shown at normal field rate, the spatial integration performed by eye and brain causes the sub-images to blend—into a generally lateral blur. The later sub-image is displayed after the earlier sub-image, so all that is lost is the (relatively poor) sharpness in the fleeting images of the speeding object. At normal field rate, in short, the effect is not noticeable.

The system breaks down, however, for slow-motion or stop-action purposes. The two fields cannot be shown assembled into a single frame, in very slow-motion or stop-action situations, although that would be desirable to display a high-resolution image of the slowed or stopped action. The two sub-images of the ball, the runner (and his colleagues), or the vehicle would both be present in the assembled image. The result would be an overlapped-double-exposure effect, in many cases hopelessly jumbled. Consequently the two fields must be shown separately, in slow motion or stop action, and of course when they are shown that way the image detail as seen on the screen is severely degraded.

This limitation may be acceptable in the narrow confines of sports replays, although many viewers would dispute the acceptability even there. Such a limitation is completely unacceptable, however, in the context of cinema special effects. It is also unnecessary in that context, because in cinema the need for flicker rate exceeding forty or fifty "pictures" per second has been solved by a completely different technique—namely, flashing each film frame onto the viewing screen twice.

This "double-flash" cinema solution, on the other hand, is incompatible with video broadcast standards. Absent a video frame-storage device in every video display set, or conversion to much greater bandwidth—either of which solutions would require retrofitting every video receiver in the world—the frame-storage-and-double-display solution is impossible in the established video technology. It would be impossible even if all the video cameras, receivers, monitors, recorders and other devices could be somehow converted out of interlace scanning format. There is no apparent feasible "way out," for broadcast purposes, and broadcast applications have imposed their limitations upon the availability of video technology for cinema and other applications.

Yet another drawback of the interlace system resides in the difficulties of transfering image information from video recordings to projectable film. As will be seen, video recording technology has now progressed to the point of impressing information upon magnetic tape or discs in extremely narrow tracks, that are spaced apart only by the most minute of distances. When two pieces of image information, for two particular very localized adjacent parts of an image (e.g., the top two raster lines of a full frame) are immediately adjacent each other on a recording medium, accurate construction of the two adjacent image parts from the two immediately adjacent pieces of recorded information is difficult, but relatively feasible.

If, however, the information for the top two raster lines is separated by a significant distance in a tape recording—being spaced apart along the length of the tape by the information required to construct the intervening raster lines of the first field, as in conventional video—then accurate assembly of the top two raster lines with respect to each other poses an additional, artificially created, technological challenge. This difficulty is nonexistent or at least unimportant in the context of video-screen display, where it is natural to reassemble the two fields in time sequence. In transfer of image information to film, however, the interlaced-field technique requires that either (1) the film must be held stationary while the entire two-field frame is reconstructed on the film or (2) at least one-half frame must be held in a storage device so that the film can be moved continuously while the exposing beam is moved crosswise of the film, in noninterlaced format.

The first solution has the disadvantage that the deflection system must operate in both orthogonal directions and the film-advance system must provide extremely precise pin-registered framewise positioning—especially in electron-beam recording, where (as will be explained later) three separate film frames, one for each color, must be superposed in accurate register later to obtain a three-color negative or projectable three-color positive. The second solution has the disadvantage of requiring additional storage and logic devices.

In short, the ubiquitous interlace system of the prior art imposes several disadvantages that hamper application of video technology to cinema generally, and cinema special effects particularly.

d. COLOR ENCODING, AND FREQUENCY ALLOCATIONS—In broadcast video, color is "encoded." That is, the color is not transmitted directly in the form of information elements for the three primary colors, but rather in a code form: one piece of information gives the saturation or intensity of color at each moment, and a second piece of information specifies the hue, or dominant color, at each corresponding moment. Moreover, these two color specifications are not transmitted on two completely separate radio-frequency bands. The color is transmitted by amplitude modulation of a separate "subcarrier" from the black-and-white image—but the color subcarrier and the black-and-white carrier share the same, relatively limited, band of frequencies; and to avoid major interference the color subcarrier itself is suppressed, and the frequency spectrum of its sidebands is limited. It is this limitation which causes the "broad-brush" color effect described earlier.

All of this information in the color-encoded signal, as well as the information in the sound carrier, is constrained within a six-megahertz frequency band for each video broadcast channel. In the pre-color era, black-and-white video transmissions used the entire six-megahertz band for luminance and sound. During the development of the various color video systems in the United States and elsewhere in the world, it was decided to maintain the pre-color-era usability of black-and-white television equipment (that is, primarily, home receivers). To accomplish this, the entire six-megahertz band continues to be used for luminance and sound, and the color information is "interleaved" within the fine-detail (i.e., high-frequency) information of the luminance signal (specifically, between harmonics of the raster-line frequency, near the upper end of the six-megahertz band). The "interleaved" color signal is created in such a way that black-and-white receivers are affected as little as possible by the presence of the color information. Unfortunately there is, however, some residual interference between the color information and the black-and-white information: it is mainly this interference that produces the "crawling-dot" effect (in either color or black-and-white pictures, if color has been transmitted) mentioned earlier.

The video signal direct from the sensing circuits in a video camera is directly related to the brightness of light entering the camera from the portion of the object (the "live" image) being scanned. In a color video camera, three separate video signals are produced—one for each of the independent primary colors to which the human eye responds. The three signals are mutually synchronized, and are simultaneous, and they do correspond to the different color constituents of a single image from which they are derived in common. The term "independent" is not to be interpreted as negating these basic interrelationships between the three signals.

The word "independent" is to be understood, however, as meaning that the modulation content, the information content, of each of the three signals does not depend on the modulation content of the other two; and that, rather, the modulation content of each signal stems only from the respective color content of the received image. Thus, for example, the information derived within the camera by electronic scanning of the received image as viewed through a "primary-blue-color"-transmitting optical filter is used to generate a "blue-information" signal; and similarly for the other two primary colors.

It is of course true that the three optical filters used to generate three such "independent" signals have substantial areas of color overlap, so that portions of the image that are colored a certain particular color may in fact "show up" through all three of the filters, to varying extents, and so generate some signal in response in all three video-camera color channels. It is nevertheless customary in describing color phenomena to refer to such image information, and to the corresponding electrical signals, as "independent primary" colors and signals—provided that the filters are chosen as practical approximations to the color sensitivities of the three independent sets of color receptors believed to operate in the human eye.

When the color sensitivities of the three optical filters, chosen in this way, are also roughly matched by the color outputs of phosphors used in video display screens, then from the "viewpoint" of the human observer the independent color receptors of the eye have been, in effect, extended through the video process and exposed to the scene that is before the video camera. (Unfortunately, in conventional video technology this effective "extension" is very imperfect. Certain parts of my invention may be regarded as improving the accuracy of the three-color video "extension" process.)

The three video signals within the camera are "independent" in the sense that they correspond to the independent mechanisms within the human observer for sorting out color information, and in the customary sense that color is therefore a phenomenon measurable in three independent "dimensions" (e.g., red, blue and green).

It is also important to understand the distinction between the high-resolution, true "primary color" video signals that exist only within the video camera, in the conventional system, and the "transmission primary" signals that are derived from the true "primary color" signals before the image leaves the camera. Only the true primary color signals are derived respectively from primary color information, as described in the preceding paragraphs.

In a conventional video camera, the red, green and blue signals are combined in certain specified proportions to form a luminance (black-and-white brightness) signal, usually assigned the algebraic letter Y; and also are used in conjunction with the luminance to generate certain complex color-information signals. In particular, the luminance signal, the red signal, and the blue signal are combined in certain proportions to obtain a variable I, known as the "in-phase" color transmission primary signal, and another variable Q, known as the "quadrature" (ninety-degrees-delayed) color transmission primary signal. The proportions are such that color saturation information is carried as the length of the vector sum of I and Q; and hue is carried as the angle of that same vector sum (relative to a reference zero angle).

These two signals I and Q are used in conventional video technology to amplitude modulate a video "subcarrier." The modulation produces sidebands, which are added to the luminance signal (while the central frequency of the subcarrier itself is discarded). The resulting video compound signal is handled together, as a superimposed unit, throughout the entire video process downstream from the camera head—until the video monitor or home receiver is reached. The combined signal is described conventionally as one in which the color is "encoded" onto or into the luminance signal, by means of the color transmission primary signals I and Q.

The video monitor or receiver decodes the I and Q signals, and then proceeds to reconstruct from them, in combination with the luminance signal Y, a "broadbrush" approximation to the original separate red, green and blue color primary signals originally generated within the camera. The approximation signals obtained by the reconstruction are used to excite the correspondingly colored phosphors on the video screen.

The discussion now returns to the specifics of the three color primary signals within the video camera. If the object is bright, in a particular primary color, at the particular point being scanned, the resulting signal level (voltage or current) for that primary color is high; at dark points the resulting signal is low. If the entire obJect is a uniform grey, or a uniform color, then each of the resulting primary signals is d.c.—that is to say, unmodulated, but of a voltage or current level corresponding to the brightness, in different color constituents, of the particular shade that is before the camera. (This discussion of "d.c." signals of course refers only to the portion of the video waveform which carries image information—not to the complicated pulses, occurring between the raster lines, that convey synchronization and phase-calibration information.)

Most of the time, of course, video cameras are not used to make pictures of uniformly colored fields. There are variations in the object field—the visual field at which the camera is pointed—and these can range from coarse gradations of shading to extremely fine, intricate details of complex objects or patterns.

The primary sensor in a video camera is potentially extremely fast in its response to changes in input brightness—although, as will be seen, in practice some of the potential response speed is discarded because it cannot be used by the other equipment in a conventional video system. The usual sensor is an electron beam that scans a photosensitive surface and varies in current intensity in response to changes in accumulated charge on the photosensitive surface.

The photosensitive surface becomes charged in response to impingement of light, and is discharged—in preparation for further optical signals—by the scanning electron beam. The inherent response speed of such a device is limited primarily by such factors as the internal capacitances within the relatively large vacuum tube that houses the scanning beam. Such capacitances are quite small. Accordingly the current in the electron beam is capable of changing with extreme rapidity when it traverses a very fine pattern of illumination on the photosensitive surface.

Another way of expressing this is to say that the signal from the primary sensor is very "wideband"—that is, it can be conceptualized as made up of many sinusoidal signals whose frequencies extend over an extremely wide band or range of frequencies. When the primary video "level" (current or voltage) changes in response to a very fine, intricate object or pattern, the frequency content of the signal level is extremely high; it can, in fact, contain signal components whose frequency greatly exceeds fifteen or twenty megahertz. Yet, as stated above, when the primary video "level" (current or voltage) is derived in response to a completely uniformly colored object field, the image portion of the signal is d.c. All frequencies between these two extremes are possible in a video sensing tube.

In conventional preparation for broadcasting or recording video signals, the primary color signals are encoded, bandwidth-limited, and applied to modulate at least one locally generated "carrier" signal. The first of these steps, creating the three signals Y, I and Q, has already been described; the other two steps will be briefly explained now.

The two color signals are separately limited in frequency bandwidth, or range, by passing them through two different low-pass filters, respectively. The two filters cut off at about 1.3 and 0.5 megahertz, respectively. As will be seen, all three signals Y, I and Q are further bandwidth-limited in the broadcasting process.

The upper two diagrams in FIG. 3 illustrate the frequency response, or the frequency range, of certain video signals involved in the prior art. All five of the diagrams in FIG. 3 are drawn with reference to the frequency scale 156 which appears across the very bottom of the drawing. The numerical values forming this scale are in megahertz. With respect to the topmost drawing, the frequency values represent frequency above the bottom of an assigned television broadcast channel. With respect to the other four drawings in FIG. 3, the frequency values represent absolute frequency, zero being d.c.

The uncalibrated vertical scale 157 represents carrier amplitude, as a function of frequency, for the amplitude-modulated signals shown in the topmost diagram, and for the four frequency-modulated carrier curves 168, 174, 184 and 194, which appear at the right ends of the lower four diagrams in FIG. 3. The same uncalibrated vertical scale 157 represents video "signal level" (rather than carrier amplitude) for the other four curves 158/159, 171/172, 181/182 and 191/192, at the left ends of the lower four diagrams.

When the immediate objective is to broadcast, rather than record, video information, the luminance signal is used to amplitude modulate the main video carrier. The carrier is a locally generated a.c. signal, 152 in FIG. 3, whose frequency (in the absence of modulation) is 1.25 megahertz above the low end of the frequency band assigned to the particular broadcast channel in use. By "amplitude modulate" is meant that the luminance signal voltage is made to vary the amplitude—the amount of overall voltage swing, or the height of the "envelope"—of the initially sinusoidal carrier. This is precisely the same kind of process that is used in the familiar radio "AM" broadcast band.

The color signals I and Q are both similarly applied to amplitude modulate another locally generated a.c. signal, 153 in FIG. 3, whose frequency (in the absence of modulation) is approximately 3.58 megahertz above the low end of the broadcast band. This second a.c. signal, known as the "color subcarrier," is amplitude modulated by both the I and Q signals—but these two signals are applied ninety degrees out of phase with each other, and can be separated out again later by appropriate equipment in video monitors and receivers.

In addition to the filters used to prepare the color signals for modulating the color subcarrier, the overall frequency range in a broadcast signal is also limited by filters applied to the signal before it is broadcast. One of these cuts off the low-frequency end of the modulated main carrier, starting about 0.5 megahertz above the low end of the broadcast channel—as indicated at 151 in FIG. 3. The other end of the main-carrier frequency band is cut off starting at about 5.25 megahertz above the low end of the channel, as indicated at 154 in FIG. 3.

Although the main carrier is amplitude modulated, the effect of amplitude modulating a carrier of fixed frequency with a wideband video signal level is to inject into the carrier a broad range of signal frequencies corresponding to the sums and differences of the carrier frequency and the video signal-level instantaneous frequencies. As drawn in FIG. 3, the difference-frequency signal components extend toward the left from the carrier frequency 152, and the sum-frequency signals extend toward the right. At least one of these two "sidebands" must be transmitted relatively intact, to convey the detailed picture information. It is redundant to transmit both, however, so the low-frequency end is discarded by the cutoff function which starts at 151 in FIG. 3 and proceeds along the curve 161. This cutoff and the carrier frequency 152 may then be placed near the low end of the broadcast channel, allowing a relatively wide range of frequencies to be included in the amplitude-modulated carrier in the sum-frequency sideband—extending to 154 in FIG. 3.

The amplitude-modulated main carrier and the sidebands of the color subcarrier are added together, and the high-frequency ends of both signals are cut off before (or in the process of) broadcasting—starting at point 154 in FIG. 3 and following curve 166, in effect to zero before the audio-channel frequency 155 is reached. This leaves roughly a 0.25-megahertz guard band before the start of the next broadcast channel at 6 megahertz on the FIG. 3 scale.

In the encoded-color broadcast system just discussed, approximately four-megahertz upper sidebands are available in each video channel for conveying image detail. As to the transmission of color information, not only is signal I limited to about a 1.3-megahertz bandwidth, and Q to about a half-megahertz bandwidth, but in addition both are subject to some distortion wherever there is fine detail in the black-and-white image (producing black-and-white signal frequency components near the color subcarrier).

Even in the absence of the color bandwidth limitations, and even if the color subcarrier were placed further from the primary carrier, the processing and reprocessing of the primary color signals in the formation of transmission primaries and the later decoding would still give rise to some color distortion and other adverse phenomena. A certain amount of nonlinearity is unavoidable, and radio-frequency feedback, crosstalk and other forms of interference may be expected in any practical circuit.

All of these various phenomena are particularly undesirable in the context of special effects and/or widescreen cinema, where it is desirable to have crisp, high-resolution, accurate-color images at all stages of the production process. This is particularly essential when two or more image elements are to be combined to make a composite. In that particular context, "broadbrush" color in any of the component images can produce very conspicuous peculiarities in the composite, at the boundaries between the component images.

The second drawing in FIG. 3 illustrates the corresponding conventional technology used in so-called "high band" video recording. The illustration applies directly to monochrome recording, with elaborations relating to color encoding for recording that need not be described here. In the prior art, frequency responses of camera chains and recorder are essentially uniform or "flat" from d.c. to approximately four megahertz—as shown at 158 in FIG. 3. Just above that frequency a low-pass filter in the input stages of the recorder cuts off the frequency response of the apparatus along curve 159.

The recorder uses an internally generated carrier of frequency approximately 7.85 megahertz, shown at 167 in FIG. 3. The video signal constrained within frequency-response curve 158/159 is used to frequency modulate the carrier, producing a frequency-versus-signal-level relationship that is standard in the industry. Very recent experimental results have been reported involving video recorders or recorder components operating at much higher frequencies; however, these devices are not perfected, and their prospective applications differ from those of my invention.

The so-called "sync tip" part of the video-signal waveform is caused to modulate the carrier frequency downward to seven megahertz, as shown at 160 in FIG. 3: this corresponds to the synchronization signals superimposed within the video camera after the end of each raster-line signal waveform. The so-called "blanking" part of the waveform corresponds to no frequency modulation at all—that is, the original frequency of the carrier is undisturbed. This represents "black" image regions. The so-called "peak white" or maximum-brightness signal level in the video signal is caused to modulate the carrier frequency upward to twenty megahertz, indicated at 169 in FIG. 3. The frequency-modulated carrier thus ranges along the frequency envelope 168 in FIG. 3, between sync tip at 160 and peak white at 169.

The video signal cutoff at 159 prevents high-frequency components of the video signal, in the same frequency range as the modulated carrier 160/168/169, from interfering with the latter, heterodyning to cause conspicuous "crawling-worm" interference patterns or moire patterns in the displayed video image. Only the upper sidebands (not illustrated) of the frequency-modulated carrier are recovered for retrieval of the recorded signal information, again to minimize the possibility of reproducing interference patterns due to interaction between the lower sidebands of the modulated carrier and the original video signal.

Comparison of the first two portions of FIG. 3 that have now been discussed reveals an interesting fact of the prior-art approach to video recording technology. The passband of the raw video signal is about four megahertz. This value was chosen undoubtedly because there was no point in incurring the added expense of high-frequency circuits whose upper-frequency components would never be "seen"—since the broadcast cutoff curves 165 and 166 would discard any components more than 4.0 to 4.5 megahertz above the carrier frequancy 152. Thus the broadcast channel-width limitations, translated into standard transmitter bandpass, have been exported into the video recording field to impose an arbitrary constraint that interferes with feasibility in video cinematography applications.

e. SUMMARY; AREAS OF APPLICATION—The foregoing discussion has identified various imperfections in the prior-art video technique—poor resolution (especially with respect to color), electronic "crawl," and in very-slow-motion work the impossible choice between double-imaging and half-resolution.

Such imperfections may readily be disregarded in watching the evening news on a home video receiver, particularly if a twenty-one-inch screen is viewed from across the room (six to ten feet away, for instance, yielding a subtended visual angle of perhaps ten to fourteen degrees). In a motion-picture theater, however, such imperfections are not likely to be ignored on a ninety-foot screen viewed from a mid-orchestra seat (50 to 150 feet away, for instance, yielding a visual angle of 35 to 100 degrees).

It is the conventional wisdom of the television industry that these limitations are inherent in and fundamental to the video technology. Some industry leaders may feel that the way to increased acceptance of video techniques in the making of motion pictures is simply patience—while the lowering expectations of the viewing public and the skyrocketing costs of cinematographic techniques approach each other, to finally meet in a state of mind where a somewhat-improved video image will be considered acceptable for some special-effects use in widescreen cinema.

Be that as it may, these conventional wisdoms have prevailed to the extent that video signals are now formatted to broadcast standards in the cameras, and are processed through all subsequent stages of recording, fades, dissolves, title superposition, and all editing, in these very limited broadcast-imposed formats. The single exception to this general practice is matte-compositing—but only because that process, by its nature, requires independent color input signals. Matte outputs are promptly encoded.

The broadcast-imposed standards of the television industry have tended to thwart application of the time-saving and money-saving video technology to a major potential field of application—namely, cinema productions. The incompatible frame rate, inadequate bandwidth, inadequate number of raster lines, interlaced fields, phase-shifting of color signals, and most of all the within-the-camera encoding of color information, interleaved within the upper registers of the luminance information, all combine to stymie efforts at real qualitative improvement in image quality for widescreen cinema—or even for home viewing.

Despite all these disadvantages, at least one service firm is involved in a commercial venture of converting encoded-color video to cinema film. That firm is believed to use an electron-beam recorder for transforming information for encoded-color video tape to a black-and-white film intermediary, one film frame for each primary color of each image. Each set of three frames of the intermediate is then printed with appropriate colored lights onto color negative stock. This system presumably involves backing up the video tape and playing each frame three times—each time decoding a different primary color signal—though other systems, involving intermediate video records or temporary frame storage, can be imagined.

In any event, the image quality is severely limited—by all of the factors already discussed, plus problems of registration on the film as between the different colors, and the discarding of one-fifth of such information-gathering capability as does exist. The latter wastage of information arises from the need to disregard every fifth frame, to accommodate the different frame rates of video and cinema.

At least some commercial electron-beam recorders have been provided with a "spot-wobbler" circuit that superimposes a small, very high-frequency a.c. signal on the vertical deflection signal. The result is to blend, to some extent, adjacent raster lines in the film image.

The activity of the above-mentioned service-firm venture despite its technical limitations demonstrates the enormous untapped potential for truly high-image-quality electronic photography.

These artificial, broadcast-imposed limitations also have other unnecessary adverse effects. For one, they impose image-quality deficiencies upon the viewing of commercially prepared video tapes on home viewers, and in commercially operated video-projection theaters. There is clearly no reason for such viewing to suffer the frequency-band limitations imposed by the limited number of frequencies in the broadcast spectrum, any more than the cinematographic industry should suffer such limitations.

For another, the broadcast-imposed limitations impose image-quality deficiencies upon the viewing of movies and other special features in homes that receive cable television service.

Thirdly, the broadcast standards impose image-quality deficiencies upon the preliminary, prebroadcast microwave-link transmission of television programs between television stations, between station and transmitter, and so on. Likewise they impose deficiencies upon the handling of television images in studio processing—that is, in recording, matte compositing, editing, title superposition, and the like. Home television images would be somewhat improved if the imposition of these deficiencies could at least be avoided until the final stage of signal handling just before general broadcast.

Fourthly and finally, the broadcast standards impose these same image-quality deficiencies upon video signals that are broadcast to individual home receivers. There is great debate at present over the formatting of television signals for broadcast via satellite direct to one-meter "dish" home antennas in very large regions. These developments, some proposed and some apparently under way, offer what may be a final opportunity to rethink both broadcast standards and the design of a new generation of home reception equipment. With wall-sized television screens in the offing, and an unallocated band of frequencies available for wide regional use by satellite transmission, the technical requirements for realization of qualitative improvements in image quality should be given a careful examination.

The present invention is addressed to cinema applications and also to the four video applications enumerated just above. It will be apparent that some of the features of the invention are inapplicable to certain of these applications, but in general nearly all the features of my invention do have broad applicability in all of these areas. The primary and broadest object of my invention is to produce video image quality that is essentially equal to or better than what is now shown on motion-picture wide screens.

SUMMARY OF THE DISCLOSURE

Later portions of this document describe in detail certain preferred embodiments of my invention. In those preferred embodiments, the entire video process from start to finish is modified to improve resolution and to improve compatibility with cinematographic film and techniques.

The camera, in particular, is to function simply as a source of independent primary color video signals. (It will be seen later that apparatus other than cameras can function as a source of such signals.) Pursuant my invention the camera does not scramble the signals together, losing much of their information detail, by "encoding" the color information separately from the black-and-white information, but simply passes the three primary color signals along as an output signal to subsequent stages. Moreover, the camera operates at twenty-four video frames per second, which is compatible with cinema, and its scanning circuits are controlled to present each frame as a noninterlaced single field, preferably with at least 655 raster lines.

Further in accordance with the preferred embodiments of my invention, the camera may be modified to prevent loss of information corresponding to very fine image detail. This modification consists of improving both the generation, within the photoelectronic sensor itself, and the transfer, within the camera circuits, of very high-frequency components of the three primary color signals. Use of a finer scanning spot in the sensor permits generation of high-frequency signal components, corresponding to fine image detail; the tendency of the finer spot to make raster lines more conspicuously discrete is eliminated by use of a spot wobbler in the final video presentation (whether to film or by video display). Signal frequencies as high as fourteen megahertz, and even higher, are generated and preserved, and form the output signals of the camera.

It is within the scope of my invention, however, to operate with signal components that extend in frequency only up to about eight megahertz. Even this frequency is substantially higher than the cutoff point imposed in conventional video technique, but no significant modification within the camera is required to obtain eight-megahertz signals.

Next, a video recording system is provided that includes means for receiving all three of the independent primary color video signals simultaneously but separately from the camera or other source. These receiving means are made up of suitable separate signal lines, buffers if desired, and circuits for conveying the three signals within the recording system as required. The recording system also includes three low-pass video input filters, one for each of the three primary color video signals.

While the camera acts as a wideband source, the low-pass filters are adapted to receive the three color video signals from the camera or other wideband source and to pass components whose frequency extends up to some cutoff value that exceeds, preferably, fourteen megahertz—or, at least, the eight-megahertz components mentioned earlier as being within the scope of the invention. That is to say, the low-pass filters pass all frequencies in the range from zero (that is, d.c.) all the way up to eight or fourteen megahertz, and preferably higher, as the case may be.

While low-pass video input filters per se are not novel, it is quite extraordinary to propose use of such a video input filter that cuts off as high as eight megahertz, and utterly radical to suggest use of a low-pass video input filter admitting frequencies as high as fourteen megahertz. There are two reasons for this.

First, in the broadcast context, even the eight-megahertz passband would permit the raw video signal to extend in frequency range up to and beyond the frequency range reserved for the audio information that accompanies the picture—as can be seen from the topmost diagram of FIG. 3, discussed earlier. In conventional practice the upper 2.25-megahertz portion of the passband would be discarded by filters at the transmitter, so there would be no point in extending the passband. If the filtering were removed from the final output stages, however, the passband extension would produce heterodyning between the video signal and the audio signal, resulting in extreme distortion of the audio (and, if receiving equipments were correspondingly widebanded, of the video too—with very conspicuous moire [visual interference] patterns as the result). In short, the operation would be completely unsatisfactory. In fact, with a passband over about seven megahertz, the video information would extend all the way into the frequency band of the adjacent channel—that is to say, another television station entirely—and this of course would be entirely unacceptable and even illegal.

Second, in the video recording context, as can be seen from the second portion of FIG. 3, the extended video passband would, above seven megahertz, interfere with the frequency modulated carrier envelope 160/169, again producing altogether unacceptable image distortion.

In the preferred embodiments herein described, however, all of these adverse effects are nonexistent, because at least direct broadcast is not contemplated, and the recording system carrier signal frequency is made at least two or three megahertz higher than the passband of the low-pass video input filter. For example, if an eight-megahertz passband is used, the carrier frequency is conveniently made about ten megahertz and higher. If a fourteen-megahertz (or higher) passband is used, the carrier frequency is made about seventeen megahertz and higher.

As can be understood from the previous detailed prior-art description, it is something of an oversimplification to refer to the frequency of the carrier, since in operation of a video recording system the carrier frequency changes very considerably; however, the values mentioned in the foregoing discussion are, generally speaking, the values at the low end of the frequency range within which the carrier varies.

Here is another example of frequency allocations, which provides a rather practical compromise for (1) achievement of striking improvements in image quality with (2) technical requirements that are not demanding in the ultimate: in this system the video passband is twelve megahertz and the recorder carrier frequency is fourteen megahertz. To equal or exceed the image quality of film-based widescreen cinema, however, I prefer the fourteen-megahertz-or-higher passband and seventeen-megahertz-or-higher carrier mentioned earlier.

In my preferred embodiments the audio signal is recorded on a separate track, and for broadcast or cable-video applications can be transmitted on a carrier whose frequency is even higher than that of the high-frequency video carrier (or lower than the video sync-tip frequency).

The recording system also includes "modulation means"—circuits which receive the video signal components that are passed by the low-pass filter, and which also receive the carrier signal from its generating means, and which apply all of the video signal components passed by the filter to frequency modulate the carrier. That is, the modulation circuits are arranged so that the level (voltage or current) of the video signal will control the frequency of the carrier. The modulation circuits translate video-signal level variations into carrier frequency variations, preparatory to recording.

Again, the provision of a carrier and a modulation circuit per se is not novel. It has been unheard of in the prior art, however, to provide a video-tape recorder carrier of frequency ten, fourteen, or seventeen megahertz, and to modulate such a carrier with separate red, green or blue video signal levels extending above eight, ten, or even fourteen megahertz.

Finally, and technologically most difficult, the recording system must include means for receiving the frequency-modulated carrier signal from the modulation means and for impressing this frequency-modulated carrier signal upon a magnetic tape, video disc, or other suitable recording medium. The system must appropriately support the storage medium, and advance it suitably so that successive signals are recorded on adjacent portions of the medium.

Although all three video color-primary signals are impressed onto the tape or other storage medium synchronously and simultaneously, they are impressed independently—in the sense previously identified. That is, the three channels of primary color information from the camera are not encoded or in any other way mixed together. The red information in the original image received by the camera controls the signal that is recorded on the track or channel reserved for red information; the blue information in the image controls what is recorded on the channel reserved for blue information; and the green information in the image controls what is recorded on the channel reserved for green—with suitable precautions to avoid "crosstalk" between the three channels, to the maximum practical extent.

The recording system may be implemented by provision of three video tape recorders operating in synchronism, each adapted to receive one of the three video color primary signals and impress it onto a respective one of three separate video tapes. If preferred, other discrete monochrome storage media may be used in place of tapes, and three suitable separate video recorders operating in synchronism may be used to record on the preferred discrete media.

I prefer, however, to provide the storage medium in the form of a single video tape, and to provide the recording system in the form of a unitary tape scanner adapted for impressing all three such signals independently on the single tape. Alternatively the storage may be provided in the form of a unitary video disc or other storage medium, with a unitary scanner or equivalent apparatus adapted for impressing all three of the signals independently on the unitary disc or other storage medium.

Whatever form is used for storage, the scanner should operate to impress each video color primary signal onto the medium in monochrome twenty-four-frame-per-second format, with at least 655 raster lines per frame, and with carrier frequency at least two megahertz greater than the video signal bandwidth—and with video signal bandwidth at least eight megahertz, more desirably at least twelve megahertz, and preferably exceeding fourteen megahertz.

In a complete system provided pursuant the preferred embodiments described herein, the recorder should be switchable to receive signals from sources other than a video camera, or from other sources in addition to a video camera. In particular, it is essential to be able to connect the recording system to receive signals from a source that includes a video traveling matte system, such as described in the Mendrala and Peterson patent mentioned earlier, with the video traveling matte system connected in turn to receive signals from a video camera.

Further, it should be possible to use another video recording system, having essentially the same capabilities, as another input to the matte system—so that the recorder connected to the matte output receives a composite image made up of elements from the live camera image and elements from a prerecorded image. The video recording system that is thus connected to the matte input may be described, in general terms, as means for retrieving signals impressed upon a storage medium.

Moreover, it should be possible to use two video recording systems, both having essentially the same capabilities, as the two inputs to the matte system—so that the recorder connected to the matte output receives a composite image made up of elements from two prerecorded images. The two input recording systems may be described as two independent means for simultaneously retrieving signals impressed upon storage media.

The recording system of my invention can be used with a great variety of utilization means. Exemplary utilization means include a video monitor, direct red-green-blue (or other primary system) broadcast facilities, a broadcast final-output-stage color encoder, a tape editor for use in shortening, rearranging and combining scenes as is customarily desired in the video and cinema creative process, a special-purpose tape editor for preparing specially formatted video tape preliminary to transfering the video information to photographic film, a device for effecting direct three-channel-video-tape-to-color-film information transfers, and/or any one or more of the above in combination with a video traveling matte system or other special-effects equipment such as a fader, dissolver, montager, title applicator, and so on.

The preferred embodiments described in this document also encompass systems for transfering information from tape to film. In one of these systems the three-channel recording is first edited or "conformed" into a single-channel recording, such as a monochrome video tape recording, in which the three color video primary signal frames that make up a complete set of information for a single visual frame or "color picture," are placed in sequence—for example, first red, then green, then blue. The three sequential video color primary frames are advantageously separated by prerecorded color-black frames, as will be explained below.

The conforming process is best managed by an editing apparatus which may include a hard-wired electronic logic circuit, or alternatively a programmed general-purpose electronic logic circuit (e.g., digital computer). The monochrome recording prepared in this way can then be used in an electron-beam recorder or similar device—modified to be compatible with the frequencies, frame format (e.g., 655/24 noninterlace), and other special characteristics of the preferred embodiments of my invention—to prepare a monochrome film intermediary. (The notation "655/24" and like numeric combinations specifies the number of raster lines per frame, and the number of frames per second. In this case, the notation means 655 lines per frame and twenty-four frames per second). Better intercolor registration as between adjacent frames on the monochrome film can be obtained through this use of a monochrome video intermediary, when using an electron-beam recorder.

Several variations on the general system described above for preparing such a monochrome film intermediary are described in the following detailed description of preferred embodiments. In essence these variations all relate to the need to impose a relative delay upon the three color primary signals, so that they can be received simultaneously—i.e., in parallel—and can be impressed upon the monochrome film sequentially—i.e., in series. With this in mind, the entire video simultaneous recording can be first conformed to a sequential recording, and the sequential recording then used in a separate film-exposing operation as described above; or the entire process can be performed in a single operation.

The process of conforming to a sequential recording, in effect, delays all three color signals, by differing amounts of time delay. It is equally effective, however, to play the first color video primary frame (e.g., the red frame from the tape or like recording) directly into the electron-beam recorder, while delaying only the other two color video primary frames (e.g., the green and blue frames) differentially. Those frames may then be transmitted in sequence to the electron-beam recorder from the delay (temporary storage) device.

In all of these systems the parallel recording is played out only once, rather than backing up and playing out each encoded frame three times for separate decoding of a different color on each pass, as is done in the prior art system described earlier. While the delay devices are feeding the delayed color information into the electron-beam recorder, the parallel recording can be automatically positioned and prepared for playback of the next three-channel frame. In the single-operation system, it is necessary to delay at least two of the color-primary frames, but all three may be delayed if preferred. The temporary storage may be provided in the form of a video tape loop, a video disc, an array of digital electronic registers (popularly called a "frame store" in the video jargon), or even possibly a very long delay line.

Another tape-to-film transfer system, encompassed within the preferred embodiments described in detail below, avoids the necessity for preparing a monochrome film intermediary. This system uses the three recorded primary color video signals to control the intensity of three corresponding light beams. The beams, advantageously laser beams, are directed to photosensitive color motion-picture film, substantially reproducing the visual image information on the color film. This system has the advantage, relative to the monochrome-intermediary system variations described above, that the registration between the three colors is instantaneously correct at all times.

Not only are color-registration problems virtually eliminated, but—in combination with the noninterlaced frame format of my preferred embodiments—the three-light-beam system permits exposure of the color film by a system which requires no framewise step advance of the film. In this system the film is merely advanced continuously, at the appropriate speed for laying down raster lines on the film, and the light-beam scanning mechanism merely scans across the width of the film. Thus the film-advance mechanism is substantially simplified, and the video-controlled light-beam scanning mechanism is greatly simplified as well. (If preferred, however, the three-beam system may be operated as is an electron-beam recorder—that is, with the film advanced on a framewise basis, and with the light beam scanned vertically as well as horizontally.)

The light beams may be scanned across the film by rapidly rotating mirror facets, or perhaps, by voltage-controlled dichroic devices. The principal disadvantage of this tape-to-film transfer system is that the necessary active optical components may not yet be available, whereas the electron-beam recorder system described previously can be readily put into service with straightforward modification of existing commercial units. In addition, some short-period delay or storage may be required to match the video frame-presentation format (with a relatively short pause between adjacent frames) to the widescreen cinema frame format (with a relatively tall border between adjacent 1.85:1-aspect-ratio widescreen frames).

In either system it is desirable to make use of a "spot wobbler"—superposition of a small, generally unsynchronized high-frequency a.c. signal on the deflection control signals for each light beam—or, in the case of the electron-beam recorder, on the control signals for the electron beam. This feature provides the visual effect of smoothing out or blending the visual image on the film, so that the raster lines do not appear as discrete lines.

All of these features of the preferred embodiments of my invention, and their many advantages, may be more clearly understood from the following detailed description—with reference to the appended drawings, of which:

BRIEF DESCRIPTION OF THE DRAWINGS

FIG. 1b is a similar diagram showing the same basic configuration using a single three-track recorder in place of the three single-track recorders of FIG. 1a.

FIG. 2 is a diagrammatic representation of the raster-line format preferably used in the apparatus of FIGS. 1a and 1b, and for comparison the raster-line format conventionally used in the prior art (and already discussed above).

FIG. 3 is a diagrammatic representation of the typical signal level as a function of frequency, for raw video signal and FM tape-recorder carrier, in three preferred embodiments of my invention. FIG. 3 also shows for comparison the analogous information for conventional signal-recording and signal-broadcast usages in the prior art (as discussed above). All three preferred embodiments here illustrated can be used in either of the embodiments shown in FIGS. 1a and 1b; and all three can be used with the raster-line format shown for the preferred embodiment of my invention in FIG. 2.

FIG. 4 is a diagrammatic representation of the pattern of tracks on a three-video-track record produced by the recorder of FIG. 1b, and preferably using the raster-line format of FIG. 2 and any of the three frequency distributions of FIG. 3.

FIG. 9a is a block diagram showing a further variation of the FIG. 8a apparatus configuration; in this variation three additional single-track recorders are substituted for the camera in the FIG. 8a configuration.

FIG. 10c is another variant block diagram of FIG. 10a; in the FIG. 10c version, a single three-track recorder is substituted for three of the single-track recorders of FIG. 10a.

FIG. 12a is a diagrammatic representation of the process of information transfer from three synchronously recorded single-track records (such as would be prepared using the equipment of any of FIGS. 1a, 7a, 8a, or 9a) to a conformed tape, then to monochrome film, and finally to color film—using the apparatus of either FIG. 10a or FIG. 10b, in combination with the FIG. 11 film-transfer apparatus.

FIGS. 12a and 12b show diagrammatically the various tape and film records created in the process, including a prerecorded all-color-black monochrome tape that is advantageously used to prepare the conformed monochrome tape.

FIG. 15b is a block diagram similar to that of FIG. 15a, but substituting a single three-track recording for the three-tape record used in FIG. 15a.

FIG. 16, similar to FIGS. 12 and 14, is a diagrammatic representation of the process of information transfer from a three-track record such as that of FIG. 4 directly to a color negative, using a three-light-beam scanner such as that of FIG. 15a.

FIGS. 19 and 20 are respectively plan and elevation drawings of the same electromagnetic video scanner which FIG. 5 shows in perspective.

DETAILED DESCRIPTION OF THE PREFERRED EMBODIMENTS

Figure 1A:
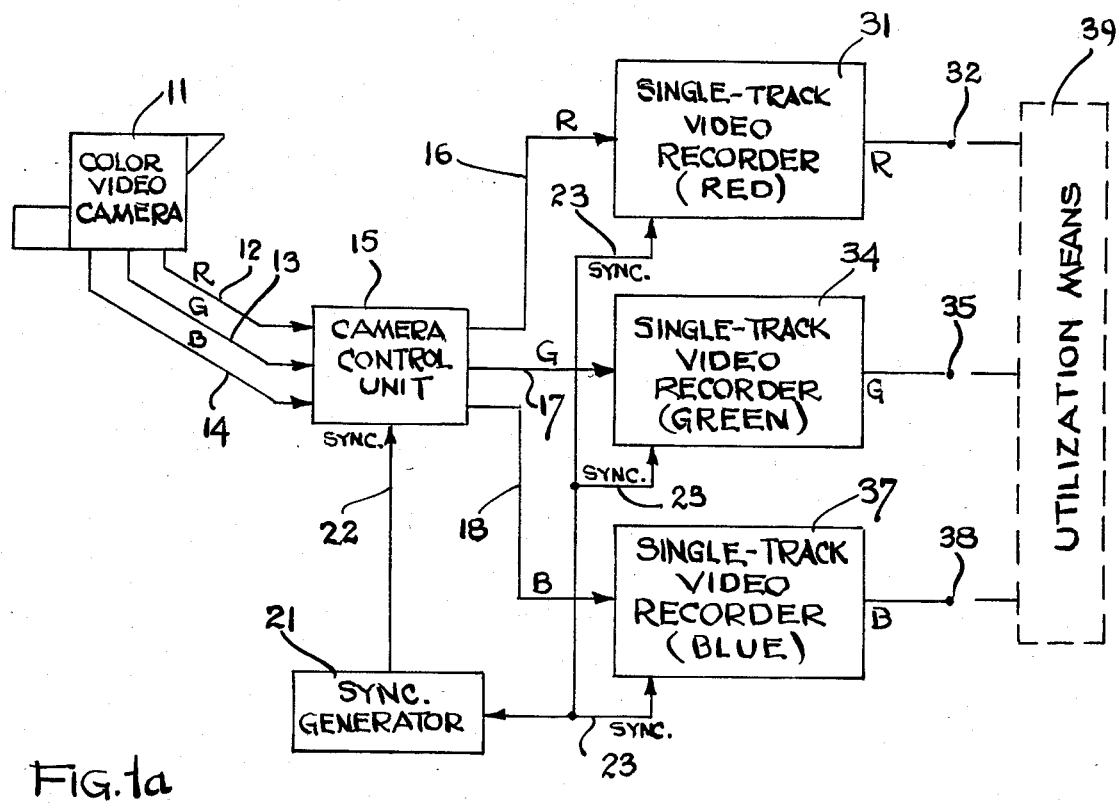
FIG. 1a is a block diagram showing the basic apparatus configuration of a preferred embodiment of my invention, using three single-track video tape recorders.

As shown in FIG. 1a, independent primary color video signals generated within a color video camera are carried along three separate signal lines 12, 13 and 14 to a camera control unit 15. The "R" signal line 12 carries only information about the red component of the image received by the camera, the "G" signal line 13 carries only information about the green component of the image, and the "B" signal line 14 carries only information about the blue component.

It is essential to understand what is meant by the foregoing simple statements, and how radically different they are from a description of a conventional video camera.

In the system of FIG. 1a, the video camera 11 generates video color primary signals in the usual way, but those signals are not encoded; they are not used to form luminance and color transmission primaries. Rather they are maintained as separate and independent color primary signals and directed along separate signal lines 12, 13 and 14 to the camera control unit 15. That unit does not encode or otherwise intermix the signals—except, of course, to the unavoidable extent required by "crosstalk" between radio-frequency electronic signal lines in close proximity—but simply buffers the signals (that is, lowers their impedance, to facilitate handling in later electronic circuitry), adds necessary framing, clocking and synchronization signals, and passes-on the altered video color primary signals along output signal lines 16, 17 and 18.

The various signals superimposed within the camera control unit are derived from a synchronization or "sync" signal 22, which is developed within a "sync generator" device 21. As will be explained shortly, the "sync" signal 22 and the precise operation of the color video camera 11 and the camera control unit 15 is nonconventional in certain other important ways. In addition to the addition of "sync" and related signals, the camera control unit also performs certain other signal-shaping and limiting functions which are conventional and need not be discussed here.

The color camera 11, control unit 15 and sync generator 21, with their interconnections and the control-unit output signal lines 16, 17 and 18, all taken together constitute a source of independent primary color video signals. Such a source is, by the conventional wisdoms of video technology, unknown and virtually useless. In the context of my invention, however, it serves an essential and extremely valuable function.

As shown in FIG. 1a the three output signal lines 16, 17 and 18 from the camera control unit 15 are advantageously directed to three single-track video recorders 31, 34 and 37 respectively. These three recorders operate in synchronism with each other and with the camera 11 and control unit 15, by virtue of "sync" signals that are incorporated into the signals 16, 17 and 18. (In playback, the "sync" signals 23 from the sync-generator unit 21 are used by the three recorders 31, 34 and 37, in conjunction with the "sync" signals in the recordings, to control playback speed.)

The three recorders 31, 34 and 37 taken as a group constitute means for receiving the three independent primary color video signals from the source—that is, from the combination of camera 11, control unit 15, sync generator 21, and the various interconnections and output lines. Each of the three recorders includes hardware for advancing and supporting a suitable video signal storage medium, such as magnetic tape or a video disc; and the three individually supported and advanced media taken together constitute a storage medium.

Each of the three recorders also includes hardware for impressing one of the three video signals onto its respective individual storage medium, synchronously with the impressing of the other video color primary signals onto the other individual storage media. Taken together, the three sets of signal-impressing hardware constitute means for synchronously impressing the three signals from the source onto "the" storage medium (i.e., the three media considered together).

Each of the three recorders 31, 34 and 37 has a respective output terminal 32, 35 or 38, where the stored color primary video signals, upon retrieval from the respective storage media, can be presented for use in a utilization device 39. Such a utilization device, or means for utilizing the recorded signals, may include one or a combination of a great many different kinds of video devices. For example, the utilization means may be a video monitor adapted to use the three video color primary signals presented independently, or a similarly adapted video traveling matte device followed by another recorder, or a similarly adapted complex device for preparing cinema film from the recorded video information, or a broadcast encoder and transmitter. All of these possibilities will be discussed in greater detail shortly.

Figure 1B:
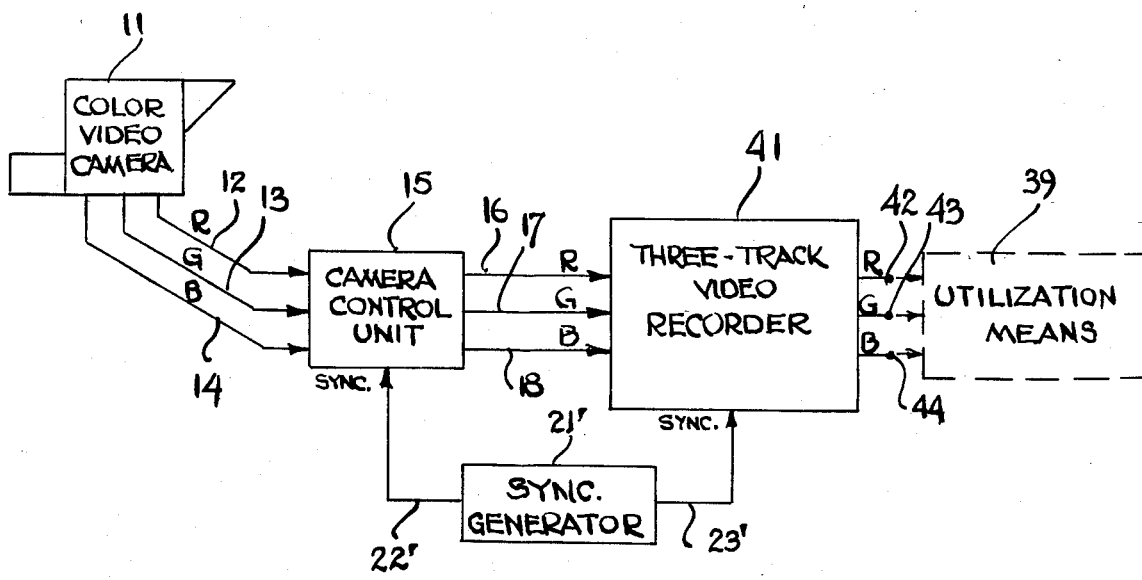

FIG. 1b represents a FIG. 1a variant, in which the three separate (but synchronously and simultaneously operated) recorders 31, 34 and 37 are replaced by a single "three-track" video recorder 41. In this system the camera 11 and control unit 15, operating in accordance with sync signals provided at 22' from the sync generator 21', make up a source of independent primary color video signals, substantially as before.

The single recorder 41 has input terminals that constitute means for receiving the three independent primary color video signals simultaneously from the source. The single recorder 41 also has hardware for supporting and for advancing a unitary storage medium such as video magnetic tape or a video disc, and an electromagnetic scanner or equivalent apparatus for synchronously impressing the three received signals simultaneously onto the unitary tape or disc.

In short, the difference between the two variants of FIGS. 1a and 1b, considered in a very abstract or conceptual manner, may appear as merely a matter of packaging. Considered pragmatically, however, one difference may be that the system of FIG. 1a may be assembled by modifying conventional equipment—including three conventional video recorders—while the system of FIG. 1b requires, at the time of this writing, creation of a new piece of equipment, the three-track video recorder 41, capable of receiving and impressing onto a unitary storage medium, synchronously and simultaneously, the three independent color primary signals.

On the other hand, another practical difference may be that, for use in the field, the three-recorder system may be unfeasible or at least unappealing—due to bulk and the greater number of opportunities for mechanical failure—while the single three-track system may be acceptable, or at least more appealing.

My invention encompasses both the assemblage of three recorders in FIG. 1a and the single three-track recorder of FIG. 1b, taken either alone or in combination with the source (camera and control unit) and/or the utilization means.

Other advantageous features, not visible from the system block diagrams in FIGS. 1a and 1b, are shown in FIGS. 2 through 6. The right-hand (prior art) part of FIG. 2 has already been discussed. The present invention contemplates using a noninterlaced scanning format, as illustrated in frame 131 at the left side of FIG. 2, to create each full image.

In the noninterlaced system, scanning starts at some convenient point such as 132, near the top of the image, and proceeds to trace a first raster line 133, which adopts a shallower slope than the conventional raster line. After the scanning spot reaches the right edge of the image it swiftly flies back along a more horizontal path 134 to the left edge of the image. The next raster line 135 is closer by half to the previous line 133 than in the prior-art system, leaving no unused raster-line position between the two. Line 135 is similarly followed by a fly-back path 136 and another adjacent raster line 137, and so forth to the bottom of the frame. The last raster line 138 of the single pass through the image terminates—in one unitary "field"—the entire raster pattern, and the scanning beam flies back along a path such as 139 to the top of the frame to start again at the same point 132 as before, with a completely new frame.

With this system the entire full-resolution image can be shown at once in stop-action. The only effect of rapid lateral motion of an object in the image is to distort the shape of the object slightly. That is, if the object is moving from right to left, the upper part of the object is not as far to the left when scanned as the lower part of the obJect, so a rectangular object is distorted to a parallelogram, appearing to lean to the right if it is moving to the left. Of course this effect is present in both fields of the interlace system as well, and is in any event completely negligible for shallow objects, generally imperceptible for objects that are not geometrically regular, and avoidable by straightforward planning of special-effects scenes.

With the noninterlaced system, the necessary "flicker" rate is obtained automatically as a consequence of the double-flashing of each film frame in every conventional cinema projector. For special effects such as slow motion or stop action, each original video frame is straightforwardly available for repetition two, three, or multiple times on successive finished-product frames. In this way it is easy to record motion of small models (such as toy-size ships in a bathtub-size pond, or foot-high miniatures of tall buildings that a script requires to topple) at a uniform video scan rate, and to then produce the effect of much slower motion that would be appropriate for the full-size structures.

Astonishingly enough, even broadcastable video format can be obtained from such recordings—by merely sorting the alternate raster lines through a field-storage device into interlaced-two-field condition. The several disadvantages that accrue from starting in interlaced format, when the goal is film compatibility, are diminished to only that one of the extra signal-handling step when going the other way (from noninterlaced recording to broadcast video), largely because the video screen more straightforwardly accommodates the interfield registration requirement.

Since the video recording is in noninterlaced format at the outset, no additional storage equipment is required as between different image frames to use a film-exposing device that scans only laterally with respect to the film, while the film is advanced longitudinally at a continuous speed. (The only registration problems remaining are thus related to registration (1) as between different color signals for each image, and (2) as between the image height on the film and the distance along the film between images; these areas are discussed in detail later in this document.) Consequently enormous simplifications of video-to-film transfer apparatus are achieved, with substantial improvement in quality—and reliability of quality—in the finished visible product.

In accordance with my invention, the complete noninterlaced raster pattern shown at the left side of FIG. 2 is repeated twenty-four times per second. This is the same as the cinema frame rate, rather than the thirty-frame-per-second rate used in conventional video.

My invention's frame timing makes nearly a twenty-fourth of a second available for picture-detail acquisition in each frame, rather than less than a thirtieth of a second as in the conventional system. In this way a full twenty-five percent more detail can be collected without making any change at all in the rapidity with which image details, are collected. (This latter topic will be taken up shortly.)

In accordance with my invention the additional time gained by operation at the slower frame rate may be used to scan each frame in a greater number of more closely spaced raster lines. The additional twenty-five percent available time represents an added 131 raster lines, relative to the 525 lines of the United States video standard. It might be thought that these raster lines should be spaced apart only eighty percent (that is, in the ratio of twenty-four to thirty, or four to five) of the standard raster spacing. At this point, however, it is appropriate to introduce the considerations that arise from the different aspect ratios (shapes) of the conventional video screen and the wide cinema screen.

When conventional thirty-five-millimeter cinema film is used for widescreen motion pictures, it is of course impossible to make the film wider; instead the image on film is simply made shallower, and a shorter-focal-length projection lens is used to expand the images both horizontally and vertically and thereby fill the screen. In some cases films made for the more traditional screen shape are projected in widescreen theaters by merely masking off the top and bottom of the picture.

A third approach has been to use an anamorphic lens in photography, to compress a wide image onto the usual film width while retaining full use of the image height on film, and then using a correspondingly anamorphic projection lens that expands the image only horizontally to fill the wider screen. This approach has not been as successful commercially, possibly because it adds expense to achieve superior resolution in only the vertical direction, while tolerating substantially inferior resolution in the horizontal direction—even though the human eye is more sensitive to resolution in the horizontal direction.

In the past, when conventional video technology has been used to acquire and record an image, and technologists have then sought to transfer that image to widescreen cinema, the shape of the conventional video display has been the first stumbling block encountered. It is ironic that this has been so, since in a system such as that of my invention, conceived by resort to basic principles rather than video industry standards, the matter of image shape confers a substantial advantage upon the video medium relative to the industry-standard film medium. The standard video shape is in the ratio of four units of width to three units of height—relatively close to the older or traditional cinema format.

Thus, as with traditional-format cinema film used in widescreen theaters, the top and bottom of the video image were normally discarded in transfering the video information to film for widescreen display. The amount of information discarded in this way depends upon the dimensions assumed for the wide screen. If the screen is assumed to have an aspect ratio of 1.85 units of width to one unit of height, the transition to that format from four-to-three video format—filling the cinema screen width with the available image width—discards some twenty-eight percent of the raster lines.

If the relationship between video and widescreen film formats is approached from a more constructive point of view, however, the widescreen aspect ratio can be converted from a stumbling block into a distinct advantage, when the resolution potential is compared with the resolution capabilities that result from using the thirty-five-millimeter film in the ways described above. In particular, the video medium is capable of being modified in such a way as to make full use of all the raster lines available, whereas the masked-off space between film frames is simply lost information-carrying capability.

To realize the full information capacity of the video frame, the raster lines are simply spaced more closely—that is, their vertical spacing is made smaller—than in the conventional video format. The spacing is adjusted to obtain a video display whose overall aspect ratio (shape) is closely matched to that of the wide screen on which the image will ultimately be projected. For example, assuming a 1.85-to-one screen aspect ratio, in comparison with a 1.33-to-one video display aspect ratio, and assuming that the width of the video display is to be spread across the width of the wide screen, then the normal video format would produce an image height of 1/1.33=0.75 times the screen width, while the height of the wide cinema screen is only 1/1.85=0.54 times the screen width. If the video image is to be matched to the one-to-1.85 aspect ratio, then the raster lines normally displayed over a height of 0.75 times the image width can be compressed together vertically to range over a height of only 0.54 times the screen width. In effect the raster lines are spaced only 0.54/0.75=0.72 times their spacing for customary video.

With the twenty-four-frame-per-second frame rate discussed earlier, the number of raster lines available without changing scanning deflection speed as such, or information-collecting speed as such, is 655 lines instead of 525, allowing a raster-line spacing only 0.80 times the normal video spacing, as pointed out earlier. Taking further advantage of the widescreen-format factor of 0.72 derived in the preceding paragraph, the raster-line spacing can be reduced to only 0.80×0.72=0.58, or fifty-eight percent, of the conventional spacing—assuming, for the moment, that the resolution in the horizontal direction is equal to that of film.

While conceptually it might seem more appropriate to think of the vertical spacing as held constant while the raster-line width is expanded to produce the widescreen format, the opposite conceptualization, as described in the preceding paragraphs, is somewhat easier to follow. Both approaches lead ultimately to an identical conclusion, since a greater or lesser number of raster lines can be "traded off" on a simple proportional basis for a lesser or greater amount of time used in scanning each raster line—and hence a lesser or greater amount of image detail collected in the horizontal direction. A constant-width analysis as pursued here is easier to grasp because the available width of thirty-five-millimeter film, which furnishes the only suitable standard of comparison, is a fixed parameter. Taking film-detail definition as thirty line pairs per millimeter, the 24.9-millimeter image width of "thirty-five-millimeter" film accommodates 30×24.9=747 line pairs.

(In the cinema terminology, a "line pair" is one black line in combination with one adjacent white line. Thus, when compared with video vertical-resolution characteristics, one cinema "line pair" corresponds generally to one discrete video raster line—with the unused adjacent space which separates the adjacent raster line. When compared with recorded video horizontal-resolution characteristics, one cinema "line pair" corresponds to one cycle of the video carrier, assuming bandwidth-limited horizontal resolution.)

If such film is shot or masked to a 1.85-to-one aspect ratio, the vertical image detail is limited to 404 resolved line pairs. This result may be compared with video by applying the so-called "Kell factor." This factor takes account of the fact that the raster lines are discrete, fixed image elements which may straddle the dividing line between two adjacent objects in the image, or in other instances may lie along such a dividing line. The effective loss of definition is generally accounted for by a Kell factor of 0.65 to 0.70. Using the less favorable value of 0.65, the 404 resolved line pairs on film would require 404/0.65=619 raster lines.

The 655 lines previously mentioned thus betters the vertical resolution of conventional widescreen film. Of course an even greater number of raster lines may be provided, within the scope of my invention, if desired; or, alternatively, the number of raster lines may be reduced somewhat in the interests of achieving improved resolution in the horizontal direction. Some reduction even below 619 raster lines would be possible without reducing quality below the effective vertical resolution in the exhibition house, since the film-quality specification used in the foregoing calculation is the value normally associated with film exposed directly to the original live image, not second- or third-generation copies made from the original using an optical printer.

As a general rule, sacrificing a number of raster lines may be regarded as a tradeoff against additional resolution in the horizontal direction, and resolution in both directions may be enhanced by increasing the effective signal bandwidth—which is the next topic of discussion.

The bandwidth and frequency parameters of conventional video broadcast and recording have been introduced earlier under the heading of prior art. In accordance with my invention, the video low-pass filter cutoff frequency used in recording is moved upward, from the conventional value of about four megahertz shown at 159, in the second diagram of FIG. 3, to a substantially higher value of at least eight megahertz, the cutoff value shown at 172 in the third diagram of FIG. 3. The video signal thus includes frequency components over the entire range, as indicated at 171, from zero (d.c.) to approximately eight megahertz.

By comparison with the second prior-art portion of FIG. 3, it may be seen that video signal cutoff at 172, if used in combination with the standard seven-to-ten-megahertz carrier-modulation technique, would be subject to possible interference between the low-frequency sideband 160 of the modulated carrier 167/168 and the input raw video signal 171/172. This difficulty can be real in the frequency range relatively near the nominal carrier frequency 167, where there is typically very high energy in the sideband. Effective sharp cutoff filtering is difficult in this region because of the need for a strong sync-tip signal at 160—a frequency well below the video cutoff 172.

Therefore, in accordance with my invention, the carrier frequency is also shifted upward from 167 to 176, in the third drawing of FIG. 3, with the sync-tip frequency shifted to a corresponding value of ten megahertz, shown at 173, and the peak-white frequency shifted to thirteen megahertz, shown at 175. The frequency-modulated carrier thus varies over the range 174—maintaining, if desired, the three-megahertz overall frequency scale of the prior art and also maintaining a clear separation of two to three megahertz between the cutoff frequency 172 of the low-pass filter and the sync-tip frequency 173 of the modulated carrier.

It must be emphasized that the system just described with reference to the third portion of FIG. 3 is not only different from the prior art but is also philosophically and economically incompatible with the prior art. That is, it creates technological requirements and corresponding financial outlays that are without corresponding rewards, in the context of the standard-broadcastchannel utilization of recorded video signals. Consequently, within that context, the system illustrated in the third portion of FIG. 3 is technologically and economically meaningless, or absurd. Once again, the limitations of the standard broadcast system have controlled the industry's thinking with regard to cinema applications, to the detriment of the latter.

Whereas the standard video passband of approximately 4.2 megahertz corresponds to image resolution, in the horizontal direction, of about twenty-five percent that of widescreen cinema film, expanding the passband to approximately eight megahertz as in the third portion of FIG. 3, with the corresponding shift in carrier frequency assignments, directly provides an improvement to about forty-eight percent of the resolution capability of widescreen film. (The values given here, as earlier, represent a comparison with film directly exposed to the live image, rather than second- or third-generation copies.)

Although this proposal may be regarded as radical, and although it is within the scope of my invention, and although a working system assembled in accordance with this proposal has been assembled and found to produce strikingly improved image quality in video recordings, yet the full range of benefits of my invention are achievable by extending cutoff and carrier frequencies even further.

The fourth portion of FIG. 3 illustrates a system that has recently been the subject of very extensive calculations and preliminary design effort, and on which a system-development feasibility study has been conducted by a major, well-respected technological evaluation institute. This system contemplates low-pass filter cutoff at approximately twelve megahertz, 182 in FIG. 3, permitting video signal components to be used over the entire frequency range, 181 in FIG. 3, from d.c. to twelve megahertz. In simplest theory such a system should provide horizontal resolution that is 12/4.2=2.86 times better than conventional video, or about seventy-one percent of the film value (under ideal film conditions) mentioned earlier.

This system, once again, envisions a carrier frequency range whose lower end is at least two megahertz above the video-signal passband—e.g., carrier at 14.85 megahertz (186 in FIG. 3), sync tip at fourteen megahertz (183 in FIG. 3), and peak white at seventeen megahertz (185), for a full carrier frequency range 184 spanning a three-megahertz band. (If desired, of course, the carrier band could be displaced another megahertz upward, to preserve the three-megahertz guard band for minimal feedback interference. The exact guard-band width that is most desirable is, in view of the principles set forth herein, a matter of engineering design to be resolved on the basis of some preliminary testing. It is anticipated, however, that separating the modulated carrier frequency band from the video signal passband by two to three megahertz will be satisfactory.)

Very recent reports of experimental work (by a California firm, Merlin Engineering) with video recorders indicate that minor modifications may convert certain commercially available units (the Bosch-Fernseh BCN-50) for satisfactory operation with fourteen-megahertz video passband. This suggests that the system illustrated in the bottom portion of FIG. 3 is also feasible in the present state of the art. In this system, the video passband cuts off at approximately fourteen megahertz, encompassing frequency components over the full range indicated at 191, from d.c. to fourteen megahertz.

With such an input stage the appropriate carrier frequency would be a nominal 17.85 megahertz, indicated at 196 in FIG. 3, ranging as at 194 from sync tip at point 193 to peak white at point 195.

The fourteen-megahertz system should provide horizontal resolution about eighty-three percent that of the ideal first-generation film. This would be visually indistinguishable from such film. If desired, the difference between 655 and 619 raster lines mentioned earlier could be used to raise the video horizontal resolution to about eighty-eight percent of the film value. Another approach would be to reduce the number of raster lines to about 580, making the horizontal and vertical resolution both about ninety-four percent of the film specification.

Yet another possibility would be to reduce the number of raster lines by a few more percentage points, taking the additional scan time to reproduce more horizontal detail—in consideration of the greater visual sensitivity to horizontal than vertical detail.

There is good reason to believe that fine detail can be preserved better in reproducing video recordings electronically than in reproducing film images photographically. This factor if suitably exploited means that second-generation video intermediates will be closer to the original quality than are second-generation film intermediates, and that a "circulation" film print from video intermediates will be as good as or—what is more likely—better than a circulation film print from film intermediates. Thus the quality of the visible in-theater product will equal or exceed that of conventionally prepared cinema film. The comparison may be expected to become even more favorable as the video-record bandpass can be made even higher by advances in scanner and circuit design.

All of these systems, and others at passband cutoff of eight megahertz or above (172 in FIG. 3), are within the scope of my invention. It will be understood that the precise frequency range selected for modulation of the carrier and the precise width of the guard band selected for separation of the modulated carrier from the video signal passband are parameters that may vary substantially, without departing from the scope of my invention.

The noninterlaced scanning and high-frequency operation set forth in FIGS. 2 and 3 are both applicable to both of the equipment configurations presented in FIGS. 1a and 1b. The recording medium used in each of the recorders 31, 34 and 37 of FIG. 1a may be a generally conventional helical-scanned magnetic tape. The recording medium used in the three-track recorder 41 of FIG. 1b, however, must be a unitary medium unlike any present commercial medium, at least in regard to track layout. One preferred embodiment of my invention contemplates using magnetic tape in a special three-track magnetic tape recorder 41. By means of a seven-head electromagnetic tape scanner discussed below in connection with FIGS. 5, 19 and 20, the recorder 41 would produce a record such as is diagrammatically presented in FIG. 4.

The representation of FIG. 4 is diagrammatic in several respects. First, the various tracks on a magnetic tape record are not normally visible. Second, they do not normally bear any indicia such as the identifying words on the various tracks of FIG. 4. Finally, the various track and tape dimensions of FIG. 4 are not shown to any common scale; however, a set of appropriate dimensions is presented below.

The tape medium 310 of FIG. 4 of course has two edges—a "reference" edge 311, which during operation is kept in firm (though sliding) contact with a reference surface on the scanner, and an opposite edge 321 whose position is not independently controlled. Separated from the reference edge 311 by a very narrow margin 332 is an "address track" 312, used for identification of video frames by number—and if desired also for other useful information such as date and time of live action, scene and take number, editing condition, and specific cues.

Separated from the opposite tape edge 321 by a similar narrow margin 337 are a first audio track 320, then a separation band or gutter 336, next a "control track" 319, then another separation band 335, and a second audio track 318. The two audio tracks are to be utilized in a generally conventional manner for stereophonic sound, and the control track is to be used for recording and retrieving raster-line and frame pulses necessary to proper playback and editing.

Between the address track 312 and the second audio track 318, and separated from those tracks by very narrow spaces 333 and 334 respectively, are diagonally arrayed video tracks 313a, 314a, 315a, 313b, 314b and 315b, which are intended to be understood as exemplary only, the entire recorded length of the tape being in practice substantially occupied by these color-information tracks. As exceptions to this statement there stand the narrow separation strips 330 between adjacent video tracks, and the generally triangular spaces such as 340 at the ends of the video tracks.

The diagonal tracks are grouped—by virtue of their content only—in sets of three, each set of three tracks carrying the three video color primary signals that "go together" to form the three color constituents of part of a single image. Information is laid down in these tracks essentially simultaneously, but in the preferred embodiment here described the adjacent tracks are not started and finished simultaneously. Thus, for example, some of the blue information recorded in track 315a corresponds to image portions whose red information is recorded in track 313a and whose green information is recorded in track 314a; while the rest of that blue information (in track 315a) corresponds to image portions whose red information is recorded in track 313b and whose green information is recorded in track 314b. These statements will be more clear in view of the discussion below of the electromagnetic scanner mechanism which produces these recorded tracks, but for the moment the point is that the three video color primary signals are in fact recorded simultaneously.

In a 655-line-per-frame format each of the video tracks 313a through 315b, and others of which these are exemplary, is very nearly eighty-one millimeters long, and the write speed of the scanner in these tracks is 38,706 millimeters per second. Thus the time required to scan one track is just over 0.002 second, and at twenty-four frames per second each track represents just under 0.05 frame or about thirty-three full raster lines. Very nearly twenty full sets of track "triplets" such as 313a, 314a and 315a in sequence produce one full three-color frame, with some slight overlap into adjacent tracks at one or both ends of the sequence, due to the adjacent-track-overlap phenomenon described in the preceding paragraph.

Although all the video tracks start the same distance 333 from the address track 312, when the video tracks are considered relative to their own longitudinal dimensions they of course appear to be staggered slightly. The stagger distance is very closely equal to the distance required to record one raster line; thus it is possible to start each track during the sync-tip interval—or at least during the blanking interval—between raster lines, thereby avoiding the image disruption that would otherwise result from changing tracks in the middle of a raster line.

Recording of "vertical-interval" information in any of the video tracks is illustrated symbolically or diagrammatically at the top of FIG. 4. The vertical interval is the period during which the scanning spot returns from the bottom of the raster to the top, to start a new frame. In my preferred embodiment that interval occupies the equivalent of nine raster lines of tape length—lines 653 through 655, and 1 through 6. The generally conventional vertical-interval signal waveform appears at 322 in FIG. 4, and the corresponding pattern of tape magnetization is shown at 323. The inter-raster-line separation points are at 324. The numerals "1" through "6" and "653" through "655" appearing at 325 in FIG. 4 are the raster-line numbers for a 655-line frame. It might be supposed from looking at the drawing that the information for frame 1 starts along line Z—Z for all the tracks that are crossed by that line—but, as previously mentioned, the information for corresponding instants in time is recorded with an offset along the lengths of the tracks. Rather, the drawing merely suggests the information array along some single one of the tracks, such as the blue-information track 315b.

In the raster lines 7 through 652 (not shown), the waveforms are of course not geometrically regular like those shown at 322, but rather vary with the visual details of the image being recorded.

Figure 5:
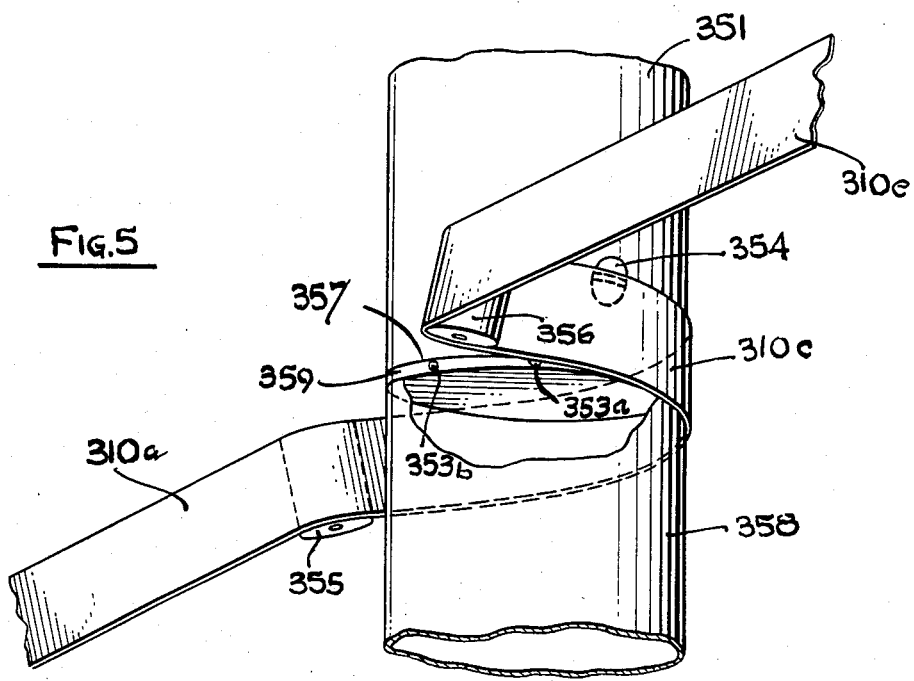
FIG. 5 is a rough perspective view of a six-head electromagnetic video scanner for use in the recorder of FIG. 1b, for producing the track pattern diagrammatically represented in FIG. 4. Additional details of the scanner appear in FIGS. 19 and 20.

The distance between lines X—X and Y—Y, along the various tracks, represents exactly half the circumference of the electromagnetic scanner drum that is shown in FIG. 5 and discussed below. Thus the overall track length, slightly greater than this "180-degree wrap" distance, represents contact of recording heads with the tape over about 190 degrees of arc around the scanner drum. It will be noted from the top of FIG. 4 that approximately one additional raster line can be recorded in the extra five-degree-wrap distances (1) before the scanner, moving effectively in the direction indicated by arrow 317, reaches the line Y—Y, and (2) after the scanner passes the line X—X. These overlaps provide a sufficient number of head-switching opportunities during horizontal-blanking intervals, near the end of each head's travel along a tape track, to strictly minimize the possibility of dropping picture information. Automatic circuits will thus reliably switch heads during blanking intervals even when tape elasticity and mechanical jitter are relatively severe.

My preferred embodiment contemplates reference-edge and opposite-edge margins 332 and 337, respectively, each 0.2 millimeter wide; an address track 312 which is 0.8 millimeter wide; audio tracks 320 and 318 which are each 0.8 millimeter wide; and a control track which is 0.4 millimeter wide. The distance 327 across the video tracks between the 180-degree wrap points is 19.7 millimeters, and the distance 326 across the entire area occupied by video tracks is 21.0 millimeters. The remainder of the 25.4 millimeters of tape width is distributed among the separation bands 333, 334, 335 and 336 as appropriate. Tape is moved parallel to the reference edge 311, in the direction indicated by arrow 316.

The recorded tracks are angled with respect to the reference edge 311, and thus with respect to the tape motion, by the angle A. In my preferred embodiment that angle is 14.1625 degrees. Each video track 313a, 314a, etc., has width 328 of 0.1 millimeter; the track pitch 329 is nominally 0.125 millimeter, based on a track separation band 330 that is 0.025 millimeter wide.

The audio tracks 318 and 320, and the address track 312, are recorded on the tape near the video scanner by suitably located conventional recording heads that will not be discussed further. The electromagnetic scanner that applies the video tracks 313, 314, 315 and the control track 319 is illustrated in FIG. 5.

The scanner itself is generally cylindrical, and consists of three basic elements: an upper stationary drum 351, a lower stationary drum 358, and—rotating in a slot 357 between the upper and lower drums—a thin disc 359 that carries the six video heads (see FIG. 20) 352a, 352b, 352c, 353a, 353b and 353c. The control-track head 354, though for diagrammatic purposes shown in FIG. 20 as if in the plane of the disc 359, is actually located stationarily in the upper drum 351, as shown in FIGS. 5 and 19.

Figure 19:
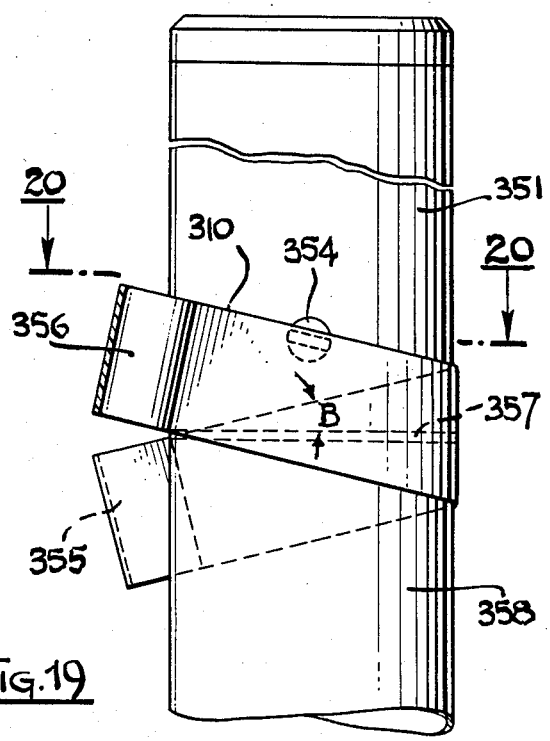
Figure 20:
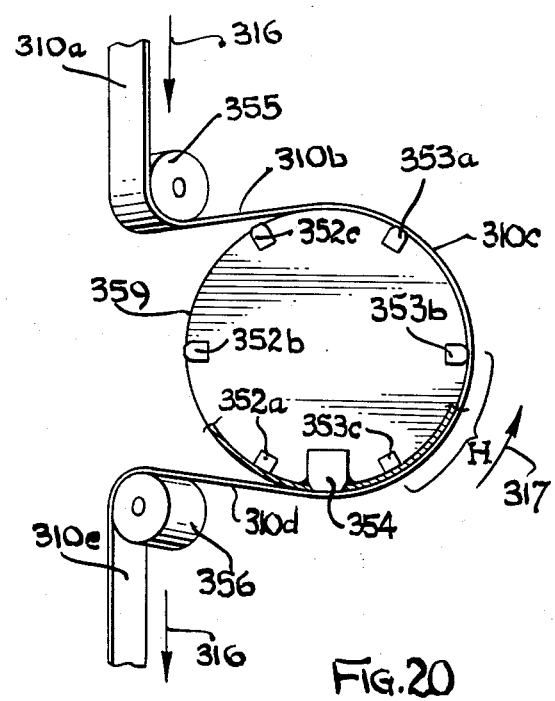

Video signals are conveyed to (in recording) and from (in playback) the six video heads by means of rotary transformers similar to those used in prior one-head or two-head video scanners, but the greater number of heads in the device of FIGS. 5, 19 and 20 requires elongation of the upper drum 351 (or lower drum 358 if preferred) to accommodate the additional rotary transformers arrayed within the drum along its axis.

If preferred, a functional scanner may be constructed using rotating upper and/or lower drum 351, 358; some prior one- and two-head scanners have been so constructed, particularly in applications using wider video tape (e.g., two-inch tape). My preference, however, is for the stationary-drum construction, particularly where the air-cushion effect provided by rotating the upper drum is unnecessary due to use of narrower tape.

The six video heads shown in FIG. 20, including those of the six which are visible in FIG. 5, each protrude very slightly beyond the cylindrical surfaces of the drums 351, 358, adding to the tape tension at the point of head contact and thereby improving the effectiveness of signal transfer between head and tape. In operation the disc 359 with video heads 352a through 353c spins rapidly—I prefer to operate the disc at 240 revolutions per second, using a drum diameter of 50.33 millimeters—while the tape is drawn around the drums and heads at a linear tape speed of 735.6 millimeters per second. Thus the disc and head speed, nearly 37.95 meters per second at their outer edge, is many times the linear tape speed, producing a sum relative velocity of tape to heads of 38.7 meters per second, as taken along the video tracks 313, 314, 315 of FIG. 4. The two velocities tend to add because, as shown by the arrows 316 and 317 in both FIGS. 4 and 20, the heads rotate in such direction as to meet the oncoming tape.

Angle B in FIG. 19 represents the angle between the longitudinal axis of the tape 310 and the plane of motion of the disc 359 and associated heads. I prefer to make this angle 14.434 degrees. If the tape 310 were stationary relative to the rotating heads, the track angle A (FIG. 4) would be identical to the angle B (FIG. 5). In that case, of course, the scanner would be able to record or read along only one video track, and each head would record or read along the same track as all the others. Motion of the tape past the heads permits displacement of the successive tracks along the tape length; that motion also tends to flatten the track angle A slightly, from the value of 14.434 degrees given above for angle B, to the value of 14.1625 degrees mentioned earlier for the track angle.

The flattening effect may be understood by seeing that a point further "uptape"—that is, further along the tape in the direction from which it is coming, to the left in FIG. 4—is pulled forward (toward the right in FIG. 4) to meet the scanner head as it moves from bottom toward top (in FIG. 4) of the tape.

Similarly, the motion of the tape past the head disc 359 serves to separate the tracks from one another, displacing them along the length of the tape. For example, when video head 352a (FIG. 20) approaches a point five degrees before point Y (FIG. 20), it can begin to lay down (or read) a track such as 313a (FIG. 4), starting at the lower right-hand end of that track. When head 352a has advanced roughly one-third of the way along track 313a, head 352b (FIG. 20) comes into position—five degrees before point Y—and can begin to lay down a track such as 314a.

During this one-sixth revolution of the scanner heads, one-sixth of 1/240 of a second has elapsed—that is, 1/1440 of a second—and in this time the tape has moved 735.6/1440=0.511 millimeter. Thus the starting point of the first track 313a has been pulled out of the way by 0.511 millimeter, making way for head 352b to start the next track 314a. Taking into account the trigonometric (sine of 14.1625 degrees) relationship between the spacing as measured along the tape length and the spacing as seen perpendicular to the track lengths, the video track pitch is 0.125 millimeter as previously mentioned.

When head 352b has advanced roughly one-third of the way along track 314a, head 352c comes into position to lay down a blue-information track 315a, and as before the tape motion has displaced the starting point of track 314a to the right (FIG. 4) to permit the head 352b to avoid the previously started blue-information track 314a. Following the description presented so far, all three heads 352a, 352b and 352c arrayed along the lower half (as seen in FIG. 20) of the disc 359 are now engaged with the tape 310—corresponding very generally to the situation illustrated in FIG. 5 rather than that in FIG. 20.

Next, as red-information head 352a approaches the end of the red-information track 313a, actually ten degrees of scanner rotation before the end of the tape-contact arc, the second red-information head 353a (FIG. 20) comes into contact with the tape and begins to lay down or read track 313b (FIG. 4). One-third revolution later the second green-information head 353b (FIG. 20) begins to lay down or read track 314b (FIG. 4), and one-third revolution after that the second blue-information head 353c (FIG. 20) begins track 315b (FIG. 4); and very shortly the first three heads discussed rotate completely out of contact with the tape, producing the situation shown in FIG. 20.

From the above it may be seen that each triplet of tracks, produced by one-half revolution of the head disc 359, occupies a "pitch" distance 331 (FIG. 4) of 0.375 millimeter, as measured perpendicular to the track lengths; and each pair of triplets, produced by a full revolution of the head disc 359, occupies 0.75 millimeter as measured in the same way. The distance along the tape length corresponding to each full head-disc revolution is 3.1 millimeters, and the distance along the tape length coresponding to each full video frame is twenty times the distance required per triplet, or ten times the distance required per revolution of the head disc 359—i.e., approximately thirty-one millimeters.

The relative heights of the rollers 355 and 356, along the longitudinal dimension of the drum assembly 351/358, together with the angles of the rollers 355 and 356 relative to the axis of the drum assembly, establish the tape angle B relative to the scanning plane, provided that the reference edge 311 of the tape 310 firmly engages a suitable reference flange on each of the rollers 355, 356. A great variety of arrangements may be employed to obtain correct positioning of the rollers 355 and 356 relative to the drums 351 and 358, but I prefer to mount the rollers 355 and 356 for rotation of their axes relative to the axis of the drum assembly 351/358, while controlling very closely the distance between the centers of rotation of those axes. The tape 310 then acts to orient the rollers into effective parallelism—as considered relative to the "unwrapped" tape plane—and the controlled inter-axis distance establishes the proper tape-to-head angle B.

At peak-white frequency set to fifteen megahertz, or lower (e.g., point 175 in FIG. 3), and 50 microinch gap in each video head—leading to the assumption of 100 microinch minimum recordable "wavelength" on the tape—the write speed must be at least fifteen megahertz times 100 microinches, or 1500 inches per second (381 meters per second). Thus the various parameters specified in the foregoing scanner and tape-track description are adequate for systems in which peak-white frequency is as high as fifteen megahertz, blanking frequency is as high as 12.85 megahertz, sync tip as high as twelve megahertz, and video-signal bandpass as high as ten megahertz—retaining the relationships between these frequency assignments shown in FIG. 3.

For the higher-frequency systems represented in the bottom two portions of FIG. 3, correspondingly increased write speeds are required: 1700 inches per second at seventeen megahertz (point 185 in FIG. 3), 2000 inches per second at twenty megahertz (point 195 in FIG. 3), and so forth. In the alternative, more modest write speeds can be used if finer head gaps can be reliably provided. Write speed is increased by increasing the rotation rate of the head disc 359 (FIGS., 5 and 20), with corresponding shifts in linear tape speed to keep adjacent tape tracks separated, and with other corresponding changes in the associated system parameters.

Very recent experimental reports indicate that a single-track system can be made available, by straightforward modification of commercial units, that is capable of accepting encoded, interlaced video-signal bandpass up to fourteen megahertz, with carrier modulated to peak white at twenty megahertz—essentially the frequency relations suggested in the bottom portion of FIG. 3, but of course with totally different formatting and other operational conditions.

My analysis based on these reports indicates that the same frequency allocations can be achieved in an operational three-track system, for recording unencoded, noninterlaced three-primary-color video, generally as described above. I have assumed the use of standard high-energy cobalt-doped tape, longitudinally oriented, and signal-to-noise ratio of forty-five decibels, in my calculations on a fifteen-megahertz-peak-white system. In the faster systems discussed above, one alternative to increasing write and tape speeds in proportion to the frequency increase is to accept some degradation of signal-to-noise ratio—to, for example, forty-two or forty decibels. Even these lower values equal or exceed the effective signal-to-noise ratio of "circulation"-quality widescreen cinema film.

Figure 6:
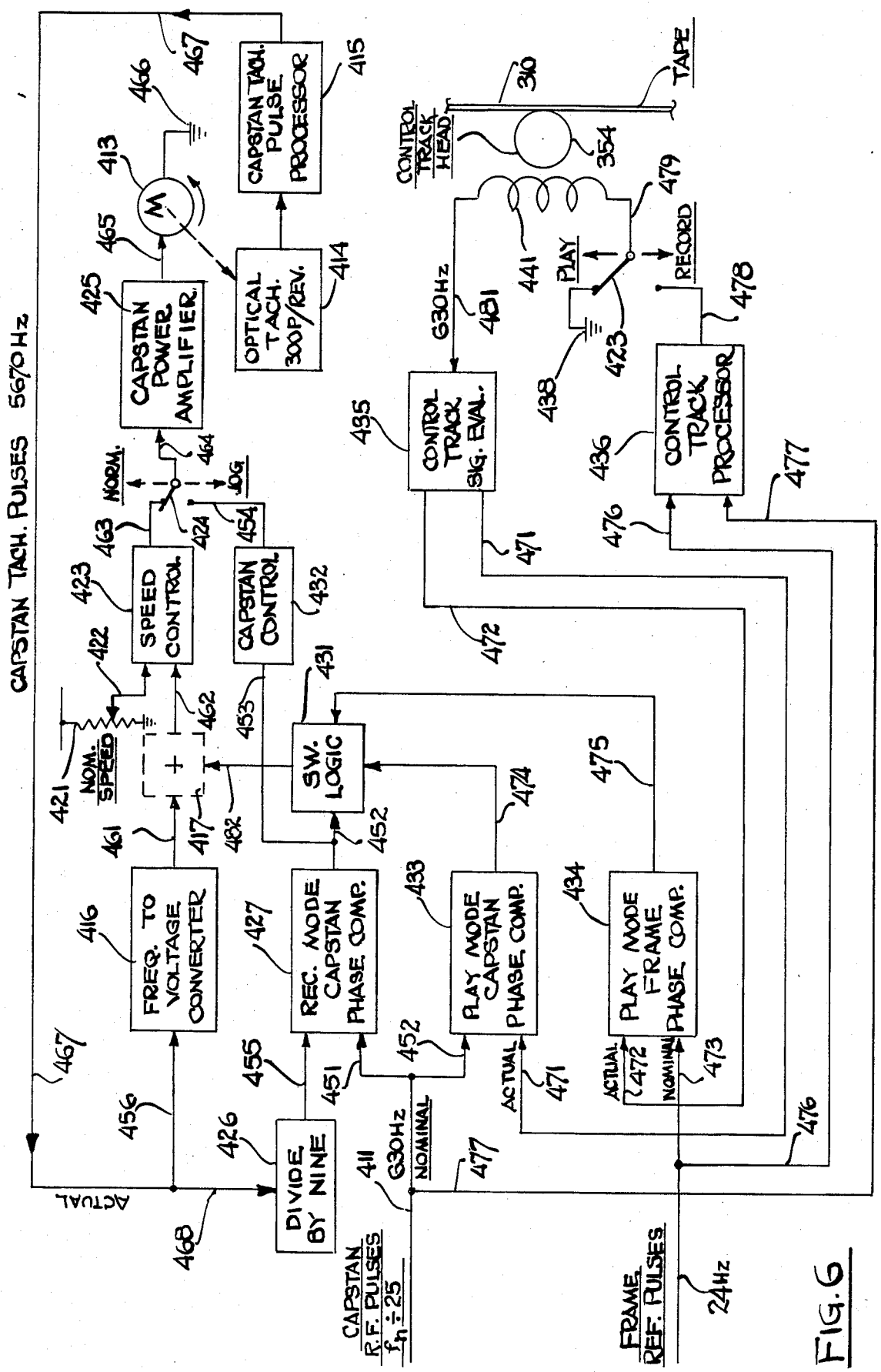
FIG. 6 is an electronic block diagram of a capstan servomechanism control system, for use with the scanner of FIGS. 5, 19 and 20 in the recorder of FIG. 1b.

FIG. 6 affords an example of the detailed modifications necessary to each module of a state-of-the-art video recorder/playback unit to obtain overall compatibility with preferred embodiments of my invention. The following discussion of this circuitry will be recognized by those skilled in the art as showing both (1) that my system is feasible, in that—with the exceptions of scanner and tape-track features, scan rate, raster format, frequency allocations, and color-signal handling previously discussed—my system follows established design principles of video technology, and (2) that successful practice of my invention requires careful attention to the parameters of each module in a video camera chain and/or video recording device, to ensure synchronism and otherwise compatible operation throughout.

The module shown in FIG. 6 is a capstan servomechanism whose purpose is to ensure that the playback speed of a video recording will be precisely the same as the speed at which the recording was made, and that the recording speed is "fine-tuned" from a nominal speed setting, in such a way that the actual recording speed is very accurately constant.

During the making of a recording, reference pulses derived by dividing raster-line "sync" pulses by twenty-five are applied as "capstan reference pulses" to an input terminal 411 of the FIG. 6 circuit. The nominal frequency of this reference signal is approximately 630 hertz, and as it is derived from dividing down a crystal-controlled-oscillator output signal it is very constant. Assuming that the system is operating at 655 lines per frame, the capstan reference pulse is further divided down (outside the circuit of FIG. 6) by the factor 655, to obtain a frame reference pulse—a square wave of period 655 times the raster-line period—which is applied to another input terminal 412 of the FIG. 6 circuit. It will be understood that the frequency of the frame reference square-wave pulse is very nearly twenty-four hertz, by virtue of the manner of deriving this signal.

Still with regard to the making of a recording, the capstan reference pulses are applied at 477, and the frame reference pulses are applied at 476, to a control track processor 436 where they are suitably buffered, properly squared off, and added together. The composite signal is then applied at 478 to one terminal of a switch 437, which during recording passes the composite signa-1 at 479 to the coil 441 of the control track head 354 (also shown in FIGS. 5, 19 and 20). The control track head impresses the composite signal on the control track (319 in FIG. 4) of the magnetic tape 310.

Although the composite signal proceeds via signal line 481, evaluation unit 435, signal lines 471 and 472, phase comparators 433 and 434, and signal lines 474 and 475 to the switching logic unit 431, the effect of the composite signal is cut off at that point, and so has no influence on the operating speed of the capstan. The only effect of the composite reference pulses during recording is that they are recorded on the tape 310.

Meanwhile the capstan reference pulses injected at the input terminal 411 are also applied at 451 to a "record-mode capstan phase comparator" 427. Here the reference pulses, representing the correct capstan velocity, are compared with another pulse train that represents the actual capstan velocity. The result of this comparison will be described shortly.

The actual-capstan-velocity pulse train is derived from an optical tachometer 414 that senses the actual operating speed of the capstan motor 413. Electrooptically generated pulses from the tachometer 414 are squared off in a capstan-tachometer pulse processor 415 and applied at 467 and 456 to a frequency-to-voltage converter 416, and are also applied at 468 to a divide-by-nine logic circuit 426.

The frequency-to-voltage converter 416 responds to the frequency of the tachometer pulses by generating a proportional voltage, which is directed at 461 to a summing circuit 417, and thence at 462 to speed-control unit 423. Disregarding for the moment the other input channel 482 to the summing circuit 417, one can see that the speed-control unit compares the frequency-proportional signal received at 462 with a nominal-speed signal received at 422 from a manually set potentiometer 421, with associated voltage supply. The speed-control unit 423 derives an output signal whose magnitude varies with the difference between the nominal-speed voltage at 422 and the actual-speed voltage at 462.

This output signal 463 represents a correction that must be applied to the capstan motor speed, to bring it to its nominal value. The speed-control output signal 463 is applied via switch contact 424, in "normal" operation, and signal line 464 to the capstan power amplifier 425—where it is used to control the amount of electrical power applied at 465, relative to ground 466, to drive the capstan motor 413. In this way the servomechanism circuit is made to drive the capstan and thus the tape 310 at the nominal tape speed.

It will be recalled that nothing has been said as yet about the use of the capstan reference pulses applied at 451 to the record-mode phase comparator 427, nor has the capstan speed as yet been described as bearing any relationship—other than a "nominal" one—to the crystal-controlled raster-line rate.

To fine-adjust the capstan speed to not merely a nominal rate but precisely the constant rate required for optimum performance, the processed capstan-tachometer pulses are—as mentioned earlier—also applied to a divide-by-nine circuit 426. Based on a convenient and conventional 300-pulse-per-revolution output from the optical tachometer 414, and conventional capstan-to-tape dimensional relations and the desired tape speed, the output signal at 455 from the divide-by-nine circuit 426 is very close to the crystal-controlled frequency of the capstan reference pulses at 451. This will be true, that is, if the potentiometer 421 is set correctly.

The record-mode capstan phase comparator 427 now performs a very close comparison of the pulse train at 451, representing correct capstan speed, with the pulse train at 455, representing actual capstan speed. With the capstan held at a speed close to nominal by the relatively coarse feedback operation previously described, the capstan phase comparator 427 can compare the phases of the two pulse trains, derive an internal signal related to the phase difference, and from this produce a d.c. output signal that reflects the tendency of the actual-speed pulse train at 455 to fall behind or to creep ahead of the correct-speed pulse train at 451.

In short, a phase-difference signal developed within the phase comparator 427 is used to generate a variable d.c. voltage output, and the latter is applied at 452 to the switching logic unit 431. During recording this d.c. voltage is directed at 482 to the summing unit 417, where it provides a fine-adjust correction voltage that is superposed upon the raw tachometer-frequency-proportional voltage 461 in the major servo loop discussed earlier.

The adjustment signal applied at 482 thus influences the voltage applied at 462 to the speed control 423, and consequently the control signal applied at 464 to the capstan power amplifier 425, and ultimately the power to and speed of the capstan motor 413. The result is to hold the capstan speed very nearly constant during recording.

During playback the switching logic circuit 431 cuts off the record-mode capstan phase comparator's output signal 452, and passes instead the sum of the signals at 474 and 475 from the play-mode capstan and frame phase comparators. These signals are derived from the signals previously laid down, during video recording, on the control track 319 of tape 310, as will now be described. During playback the "play/record" switch 437 is set to the "play" position, so that the composite reference pulse train from the control-track processor 436 is blocked from reaching the coil 441 of the control-track head 354; instead one side of the coil 441 is connected through the switch 437 to ground at 438.

In this configuration, signals on the control track 319 of tape 310 are transferred by the head 354 and coil 441 to the signal line 481 that enters the "control track signal evaluation" unit 435. It will be recalled that the control track carries a composite recorded signal corresponding to superposition of the capstan reference pulses (originally received at input terminal 411 of the FIG. 6 circuit) and frame reference pulses (originally received at input terminal 412). These two separate pulse trains are reconstructed by the "control track signal evaluation" unit 435, and applied at 471 and 472 respectively to a "play-mode capstan phase comparator" and a "play-mode frame phase comparator" 433 and 434. The functions served by these two units are very similar to that served by the record-mode capstan phase comparator discussed earlier.

In particular, during playback the nominal speed-control or primary servo loop—already described—functions just as before. That is to say, the tachometer 414, pulse processor 415, frequency-to-voltage converter 416, speed control 423 and capstan power amplifier 425 all operate as before to place the capstan speed at its nominal value as established by the nominal-speed potentiometer 421. Now, however, the fine-adjust signal summed with the frequency-proportional voltage 461 in the summing unit 417 is no longer derived from the record-mode capstan phase comparator. That signal is cut off by the switching logic 431, and replaced by the sum of the play-mode phase comparator signals 474 and 475.

The play-mode capstan phase comparator compares the phase of the correct-speed pulse train at 452, from the crystal-controlled sync-generator oscillator, with the phase of the actual-speed pulse train at 471, from the control track head 354—i.e., from the tape. When the tape-derived actual-speed pulses tend to fall behind or creep ahead of the sync-derived correct-speed pulses, the play-mode capstan phase comparator 433 produces a d.c. voltage output at 474 which represents the needed adjustment in capstan speed. The signal at 474 is passed by the switching logic circuit 431 for application at 482 to the summing unit 417, where it fine-adjusts the capstan velocity as required.

In play mode, however, there is an additional requirement on the capstan drive—namely, that each frame that is played back from the tape be in synchronism with the frame presentation by other recorders, or by cameras or special-effects devices, that are in use in combination with the playback recorder. To achieve this, the frame pulses 472 from the control-track signal evaluation unit 435 are compared in the play-mode frame phase comparator 434 with the frame reference pulses at 412 and 473. The phase difference is caused to generate a correction voltage at 475, which also passes through the switching logic unit 431, is summed with the capstan-phase comparison signal 474, and is applied at 482 to the summing circuit 417.

Thus, when the apparatus is first switched on, the capstan-speed error signal at 474 is virtually ignored while the system pulls the capstan speed ahead or drops it back so that the video frames recorded on tape 310 can be brought into synchronism with the frame presentation elsewhere in the system. Once this "frame lock" is achieved, the frame phase comparator error signal 475 essentially disappears, and the system settles down to continuous fine adjustment of the capstan speed on the basis of the capstan phase error signal 474. The resulting raster rate is essentially independent of any tape distortion occurring between recording and playback.

Occasionally it is desirable to "step off" or "emit" only a limited amount of the recorded video on tape 310—for example, only a single frame, or only a few frames. Various such applications will be discussed later, generally involving transfer to another storage device or a tape-to-film transfer device. In such applications it is often not permissible to wait for the primary servo loop to equalize capstan speed based on signals from the tape, and in essence "brute force" must be used to bring the capstan to speed immediately, based on the sync-derived reference pulses at 411 and 451. The "normal/jog" switch 424, when set to "jog," permits such operation. The bypass route through signal line 453, capstan control circuit 432, and line 454, applies the full phase error as between sync-derived correct speed and tachometer-derived actual speed to the capstan power amplifier.

While this technique facilitates abrupt "jogging" of limited video information out of the magnetic record, it does not ensure that the frame or raster-line rate of the information thus retrieved will be correct, since the tape recording is subject to dimensional instability—and correct capstan speed is therefore not the same thing as correct tape speed. When the information is being "jogged" into, for example, a frame-storage device, however, the frame or raster-line rate need not be precisely correct, for the storage device will simply accept the information and store it into appropriate storage elements, with relatively little sensitivity to the accuracy of frame or line rate.

As pointed out earlier, the operation of the FIG. 6 module as just described is conventional except for the differences in numerical values and the setting of the speed potentiometer 421.

Figure 7A:
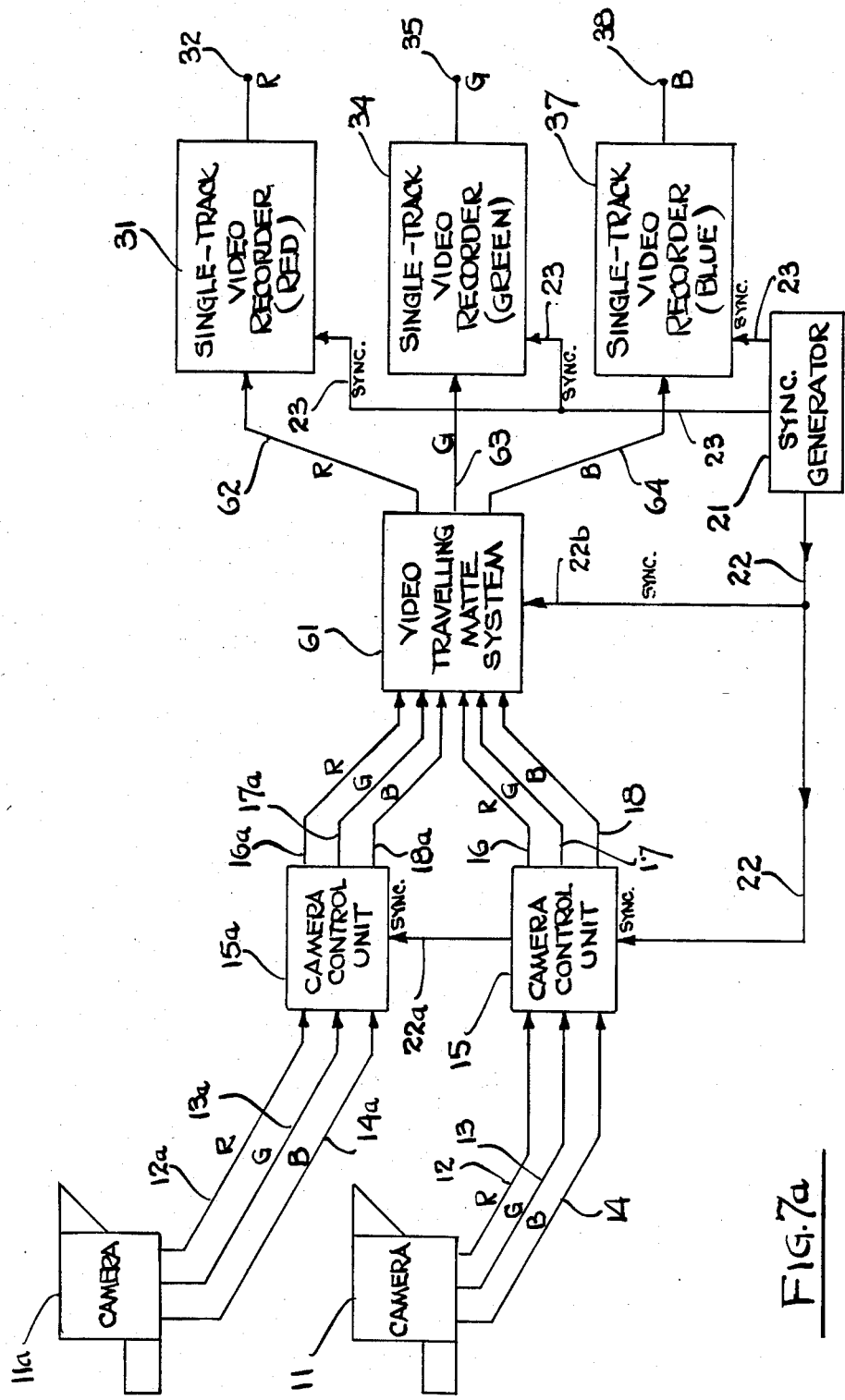
FIG. 7a is a block diagram showing a variation of the FIG. 1a apparatus configuration; in this variation an additional camera and a traveling-matte system are added to the FIG. 1a configuration.
Figure 7B:
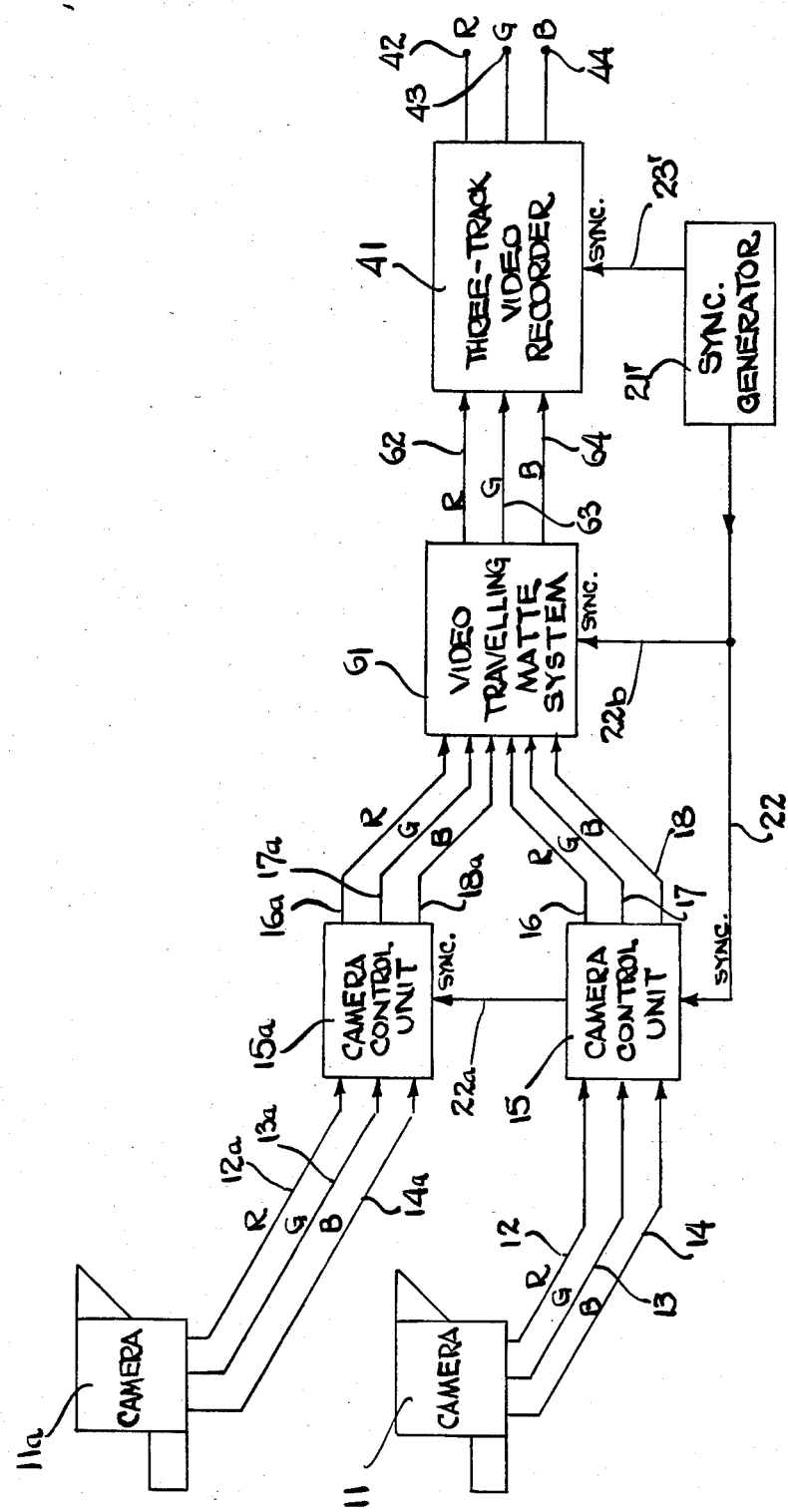
FIG. 7b is a block diagram showing a variation of the FIG. 1b apparatus configuration; in this variation an additional camera and a traveling-matte system are added to the FIG. 1b configuration.

FIGS. 7a through 16 take a broader view of the potentialities of use of my invention. The configuration of FIG. 7a is one which I have assembled and tested, using the noninterlaced scanning of FIG. 2 (left side), and the 10.85-megahertz carrier and eight-megahertz video passband in the center diagram of FIG. 3. In place of the single camera and control unit of FIGS. 1a and 1b, two cameras 11 and 11a and associated control units 15 and 15a were provided in conjunction with a video traveling matte system 61, similar to that described in the aforementioned patent. It is to be understood that the traveling matte system shown in this drawing, and in the other drawings shortly to be discussed, is intended as representative of a variety of special-effects devices for combining plural images from plural video cameras (or recorders) or for modifying a single image from a single video camera (or recorder)—e.g., faders, dissolvers, montagers, or title applicators.

The two cameras and traveling matte unit of FIG. 7a, together with the sync generator 21 in its operational control upon the cameras, control units and traveling matte unit, constituted a source of independent primary color video signals 62, 63 and 64—the terms "primary color" and "independent" being used in the same senses as defined earlier. The three independent primary color signals 62, 63 and 64, respectively carrying red, blue and green information from common images, were recorded on three separate single-track video recorders 31, 34 and 37, respectively, the recorders being subject to control from the same sync generator 21 as controlled the cameras and matte unit.

In this operation the cameras 11 and 11a, and the control units 15 and 15a, were of the type available commercially together under the make and model designation "IVC 7000." The matte unit was of a type known commercially as "Sonex R-Matte," and the recorders were each of the type available commercially under the designation "IVC 9000."

All of the camera and recorder units were modified to handle video passband frequencies up to about eight megahertz or higher, sync-tip frequencies of about ten megahertz or higher, and peak-white carrier frequencies of about thirteen megahertz, generally as shown in the center portion of FIG. 3. The IVC segmented-helical-video tape machines were modified to operate at twenty-four frames per second, from the thirty-frame rate which is standard in the United States. This modification was accompanied by increase of the tape speed from eight to 8.96 inches per second, the video scanner speed from 1500 to 1680 inches per second, the unmodulated carrier frequency from nine to 10.4 megahertz, the demodulator video bandwidth from eight to ten megahertz, and the demodulator radio-frequency stages to accommodate the new carrier and deviation frequencies.

The lower frame rate, and higher speeds and frequencies, permitted both the addition of 130 raster lines per frame and the recording of more image-detail information in each line. The tape head was caused to scan fourteen times per frame, in 655/24 frame format, rather than ten passes as is standard with 525/30 frame format. The scanner rotation was increased from 9000 to 10,080 revolutions per minute.

To readers familiar with the IVC 9000 units, some additional information about the modifications may be helpful in facilitating the practice of my invention. The input tape-sync processor boards number 1, 2 and 4 were modified. Those circuits normally function as a sync generator, operating at 525/30 frame format on the basis of standard integrated-circuit chips that are made for just that frame format. No such chips were available for 655/24 format; therefore it was necessary to build the equivalent using individual, simpler integrated-circuit chips. The off-tape processor boards were also modified.

The video input board was "wide-banded"—that is, the low-pass filter was extended from eight to ten megahertz. The demodulator radio-frequency stages were changed to handle the higher carrier frequency range of roughly ten to thirteen megahertz. The demodulator video circuit board, originally designed to handle only up to eight megahertz, was modified to handle up to ten. The shaper board was also modified, to obtain better signal-to-noise ratio and better detail by taking advantage of the lack of need to handle encoded-color signals. The preemphasis and postemphasis were changed in view of this relaxation of constraints.

Although it was not necessary for the purposes of the test to modify the "gen lock" board, in routine practice it would be appropriate to do so to permit locking the apparatus to an external 655/24-format system.

The scanner vertical loop had to be modified because the period required in a twenty-four-frame system is twenty-five percent larger than that required in a thirty-frame system.

The tape-tension servomechanism was adjusted to accommodate the higher tape speed and therefore tension adjustment speeds. The tension modulator was recommutated as part of this operation. The scanner-motor drive amplifier was changed to provide the higher scanner speed, and the scanner servo regulator was modified from plus-or-minus thirty to plus-or-minus thirty-three volts, again to achieve the higher scanning speed. The saturating track processor had to be changed to handle the twenty-four-frame rate instead of the standard thirty-frame rate, as did the character generator. For editing purposes the capstan servo circuits were modified to permit "locking up" the capstan faster—namely, within a second, rather than the standard time of nearly three seconds.

Not shown in FIG. 7a is a three-channel processing amplifier which was used in the actual equipment assembly to add sync, "set-up" and "reference burst" to the camera signals so that the tape recorders' time-base-corrector and velocity-compensator systems would operate properly.

For the test the cameras were fitted with anamorphic lenses, to squeeze a widescreen-shape optical image down into standard plumbicon (1.33-to-one) format. The plumbicons used were twenty-five-millimeter units.

Figure 8A:
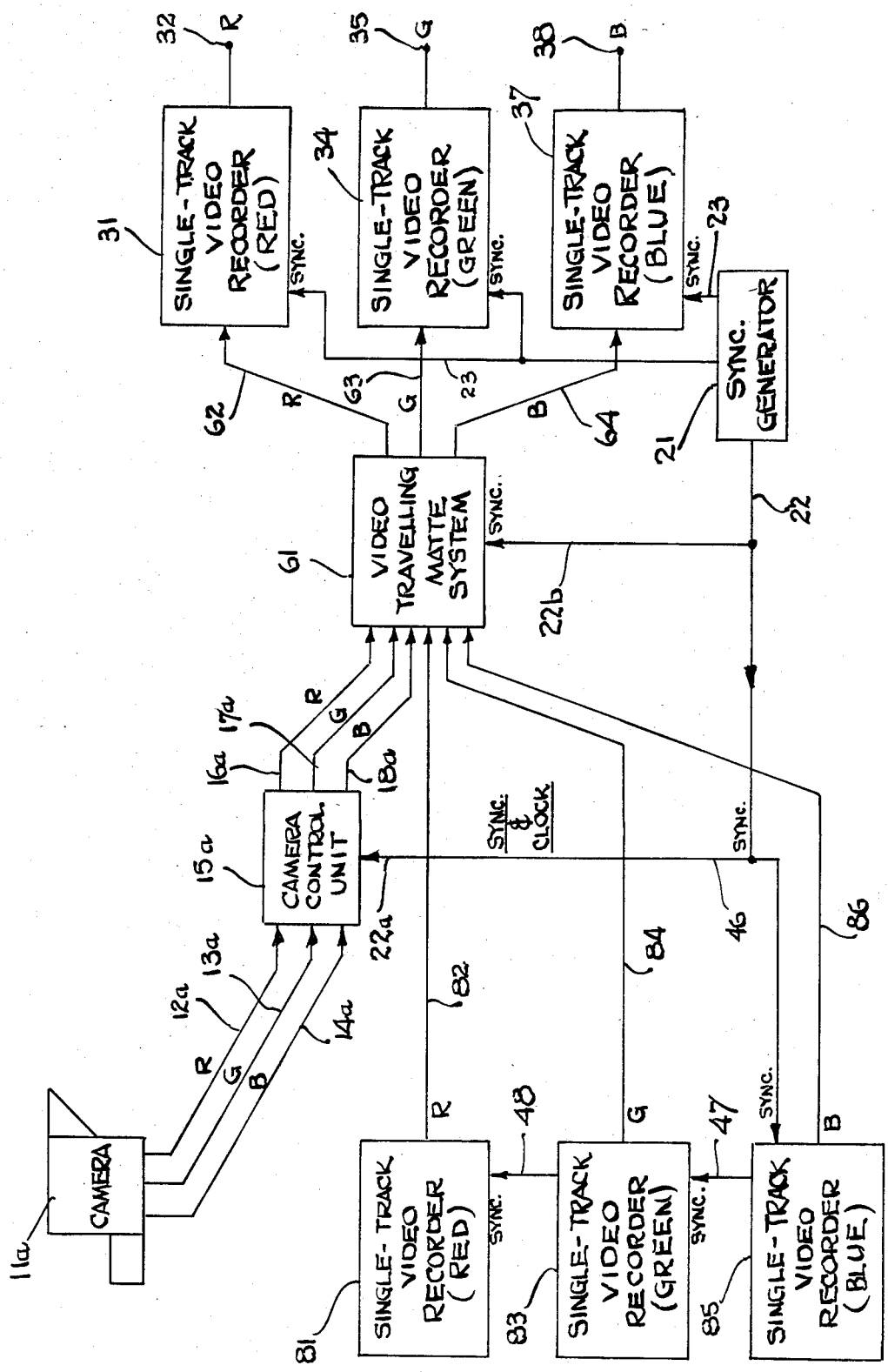
FIG. 8a is a block diagram showing another variation of the FIG. 1a apparatus configuration; in this variation three single-track recorders and a traveling-matte system are added to the FIG. 1a configuration.

One camera was exposed to a background image, and the other camera to a foreground image, while the two camera triplex outputs were directed to the matte system as shown in FIG. 5. The composite output from the matte unit was fed to the three-channel processing amplifier and then the three tape machines, as previously stated. Next the three tape recordings were substituted as inputs for one of the camera signals, as shown in FIG. 8a. In this apparatus configuration six essentially identical modified IVC 9000 single-track recorders 81, 83 and 85 were employed, in combination with a single camera 11a and control unit 15a. The double-composite image information from the matte unit was recorded on three of the modified IVC recorders 31, 34, 37.

It is equally feasible to substitute another set of three recorders 81a, 83a, 85a for the camera 11a and control unit 15a, as illustrated in FIG. 9a. The various combinations of superposition arrangements conventionally available with encoded-color equipment are thus equally practicable using separate-primary-color signal handling, but with the advantages already discussed for my separate-color technique. Certain of these advantages are particularly salient in multiple-superposition applications, where fine definition of color details is preserved through all the superposition steps to obtain an extremely realistic rendition of each element of the composite.

The tested configurations of FIGS. 7a and 8a can be improved by substituting a single three-track video recorder 41 (FIGS. 7b and 8b) for the receiving or "output" array of three separate single-track recorders that was tested. Similarly the three input recorders 81, 83, 85 of FIG. 8a can be replaced advantageously by a single three-track video recorder 91 as in FIG. 8b, and the other three input recorders 81a, 83a, 85a of FIG. 9a can be replaced to like advantage by another single three-track video recorder 91a as in FIG. 9b.

Each of the three-track recorders 41, 91, 91a would be constructed with the novel scanner illustrated in FIGS. 5, 19 and 20, to lay down video tracks in patterns generally as shown in FIG. 4, based on noninterlaced (left side of FIG. 2), unencoded independent color primary video signals. As may be apparent from the drawings, the corresponding reference numerals in FIGS. 1a, 1b, 7a, 7b, 8a, 8b, 9a and 9b—as well as corresponding or similar reference numerals appearing in drawings yet to be discussed—identify corresponding apparatus elements.

After completion of the recording test procedures described above with reference to FIGS. 7a and 8a, the recorded video was further processed to obtain a projectable color film positive based on the video-recorded image information. This further processing involved four steps, using equipment assemblages diagrammed in FIGS. 10b and 11, and performing the image-information transfer processes summarized in FIG. 12.

The first two processing steps were aimed at preparing a video-tape intermediary carrying all three sets of primary color signals in sequence (rather than in parallel array as in FIG. 4) on a single video recording; the third step was to prepare a monochrome film intermediary, which similarly had sequential frames bearing the primary color information for each common image; and the fourth step was to prepare a color negative by appropriately combining the primary color information from the sequential triplets of monochrome frames. These four steps will now be described in greater detail.

The first step was a preliminary one in which a tape which was intended to function as the master (sequential assemblage) intermediate tape was first prerecorded with so-called "color-black" information, using a single-track video recorder modified as described earlier. The unmodulated carrier in the recorder corresponds to "blanking"—that is, to visually displayed black—so there was no need for a source, as such, of color-black information. (As will be seen, the essential part of this recording is the horizontal and vertical synchronization pulses, not the blank "picture" content. Thus the phrase "color-black" used throughout this discussion is just a shorthand way of referring to a tape that is blank except for synchronization data.)

Since essentially the entire tape was prerecorded with color-black, operating the recorder continuously, the relative spacing of the successive frames was not susceptible to the kinds of errors that can be introduced by insertion editing of single frames. The tape 370, with all frames 372A through (exemplarily) 372K recorded color-black, is represented at the top of FIG. 12. The numerals 371 represent location information recorded on an address track with the video black.

Figure 10A:
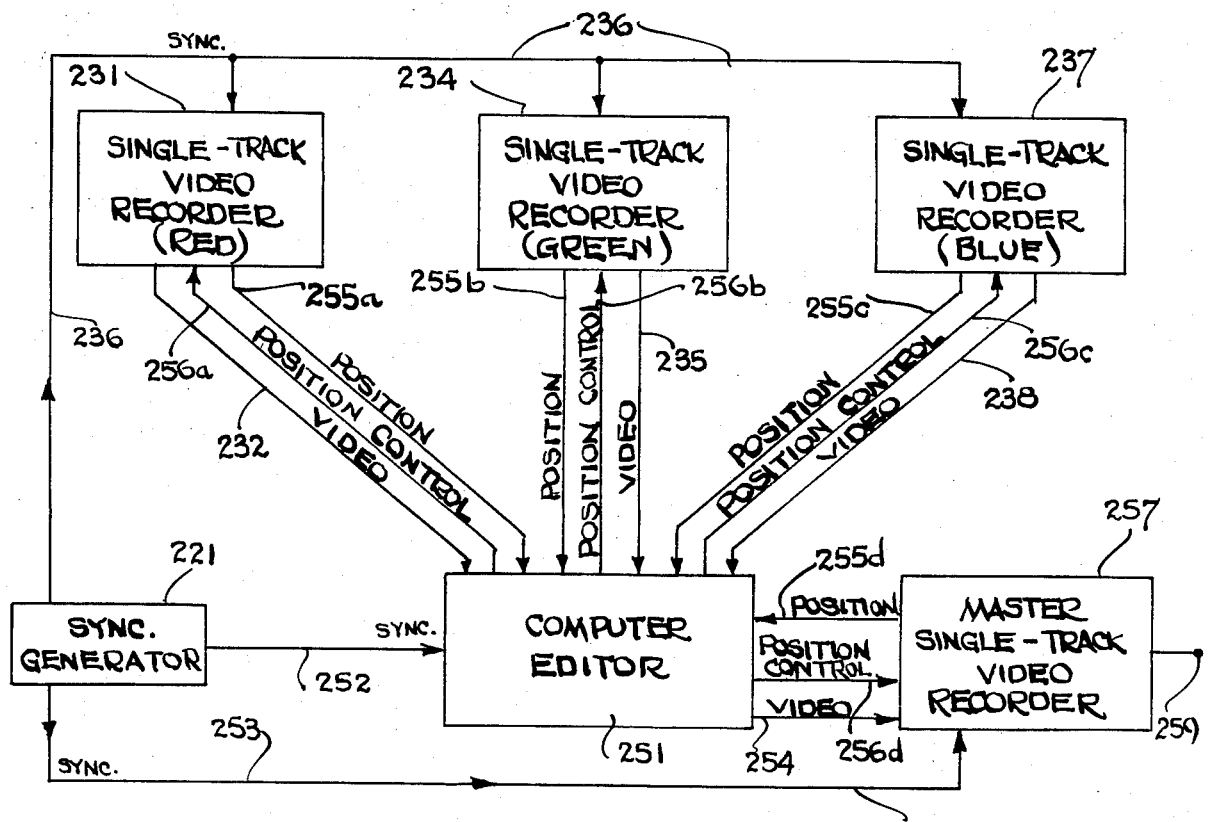
FIG. 10a is a block diagram showing a conforming editor and four single-track recorders used to transfer information from a three-parallel-tape recording of primary color video signals to a single-sequential-tape format.
Figure 10B:
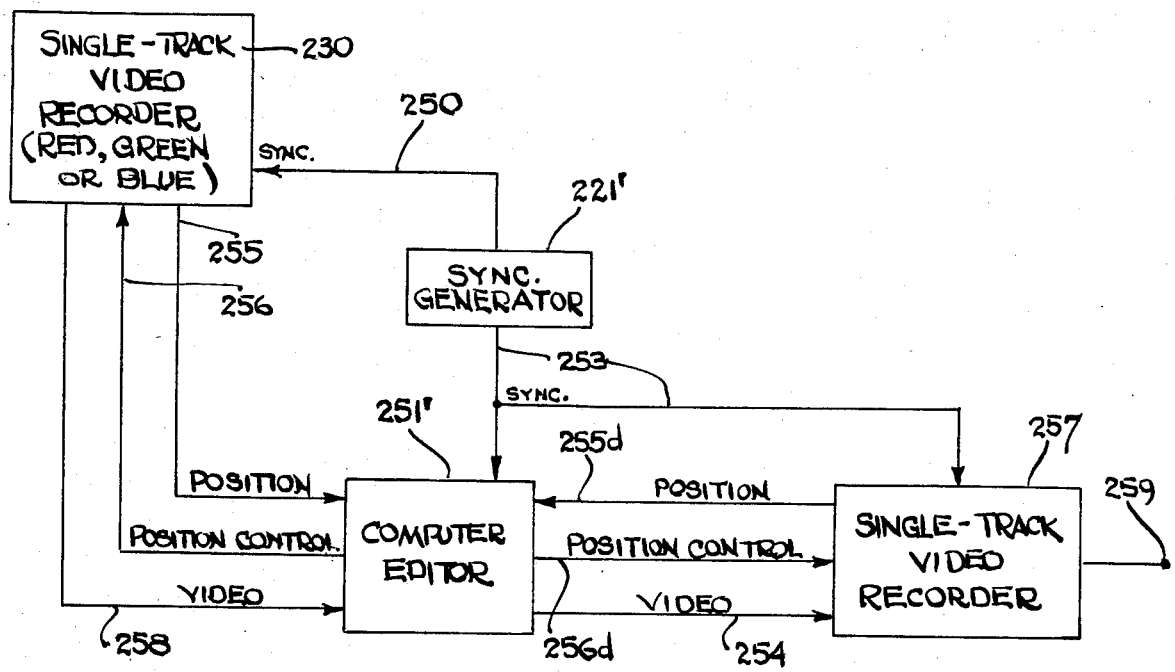
FIG. 10b is a variant block diagram showing a conforming editor and two single-track recorders used to effect the same information transfer as in FIG. 10a, but capable of handling only one tape of the three-parallel-tape recording at a time.

This prerecorded-black tape was rewound, and the recorder 257 on which it had been prepared was placed in the equipment assemblage shown in FIG. 10b. The computer editor 251' of FIG. 10b was a "breadboard" version of a type commercially available under the name Datatron, modified for twenty-four-frame-per-second operation, and the input tape recorder 230, operated in playback mode only, was another of the modified IVC 9000 units. The red-information tape recorded in the single-track video recorder 31 (FIG. 7a) was loaded into the similar recorder 230 (FIG. 10b), and all the frames on the red-information tape were transferred to every sixth frame (that is, the first, seventh, thirteenth, nineteenth, etc.) of the master tape.

The computer editor found the successive frames on the input (red information) tape and found the appropriate frames on the master tape, "phased up" the time code number with the appropriate frame code on the master tape, and when the two machines were synchronized signaled the transfer of one frame. In each such transfer there is generally a minor error in synchronism, but only every other master-tape frame was used, and the prerecorded color-black frames (rather than the newly recorded color-image frames) were used for phase matching; in this way the synchronism errors were prevented from accumulating.

FIG. 10b illustrates symbolically the equipment used in some of the process that has just been described. Position signals were obtained by the computer editor 251' at one input line 255 from the input recorder and at another input line 255d from the master or receiving recorder. The computer editor controlled both machines to position themselves at the appropriate frames by control signals at 256 to the input (playback) machine and at 256d to the master machine. The sync generator 21' provided sync signals to the input machine at 250 and to the editor and master machine at 253. Video flowed from the input machine 230 via 258 and 254 to the master machine 257.

The process just described, using the equipment of FIG. 10b, may be referred to FIG. 12a: successive red-information frames, such as those at 313 on tape 310R in FIG. 12a, are edited into every sixth frame of the previously prerecorded-color-black tape 370. For example, the red frame 313 at position "1" of tape 310R is transfered to position "1" on the master tape 370', becoming red frame 373A there. The next red frame on the red-information tape 310R, at position "2" of that tape, is transfered to position "7" on the master tape 370', becoming red frame 373B shown there; and so forth.

After the entire test footage of red information was transferred to the master tape in this way, the red-information tape 310R was rewound and removed from recorder 230, and the green-information tape 310G (FIG. 12a) from recorder 35 (FIG. 7a) was loaded onto the input machine 230. The successive green-information frames, 314 in FIG. 12a, were edited by the computer editor 251' into frames number three, nine, fifteen and so forth—as shown at 374A and 374B in FIG. 10—of the master monochrome tape. It will be noted that the intervening prerecorded color-black frames 372B and 372H have been skipped.

Next the green-information tape 310G was likewise rewound and removed from recorder 230, and the blue-information tape 310B from recorder 37 (FIG. 8a) was loaded onto the input machine 230. The successive blue-information frames were edited by the computer editor 251' into frames number five, eleven, seventeen, and so on—as shown at 375A and 375B in FIG. 10—of the master monochrome tape. Again, the intervening prerecorded color-black frames 372D, 372F, 372J, etc., have been skipped.

The editing functions just described were programmed into the editor 251' by hand-wiring a program board to perform the desired frame selections and other steps. In a production context a microprocessor can readily be prepared with the desired editing functions built in, and at least one major equipment manufacturer has been working on an "animator" chip which could be used to perform the functions of the editor 251'—namely, to keep track of the input-tape frame locations and the corresponding desired master-tape frame locations, and phase up and key the two machines to perform the transfers.

Figure 8B:
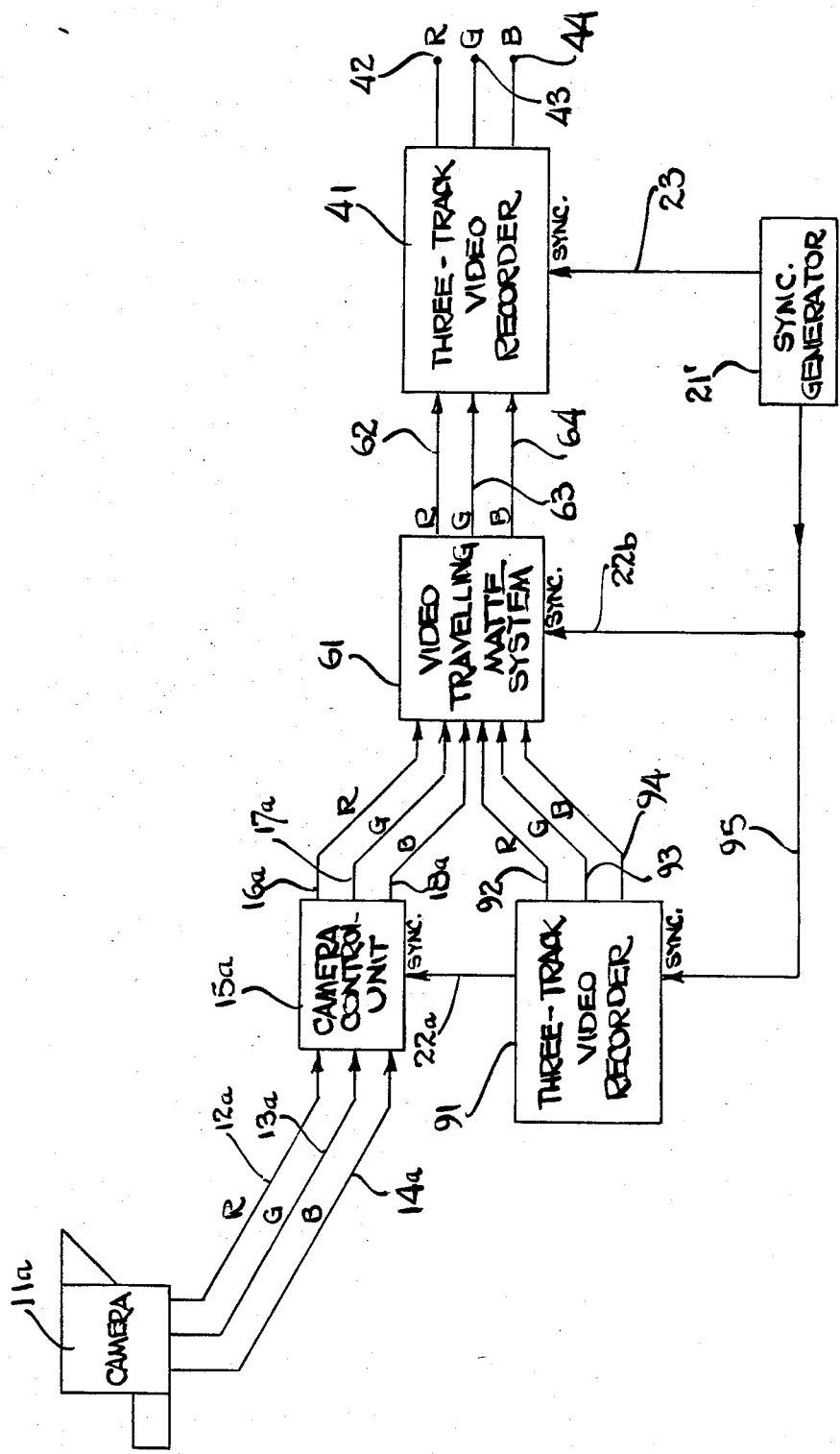
FIG. 8b is a block diagram showing another variation of the FIG. 1b apparatus configuration; in this variation an additional three-track recorder and a traveling-matte system are added to the FIG. 1b configuration.
Figure 9B:
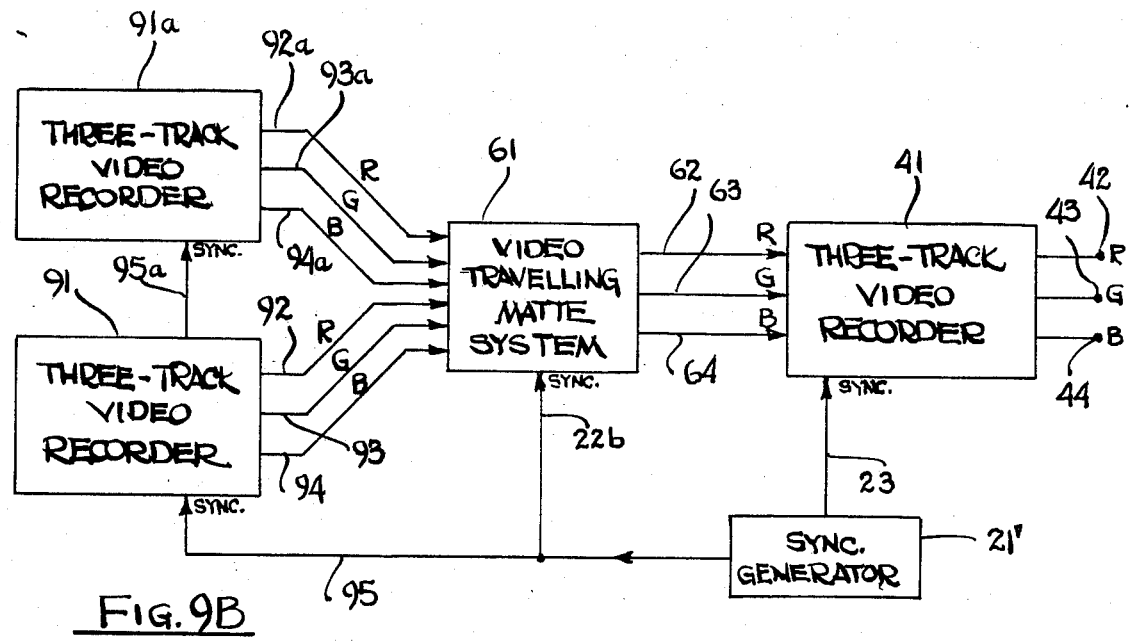
FIG. 9b is a block diagram showing a further variation of the FIG. 8b apparatus configuration; in this variation an additional three-track recorder is substituted for the camera that appears in the FIG. 8b configuration.

Another system for effecting the same information transfer is shown in FIG. 10a, which requires use of four single-track video recorders rather than only two, but may have practical speed advantages. In this system the three tape recordings 310R, 310G, 310B (FIG. 12a) made on the single-track video recorders 32, 35 and 38 of FIG. 8b are loaded all at once onto three single-track video recorders 231, 234 and 237—which may in fact, if desired, be the same three recorders 32, 35 and 38 of FIG. 8b, or others if more convenient. All three video outputs 232, 235 and 238 are fed to the computer editor 251, along with frame position information 255a, 255b, 255c for all three tapes, respectively. The sync generator 221 provides sync at 236 to the recorders 231, 234 and 237. The editor 251 provides position-control commands 256a, 256b and 256c to the three recorders respectively. As in FIG. 10b, the computer editor also receives position information from the master recorder 257, and feeds sync at 253, position-control commands at 256d, and video at 254 to the master recorder 257.

The process now is still describable in just the same way with respect to FIG. 12a, but the order of events is different. With the equipment configuration of FIG. 10a the three primary-color-information frames for the first three-color image—that is, frame 313 from frame position "1" of tape 310R in FIG. 12a, frame 314 from frame position "1" of tape 310G, and frame 315 from position "1" of tape 310B in FIG. 12a—are all transfered to the monochrome tape 370' in immediate sequence. In other words, red frame 313 from position "1" of tape 310R is transfered to form red frame 373A in position "1" on tape 370'; then green frame 314 from position "1" of tape 310G is transfered to form green frame 374A in position "3" on tape 370'; then blue frame 315 from position "1" of tape 310B is transfered to form blue frame 375A in position "5" on tape 370'.

Only after those three transfers are completed does the editor return to the red-information monochrome tape 310R, transferring a red frame from position "2" of that tape to position "7" of the master monochrome tape, to form frame 373B there; and then transfering a green frame from position "2" of the green-information tape 310G to position "9" of the master monochrome tape, to form frame 374B there; and next transfering a blue frame from position "2" of the blue-information tape 310B to position "11" of the master monochrome tape, to form frame 375B on that tape.

In this system editing may go somewhat faster because, through suitable programming, the editor 251 can always be cueing up the "next" input machine in synchronism with the color-black frames on the master monochrome tape, while the other two machines are completing playback or rewind as appropriate. The systems of FIGS. 10b and 10a may be described as "sequential" and "interleaved," or "serial" and "concurrent" transfer systems, respectively.

Figure 10C:
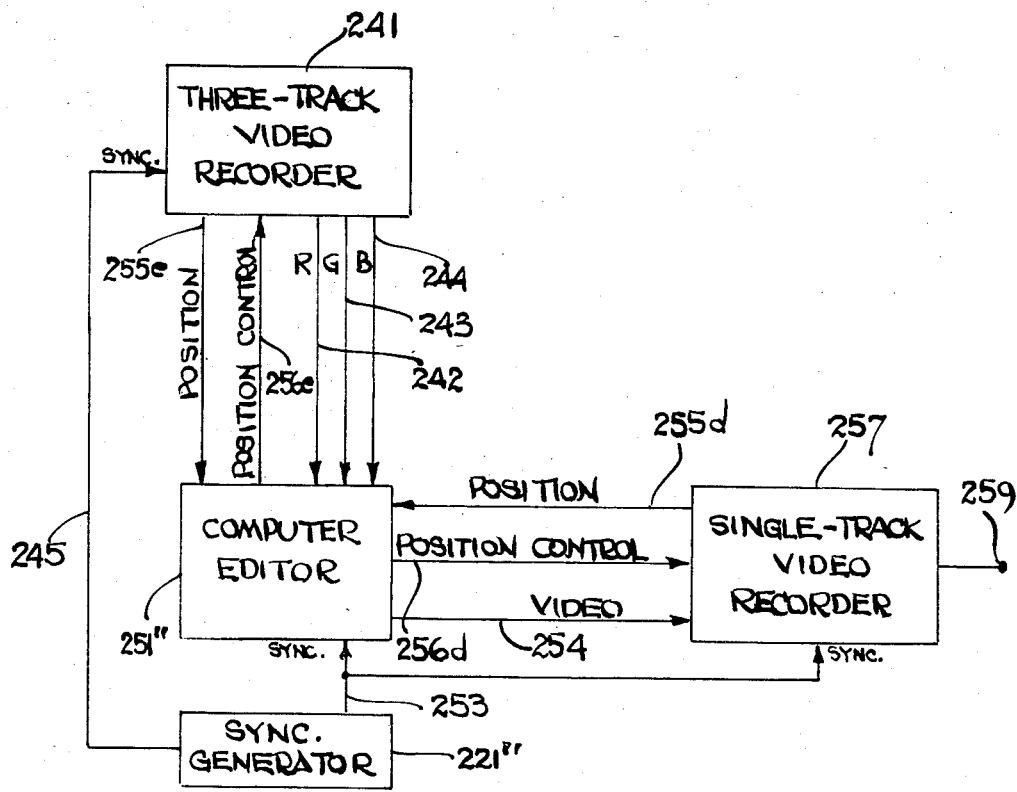
Figure 11:
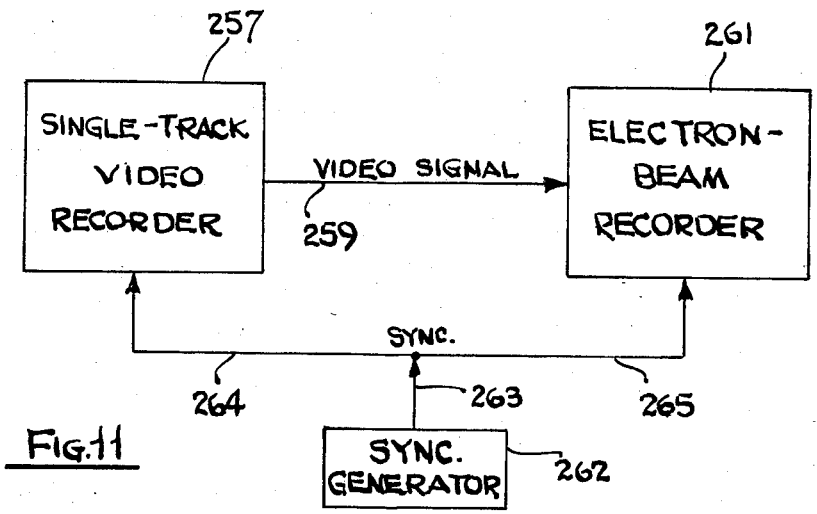
FIG. 11 is a block diagram showing information transfer from a single-sequential-tape conformed recording (such as produced by any of FIGS. 10a through 10c) to a monochrome film.

The system of FIG. 10c returns to the preferred equipment configuration of a single three-track video recorder 241, rather than the relatively cumbersome three-separate-recorder system of FIG. 10a. Operation may be made just the same as that using the equipment in FIG. 10a—the interleaved or concurrent transfer method—if that is preferred.

On the other hand, if preferred the equipment in FIG. 10c can be operated in a serial or sequential mode similar to that of FIG. 10b: the three-track recorder 241 can be controlled to transfer only the red-information frames, along signal lines 242 and 254, to every sixth frame of the master monochrome tape in recorder 257; then to rewind and transfer all the green-information frames, using signal lines 243 and 254; and finally to rewind and transfer all the blue-information frames, using signal lines 244 and 254.

In the actual test that was performed, the monochrome master tape 370 that had been prepared using the equipment assemblage of FIG. 10b was next employed to make a monochrome film intermediary, represented at 380 in FIG. 12a. The master tape was played back in real time, at twenty-four frames per second. The video output of even-numbered frames was black, and every odd-numbered frame carried a video signal which had been recorded from either a red, green or blue information channel. The series of video frames was directed to an electron-beam recorder, of a type known commercially as "EBR 100," and the electron-beam recorder was caused to make a corresponding record on film. The electron-beam recorder had been modified so that the d.c. film-transport motor ran at half speed, pulling down the film twelve instead of twenty-four times per second.

Again, some of the modification details may be of use to those skilled in the art who are familiar with the EBR 100. In that unit, as modified, the film-position pulse generator produced a twelve-hertz pulse train, used to preset a divide-by-ten counter. The d.c. motor was monitored by a tachometer, with nominal pulse rate of 480 hertz; the tachometer output went through the divide-by-ten counter, producing a nominally forty-eight-hertz pulse train to a phase comparator. The latter compared the divided-down pulse train from the motor-tachometer combination to a forty-eight-hertz pulse train from the vertical sync generator.

The film-position pulse generator also fed a variable delay, and enabled a 655-pulse counter. After 655 counts from the horizontal sync generator, the video was blanked out so that no film exposure could occur. All of this allowed one frame of film to be exposed from every other frames of video, with the alternate video frames being used for pull-down of the film to the next frame.

In terms of FIG. 12a, the red-information frames such as 373A and 373B were transfered from every sixth frame of the monochrome video tape to form red-information film frames 383A, 383B, etc. in every third frame of the monochrome film. Similarly the green-information frames such as 374A and 374B were transfered from every sixth frame of the monochrome video tape to form green-information film frames 384A, 384B, etc., in every third frame of the monochrome film starting with position "2"; and the blue-information frames such as 375A and 375B were transfered from every sixth frame (starting with frame "5") of the monochrome video tape to form blue-information film frames such as 385A, 385B, etc., in every third frame of the monochrome film starting with position "3."

All of these tape-to-film transfers were effectuated smoothly, with no need for any special precautions to ensure registration as between the different color-information frames of a particular common image, other than use of the standard pin-registration apparatus built into the electron-beam recorder. This smooth operation and absence of inter-color registration problems in the tape-to-film transfer stage resulted from the precautions taken earlier of prerecording all color-black on the master tape 370 (as shown at the top of FIG. 12a), and using the prerecorded frames in such a way as to avoid cumulative synchronism errors—all as previously described.

The final step in the process was superposing color information from the monochrome film 380 on a piece of color-negative film stock 389. This process was carried out using conventional equipment, not illustrated. The process itself may be seen summarized at the bottom of FIG. 12a: the first three color-primary film frames 383A, 384A, 385A are appropriately combined to form full-color negative film frame 389A; the next three color-primary film frames 383B, 384B, 385B likewise are combined to form full-color negative film frame 389B, and so forth.

In the case of the actual test of my invention prototype the information was transfered from the monochrome film to color negative film by printing the red-information positive image from frame 383A of the monochrome film 380 with red light onto the color-negative film frame "1" to form a latent image in the red-sensitive emulsion in frame 389A; then printing the green positive image from frame 384A of the monochrome film 380, using green light, onto the same film frame "1" of the color-negative film, to form a latent image in the green-sensitive emulsion in frame 389A and next printing the blue positive image from frame 385A of the monochrome film 380, using blue light, onto the same film frame "1" of the color-negative film, to form a latent image in the blue-sensitive emulsion in frame 389A. These three steps produced a full-color latent image in frame 389A.

The next three color-primary film frames 383B through 385B were likewise printed with corresponding colored lights to form a full-color latent image at 389B in color film 389, and so forth. These exposures were performed in an optical printer, with a color-filter wheel that rotates in front of a white light source. The filter wheel is synchronized with the mechanism that advances the monochrome film 380. As previously mentioned, the final monochrome-to-full-color film transfer can be effected through other means, such as a dye-transfer process—although the latter requires a fully operational industrial setup which is believed to be now available only in China.

The test footage produced a projectable color film positive, made conventionally from the color film negative 389 in FIG. 12a, and the image quality of the projectable film positive was quite excellent. The image resolution on the film, however, was not as high as expected; the reason for this shortfall has been traced to the cameras used in the test. Manufacturer specifications indicated that the output resolution of the cameras should exceed 600 lines in the horizontal direction, but subsequent testing of two production-line cameras revealed that the output video essentially cut off at approximately six megahertz, or about 480 lines.

This frequency cutoff has since been explained: the scanning-spot diameter within the camera was too large to resolve better than about 480 lines horizontally. The apparent explanation for the (deliberate) use of such large scanning-spot diameter is that with smaller spot diameters the raster lines become more conspicuously discrete; moreover, this increased conspicuousness interferes with the tendency to visually integrate adjacent raster lines, in the conventional interlaced video format, worsening the perceived flicker. Both these problems are nonexistent in the context of my invention, since raster lines are blended in the electron-beam recorder by a "spot wobbler" feature, and flicker is made imperceptible by the two-flash-per-frame feature that is standard in cinema projection, rather than by reliance upon visual integration of interlaced alternate fields.

Recent technical conferences with camera-manufacturer design personnel, and recent calculations, confirm that the camera limit encountered in the described test of my invention may be regarded as spurious, and that the expected results of that test can be obtained and readily exceeded using higher frequencies and using cameras suitably modified by provision of finer spot diameter.

Figure 12B:
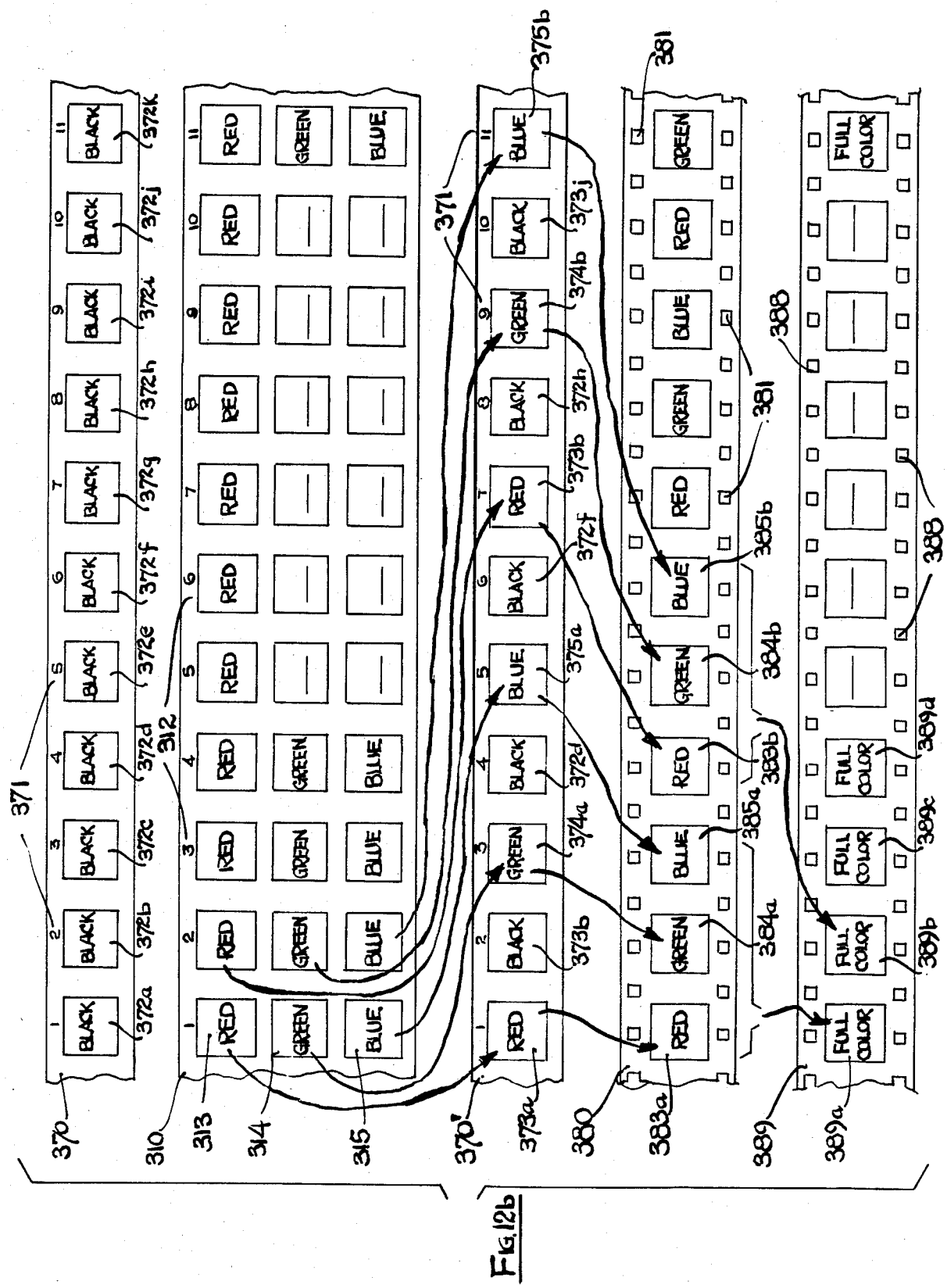
FIG. 12b is a diagrammatic representation of the process of information transfer from a three-track record such as that of FIG. 4 to a conformed monochrome tape, then to monochrome film, and finally to color film—using the apparatus of FIG. 10c, in combination with the FIG. 11 film-transfer apparatus.

The foregoing discussion has dealt with using recordings made with the equipment assemblages of FIGS. 7a, 8a and/or 9a, in conjunction with conforming apparatus as in FIG. 10a or 10b, to produce three-color film—all as shown in FIG. 12a. When the recordings are made with the equipment assemblages of FIGS. 7b, 8b and/or 9b instead, using three-track recording equipment, then a conformed intermediate tape can be prepared using the system of FIG. 10c, as mentioned above. This procedure, carried through to three-color film, is shown in FIG. 12b. The difference between FIGS. 12a and 12b is that the three monochrome tapes 310R, 310G, 310B of FIG. 12a are replaced by the single three-track tape 310 of FIG. 12b. The various records that are essentially the same in FIGS. 12a and 12b are given corresponding reference numerals, and FIG. 12b should accordingly be comprehensible on the basis of the foregoing discussion of FIG. 12a.

Any system for transfering information from a parallel-primary recording such as that of tape 310 in FIG. 12b to a sequential-primary intermediate monochrome film such as 380 in FIG. 12b must involve some arrangement for, in effect, imposing a relative delay upon the primary frames 313, 314, 315 that correspond to each common "live" image. That is, each frame 314 must be delayed relative to its corresponding frame 313, and each frame 315 must be further delayed relative to its corresponding frame 314. The intermediate monochrome video recording 370' of FIG. 12b provides this relative delay, and does so by delaying all three of the primary color signals—by a time interval which may run into several hours or even days, between the process which creates a monochrome video intermediary 370' and the later process which creates a monochrome film intermediary 380. The only truly essential part of this process, in a conceptual sense, is the differential delay which is created as between frames 373A, 374A, 375A, 373B, 374B, 375B, etc., on the monochrome video intermediary 370'.

It is not necessary to incur a long-term delay such as that between the creation of the video intermediary 370' and the creation of the film intermediary 380, to obtain the differential delay required to produce the film intermediary 380. In fact, it is not necessary to delay all three of the color-primary information frames, but only two of them, provided that the two that are delayed are suitably stored for time increments sufficient to allow video-to-film transfer of the one that is not delayed at all.

Figure 13:
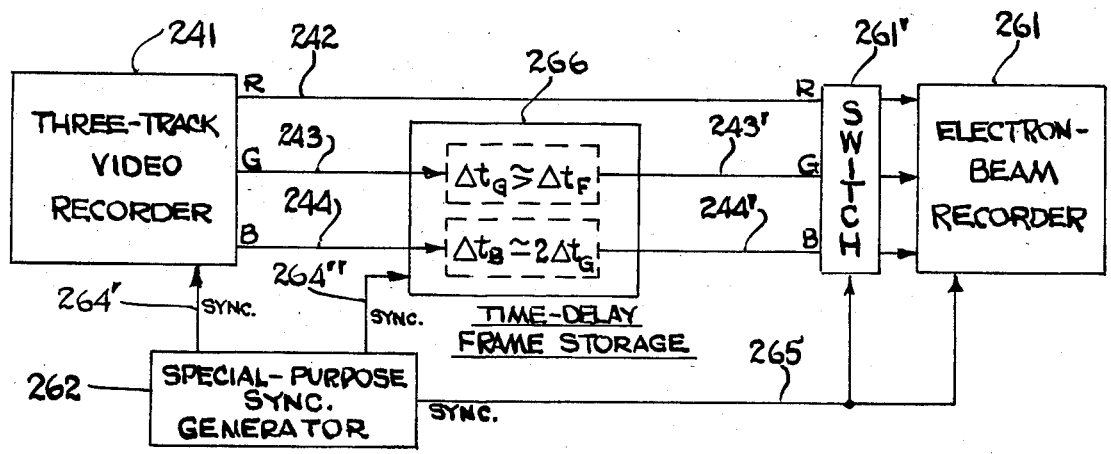
FIG. 13 is a block diagram showing equipment for information transfer from three-track tape to monochrome film without an intermediate conformed monochrome tape, but using instead temporary storage devices to effect relative delay of the three signal channels.
Figure 14:
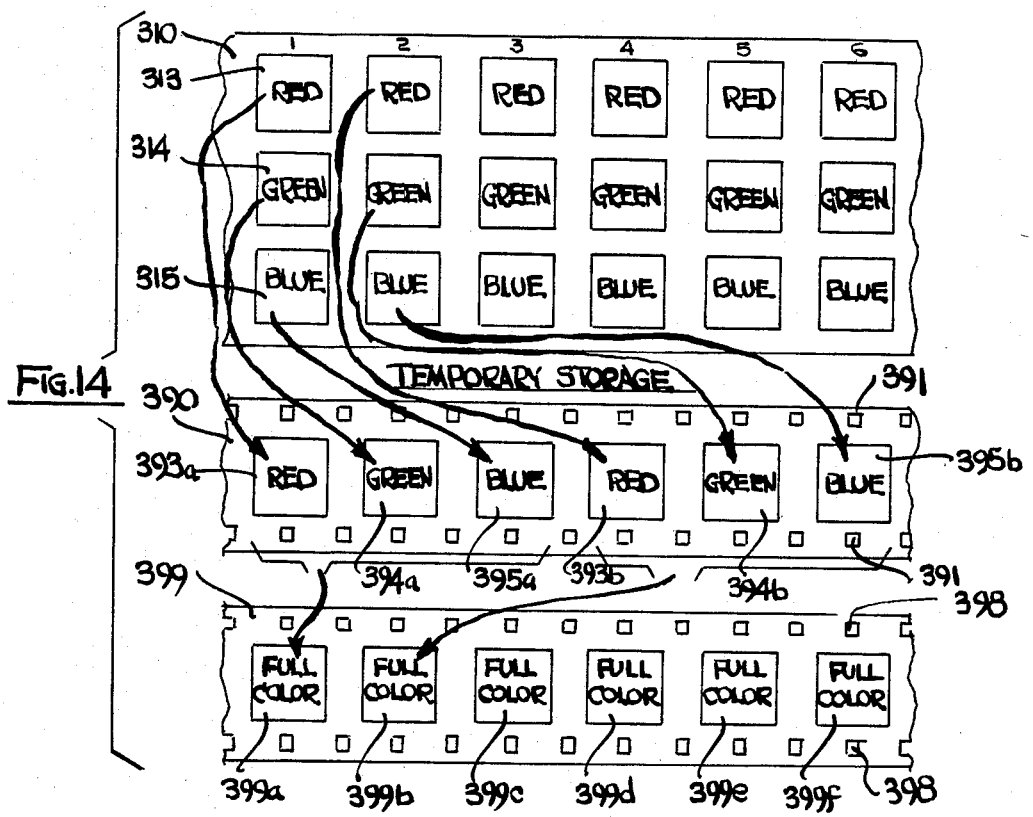
FIG. 14, similar to FIG. 12, is a diagrammatic representation of the process of information transfer from a three-track record such as that of FIG. 4 to a monochrome film, and then to color film—using the apparatus of FIG. 13.

FIGS. 13 and 14 illustrate such a system. The red information from each image frame is passed directly at 242 from the red-information tracks 313 (FIGS. 4 and 14) of the parallel-recorded tape 310 to channel switch 261' and thence to the electron-beam recorder 261. While the red information is being read out to the switch 261', and is being recorded onto film in the electron-beam recorder 261, the other tracks 314 and 315 (FIGS. 4 and 14) are of course unavoidably scanned. The information from the green track, rather than being discarded or disregarded, is directed at 243 to one channel of a differential time-delay frame storage device 266, and the information from the blue track is similarly directed at 244 to the other channel of the time-delay device 266.

Next the delayed green-information signal for the same image frame is released from the time-delay device 266 and applied via 243' and the switch 261' to the electron-beam recorder 261; and the recorder produces a corresponding monochrome film intermediary of that information while the other channel of the time-delay device continues to hold the corresponding blue-information signal. Finally the blue-information signal for the same image frame is released to the electron-beam recorder, and the system then starts the next cycle with direct passage of red information for the succeeding image frame.

To make this system work, the special-purpose sync generator 262 must provide a composite sync signal 264' which provides frame-release pulses only one-third as frequent as those of the standard composite sync. These special-purpose frame pulses provide for "jogging" off one frame at a time, with suitable pauses while the delayed green and blue information frames make their way to the electron-beam recorder 261.

As shown in FIG. 14, the resulting transfer steps are simplified relative to those of FIG. 12. The red, green and blue information records in frame "1" of tape 310 (FIG. 14) are respectively transfered directly to red frame 393A of monochrome film intermediary 390, and transfered through the temporary time-delay storage device to frames 394A (green) and 395A (blue) of the monochrome intermediary. Next the primary records from frame "2" of the parallel-primary tape 310 are read, with the red frame going directly to red-information record 393B, while the green and blue frames go to temporary storage. After the red frame is completely constructed at 393B, the green frame is retrieved from the temporary storage and used to form the green-information frame 394B; next the blue frame is released from the storage and used to form the blue-information frame 395B on monochrome film intermediary 390.

By suitable automated control of the frame storage device 266, the special-purpose sync generator 262, and the video recorder 241 and electron-beam recorder 261, the inter-color registration necessary for reliable color assembly in the final process transfer to color negative 399 can be achieved without using a fixed video intermediary such as the tape 370' in FIG. 12. The film intermediary 390 and color negative 399 should be substantially the same in every regard as the corresponding film intermediary and negative 380 and 389 of FIG. 12, though resulting from a much simpler and more convenient process.

Figure 17:
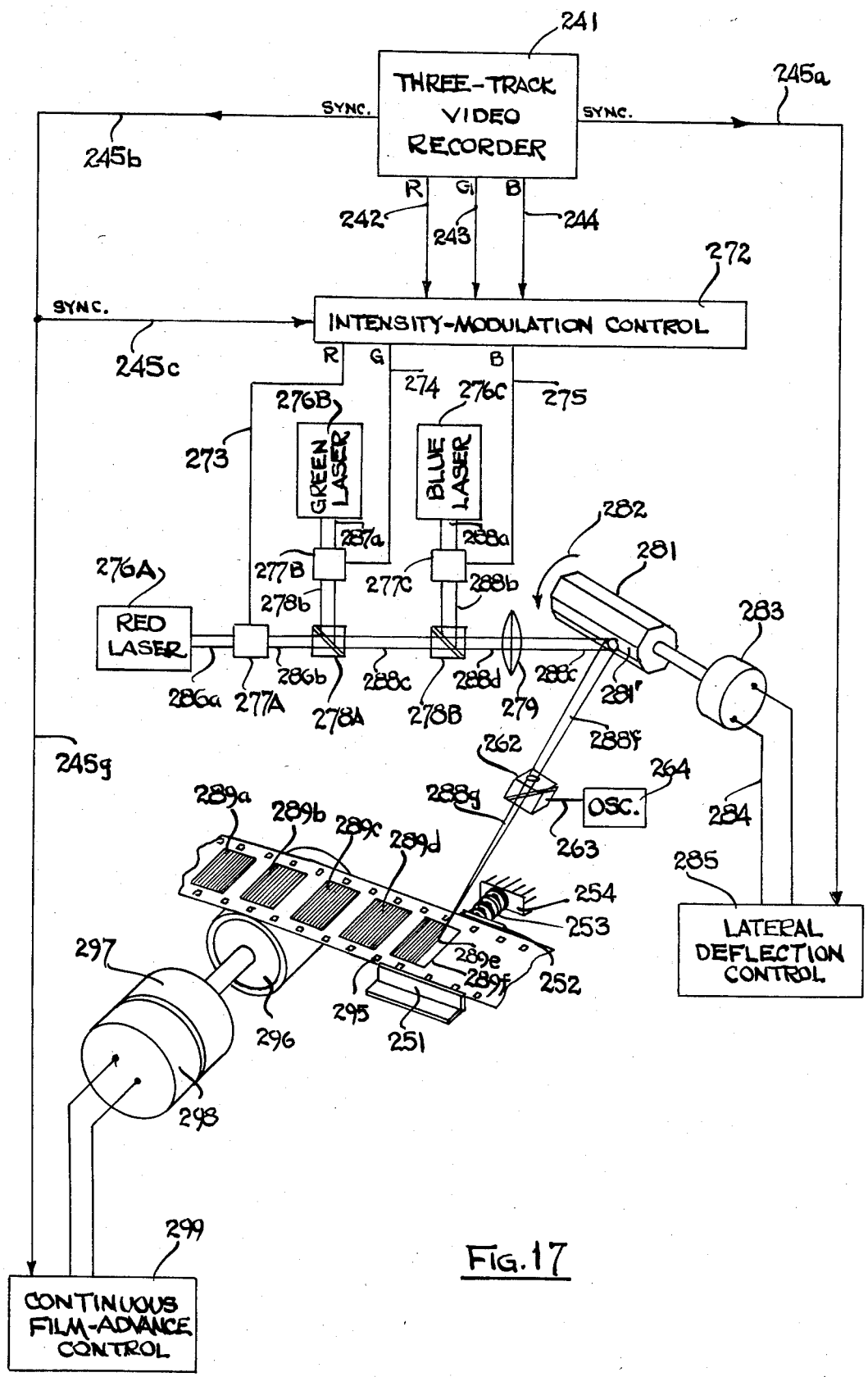
FIG. 17 is a conceptual perspective drawing of a three-light-beam photooptical scanner that may be used in the preferred embodiment of FIG. 15a or 15b, and employing generally continuous (or one-raster-line-at-a-time) film advance in combination with optical scanning only across the width of the film.

My invention contemplates video-to-film information transfer by yet another type of equipment, and corresponding process, which is believed to be even more direct, convenient and reliable. The equipment assemblage is represented in FIGS. 15a and 15b, a necessary novel device forming part of the assemblages is represented in FIG. 17, with a variant in FIG. 18, and the transfer process itself is indicated conceptually in FIG. 16.

Figure 15B:
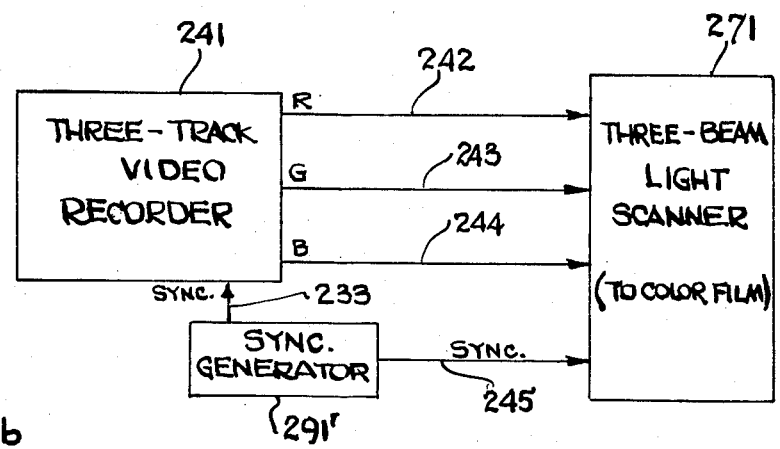
Figure 15A:
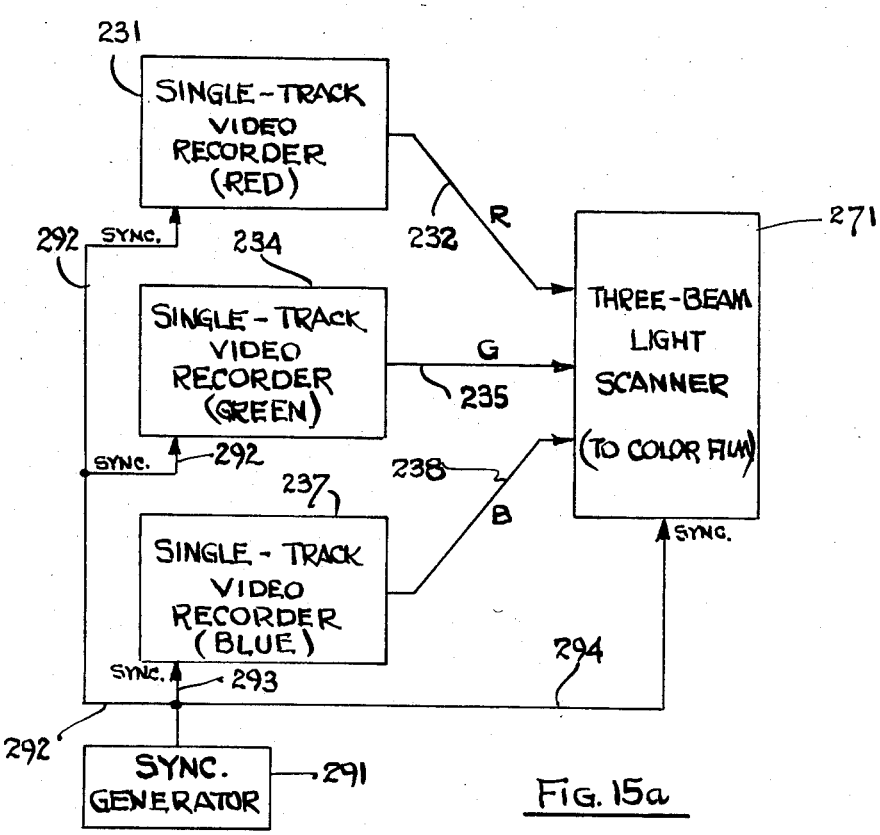
FIG. 15a is a block diagram of equipment used to effect a continuous transfer of information from a three-tape recording of primary color video signals directly to color film, using a three-light-beam optical scanner to expose the film.

As shown in FIG. 15a, the three recorders 231, 234, 237 used in FIG. 10a to create a monochrome video intermediary may be instead connected to direct their independent color primary signals at 232, 235 and 238 respectively to a three-beam light scanner 271, which directly exposes color film. The scanner 271 incorporates three primary-color light beams, advantageously laser beams, which are focused to a fine spot and scanned together over the color negative film under intensity modulation by the video signals 232, 235, 238 respectively. Because of the simultaneous exposure for all three color emulsions, and the common focus and scanning of all three beams together, the simultaneous color signals need not be stored or otherwise delayed, but are simply directed in what might be called "real time" to intensity modulate the scanning light beams.

FIG. 15b represents a similar system in which a single three-track video recorder 241 is substituted for the three single-track recorders 231, 234, 237 of FIG. 15a. The single recorder 241 is of the type described and discussed earlier in conjunction with FIGS. 4, 5, 19 and 20, and is operated in unencoded, noninterlaced, high-frequency fashion as discussed earlier in conjunction with FIGS. 2 and 3. The system of FIG. 15b thus would use the same playback recorder, and the same three-track recording, as would be provided in FIG. 10c to make a monochrome video intermediary, 370' of FIG. 12.

The FIG. 15b system, however, like that of FIG. 15a, would produce a three-color film negative (or positive, depending on the video signal polarity) directly, rather than requiring monochrome video and film intermediaries. FIG. 16 so indicates, by suggesting direct information transfer from frames 313, 314 and 315 of frame "1" of three-track recording 310 to expose respectively the red-, green- and blue-sensitive emulsions in frame 289A of color film 289—and similarly transfering the color information from frame "2" of the three-track video tape to form full-color negative frame 289B.

As in all the tape-to-film systems described herein, position codes symbolized by the frame numbers "1," "2," etc. at 312 in FIG. 16 are used for both identification and synchronism purposes in the video stage, while conventional sprocket holes 295 on the film 289 provide analogous positive positioning of the film for exposure.

Figure 18:
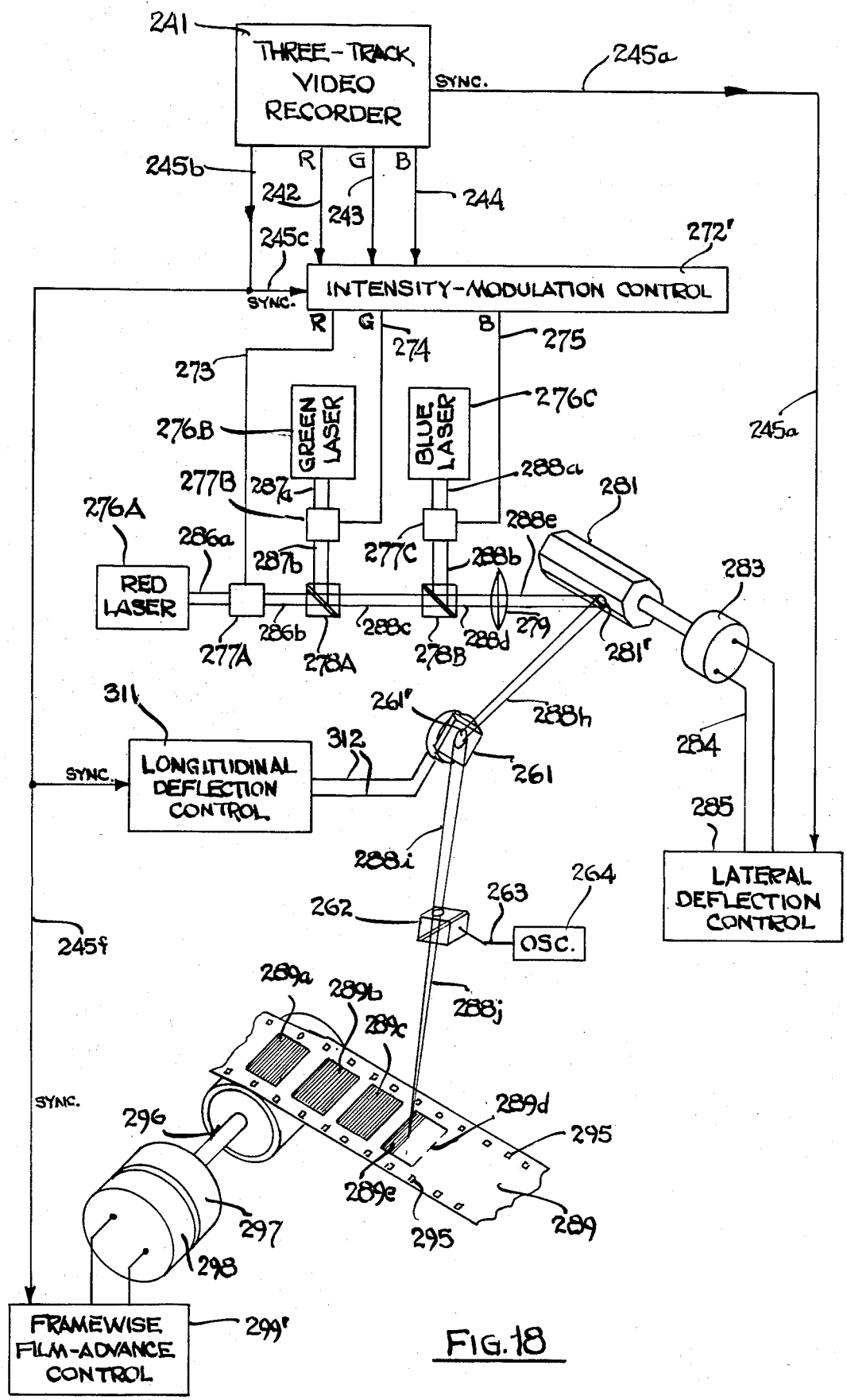
FIG. 18 is a conceptual perspective drawing of a photooptical scanner similar to that of FIG. 17, but employing framewise film advance in combination with vertical (parallel to the film length) as well as horizontal (perpendicular to the film length) scanning.

FIGS. 17 and 18 illustrate the elements of the three-beam light scanner 271 of FIGS. 15a and 15b. Both these devices provide scanning exposure over the entirety of each film frame, under control of the recorded video signals. The two devices differ in the means by which the vertical component of the scanning motion is achieved.

FIG. 17 shows the preferred embodiment, in which vertical scanning is accomplished through continuous advance of the film 289. In this system a continuous film-advance control electronics package 299 controls the speed of a motor 298. The motor 298 drives a gearbox 297, whose output shaft is coupled to a sprocketed drive drum 296. The sprockets on the drum 296 in turn engage the sprocket holes 295 along both sides of the film 289 and thereby propel the film.

One edge of the film slides along a reference edge or surface 251, and is held in contact with that surface 251 by a pressure plate 252. As indicated symbolically in FIG. 17. the pressure plate 252 is forced against the far edge (relative to the reference surface 251) of the film by spring-loading—that is, by a spring 253, which is suitably anchored as at 254. Synchronization signals 245b, 245g from a three-track video recorder 241, which operates in playback mode, maintain the film-advance speed at a value which just corresponds to the vertical scan rate of the video signals being played back. For example, if the video frame format is 655/24 the film must advance by the height of one frame in slightly less than one twenty-fourth of a second.

The principal problem to be solved in design of this system is that of moving the film by precisely the necessary interframe distance during the interval between video frames. Unfortunately the interframe distance on the film is a relatively large fraction of the frame height, whereas the conventional interval between video frames is only a relatively small fraction of the total video frame interval; in fact, it is generally the same interval as the vertical interval between the individual raster lines within a single frame.

There would appear to be at least five approaches to this problem: (1) advancing the film at a different rate during the video interframe interval; (2) advancing the video tape record at a different rate during the video interframe interval; (3) designing the original video frame format—that is, the raster-line timing pattern, as used in cameras, recorders, and special-effects processing, as well as in the apparatus of FIG. 17, so that in the final film-scanning step both the video-playback speed and the film-advance speed can remain constant during the time between frames; (4) inserting in the video signal path, in the FIG. 17 apparatus, short-duration signal-storage devices that adapt the essentially continuous raster-line presentation rate to the necessity of interframe pauses in the film exposure; and (5) using the video signals to make a film intermediate in which the frames are not spaced apart at the standard cinema pitch, but are simply allowed to follow the video interframe interval—and then controlling the frame spacing on distribution prints made from the film intermediate.

The first two suggested solutions seem unacceptable in that they present very substantial mechanical difficulties: the film-advance or video-playback mechanism, respectively, must be endowed with enormous acceleration and deceleration capability to make these solutions tractable. The third solution suggested above is mechanically and electronically simplest, but imposes the undesirable effect of discarding valuable time in which image information can be collected at the camera. It may very well be, however, that these solutions are susceptible to satisfactory implementation, and they are within the scope of my invention.

The fourth solution, though adding some electronic elaboration, seems promising. In this approach the average rates of video and film record advance are made identical, but the rate of information presentation to the film is faster during the actual frame-exposure time, to accommodate a zero rate of information presentation to the film during the interframe-film-advance intervals.

This solution need not place added frequency-response demands on the video circuits 272 (FIG. 17), since the tape-to-film transfer may if preferred proceed at some suitable fraction of full speed at the playback recorder 241.

The fifth solution is also promising, its only apparent drawbacks being (1) the necessity of going through at least one film intermediate, and (2) the necessity of either going through one additional film intermediate or of using a relatively slow process for making distribution prints.

More specifically, to obtain maximum production speed, two intermediates would be necessary—a film positive with video-tape spacing, and a film negative made in an optical printer with standard cinema spacing—from which distribution copies can be made quickly by contact printing. For optimum image quality, however, only a single, negative intermediate should be made (from the video tape), and each distribution copy (with standard cinema spacing, of course) produced in the optical printer—which is slower but permits different frame spacing on the copies from that on the original.

In any event, while the film 289 is advanced by the system just discussed, the film is exposed by a three-color light beam 288*f* that is scanned only in the lateral (crosswise to the film) direction. In this system a lateral-deflection control electronics package 285 (synchronized as at 245*a* with the recorder 241) provides precisely timed power signals at 284 to a synchronous motor 283. The motor 283 drives a multifaceted mirror 281, in the direction indicated by the arrow appearing at 282. The mirror 281 is disposed so that each of its facets, during part of its rotation, intercepts a light beam 288*e*, as at point 281' on the particular facet, and reflects the beam 288*e* to form the beam 288*f*, previously mentioned, which strikes the film 289. The axis of rotation of the motor 283 and mirror 281 is aligned relative to the long dimension of the film 289 in such a way that the rotation of each mirror facet sweeps the beam 288*f* from left to right (as drawn in FIG. 17) across the film.

This scanning system poses a design problem analogous to that mentioned earlier with respect to the vertical scanning action: (1) it is desirable for the beam 288*f* as formed by each facet of mirror 281 to scan across the image width on the film 289 in just the time available for image-information presentation of a single raster line in the video record; and (2) the interval required for each mirror facet to move out of reflecting position (after directing the beam to the right-hand edge of the film image space) and for the next facet to come into reflecting position (to direct the beam to the left-hand edge of the film image space) must precisely equal the blanking and sync-tip interval on the video record. Unlike the vertical-scan problem, however, it appears that this horizontal-scan problem can be solved through geometrical proportioning and by careful selection of the number of facets on the mirror 281, guided by design calculations. If desired, optical elements can be added to facilitate scanning of the film image width by the deflected beam 288*f* in precisely the appropriate fraction of the transit time of each mirror facet.

Another related problem is in matching the contour of the image field (i.e., the departure from planar character of the surface in which the image lies), as video recorded, to the plane of the film 289. Generally video camera-tube image elements and video display screens are somewhat curved—and with at least roughly the same curvature, to minimize change of focus and image distortion that would otherwise arise from attempting to "map" an image field that is curved to a particular degree (or is planar) into a reconstructed image field that does not have the same three-dimensional characteristic.

The image-distortion complication just discussed can be addressed by a variety of different means, including addition of optical elements to make the image match the film, curving the film laterally as it passes through the exposure area, and provision of very-short-interval information-storage devices to tailor the rate of information presentation from the video record in such a way as to accommodate the optical geometry of the lateral scanning system. While all three of these approaches may have useful application, I prefer to emphasize the third. Some relatively simple geometric design and optical elements may help to minimize the time mismatch, but the electronic approach is particularly useful for two reasons.

First, the cost of mechanical elements and their proper alignment continues to rise, while the cost of electronics continues to fall. Second, short-term storage, timing and retrieval systems will probably be necessary—as discussed above in connection with the film-advance system—to match the vertical video frame presentation to the vertical film frame acceptance capability, and the electronics required to tailor the horizontal presentation can probably be integrated with the analogous vertical-control electronics with resulting economies. On the other hand, some relatively simple geometric and optical "preflattening" may be desirable, to avoid excessive frequency-response requirements or excessively low operating speeds.

While the film 289 is advanced by film-advance control electronics 299, motor 298, gear box 297, and toothed drum 296, and while the light beam 288*f* is scanned laterally across the film by lateral deflection control electronics 285, motor 283 and mirrors 281, the information content of the beam 288*f* is controlled by the video information on the three-track tape being played back in video recorder 241. The red, green and blue information signals 242, 243 and 244, respectively, from the recorder are directed to an intensity-modulation control electronics package 272, which in turn provides respective signals at 273, 274 and 275 to electronically controlled optical attenuators 277A, 277B and 277C.

The latter three devices are positioned to intercept the light beams 286*a*, 287*a* and 288*a*, respectively, from red, green and blue lasers 276A, 276B and 276C. The laser beams are of constant intensity, and of colors selected to excite the three primary-color emulsions of the color film 289, respectively.

The attenuated beams 286*b* and 287*b*, respectively varying in accordance with the red and green signal channels on the video record being played back, are combined in a beam combiner 278A to form a composite beam 288*c*. The attenuated beam 288*b*, varying in accordance with the blue signal channel on the video record being played back, is combined in another beam combiner 278B with the composite beam 288*c*, to form an overall composite beam 288*d*—which carries all of the optical information appropriate to the spot on the film selected by the film-advance and lateral-deflection systems.

The overall composite beam 288*d* is focused by a lens 279, with reflection at point 281' on the mirror 281, to a fine spot in the film plane. For optimum image quality on the finished film, a very small, very fast, vertical deflection should be superimposed on the position of the focused spot. I envision accomplishing this by means of some electrooptical device 262, perhaps a form of dichroic element, excited by a high-frequency signal 263 from a free-running oscillator 264. This "spot wobbler" blends the images produced on the film by adjacent raster lines.

It is convenient to make the "spot wobbler" frequency of the oscillator 264 uncorrelated with the raster-line repetition rate provided by the interaction of the vertical and horizontal scanning systems already described. Such desynchronization, however, is not a necessity, and the spot-wobbler control signal 263 may if preferred be derived from one of the sync signals 245a through 245g—provided only that the high-frequency "wobbler" signal goes through a large number of cycles during the transit time required to form one raster line.

Ideal image blending depends somewhat upon the ratios of the focal spot diameter of the beam 288g in the film plane to the image width, and to the distance between adjacent raster lines. As a general matter, however, I prefer to provide at least several hundred, and preferably over 1000, spot-wobbler cycles in each raster line.

The combined effect of vertical (or longitudinal) film motion, lateral beam deflection, vertical spot wobble, and independent intensity modulation of the three light beams of different colors produces a sequence of images 289a, 289b, 289c, 289d on the film 289. In FIG. 17 the system operation is illustrated in the process of forming yet another image, in an image space 289f, with the upper fraction 289e of the image already exposed and the lower fraction of the image not yet reached.

It will be understood that all of the results achieved by the FIG. 17 system may be obtained using light sources of respective primary colors that are not lasers—e.g., ordinary "white"-light beams provided with suitable color filters, collimators and so forth. I prefer the embodiment using lasers because lasers are intrinsically capable of producing high-intensity highly collimated beams, thus readily focused to fine spots of controllable but very small diameter at the film plane. In addition, laser research continues over a broad range of applications and may produce an amplitude-modulated laser suitable for the purposes of my invention, leading to a possible simplification of the apparatus.

It is also to be understood that the three beams 286b, 287b, 288b may be independently reflected onto, deflected across, and "spot-wobbled" with respect to, the film, rather than being first combined to form a common beam.

The system of FIG. 18 is in many respects the same as that of FIG. 17—correspondingly numbered elements being substantially identical—but differs in the system used to achieve the effect of vertical scanning. Here the film-advance control electronics 299' provide step-advance signals to the motor 298, which advances the film swiftly a full frame at a time, stopping to allow the tracing out of each image, rather than advancing the film continuously. In place of the reference edge and pressure plate of FIG. 17, the framewise advance system of FIG. 18 requires use of a pin-registration system (not shown) similar to that used in projectors, conventional electron-beam recorders, and film-to-film optical printers.

While the framewise film-advance control 299' holds the film 289 still, the lateral-deflection, spot-wobbler and intensity-modulation systems of FIG. 18 function essentially as in the device of FIG. 17—but of course they alone would only expose a single raster-line position on the film, over and over. In this system a longitudinal-deflection control electronics package 311 directs a signal at 312 to a longitudinal-deflection device 261. The latter device may consist of a small mirror mounted to a galvanometer coil. The coil is connected to receive the signals 312. The coil and mirror are mounted for rotation about an axis perpendicular to the film length, so that varying the current in the coil deflects the beam longitudinally with respect to the film.

Comparable devices in the prior art currently have been found inadequate by virtue of excessive mirror vibration following quick "snap-back" scan from bottom-of-image position to top-of-image position. Several ways of overcoming this problem might be pursued. First, improvements in mechanical design may obviate the defect. Second, electronic drive and damping signal waveforms may be developed that interact with the natural resonances of the mechanical structure of the mirror and coil in such a way as to render the vibration insignificant. Third, the demands upon the return of the mirror might be reduced by interaction with a short-interval information storage and retrieval system such as that mentioned earlier with respect to FIG. 17, or by operation at substantially reduced speeds.

Another line of approach to the vertical-deflection function might make use of a continuously rotating mirror system, similar to that used at 281-285 for lateral deflection—or an electrooptical deflector such as that posited for the spot-wobbler unit 262.

It will be apparent that the optical systems of both FIGS. 17 and 18 are intended to be exemplary only, and in particular that the order of the several optical elements may be reversed or otherwise changed without departing from the scope of my invention. In particular, for example, it may be advantageous to place the small-deflection spot-wobbler unit 262 "upstream" along the optical path from the deflectors 281, 261; and it may be advantageous to place the lens 279 "downstream" of all the deflecting elements—all within the scope of my invention.

All of the foregoing discussion is intended merely to illustrate my invention; only the appended claims are intended to define the scope of my invention.

I claim:

1. A method of color video recording in preparation for image transfer to motion picture film, the method comprising the steps of:
    generating a multiplicity of video frames in sequence, each video frame comprising a set of three simultaneous independent video primary color signals, each set containing image information that corresponds to a single visual image in color;
    recording the set of three independent primary color signals for each frame simultaneously on three corresponding independent monochrome storage channels of a video signal triple parallel-readout storage medium;
    after the recording step, transferring the signals from at least two of the three storage channels to sequential-readout video storage means, by editing at least two of each set of three simultaneous signals from the parallel-readout storage medium into a set of corresponding sequential signal frames on the sequential-readout storage means.

2. The method of claim 1 wherein the sequential-readout storage means are a monochrome video tape:
said method also comprising impressing color-black information onto the monochrome tape; and
wherein the transfering step comprises transfering signals from all three of the parallel channels to the monochrome tape, and spacing the three sequential frames apart on the monochrome tape so that they are separated by approximately full frames of color-black information.

3. The method of claim 2, in combination with the later step of:
using the signals edited into sequential signal frames on the monochrome taps to generate a series of corresponding sequential images on monochrome film by electron-beam recording, pulling down the film during playback of the color-black frames on the monochrome tape.

4. The method of claim 1 where in the generating, recording and transfering steps are carried out using substantially 24-frame-per-second video format.

5. The method of any one of claims 1, 2 and 4 wherein:
the generating, recording and transfering steps are carried out using bandwidth exceeding eight megahertz; and
the recording step is carried out using carrier frequency of at least ten megahertz.

6. The method of claim 5 wherein the generating, recording and transfering steps are carried out using at least 655 raster lines per frame.

7. The method of claim 1 wherein the generating step comprises:
producing a set of three simultaneous independent primary color signals for each video frame of a foreground image;
producing a set of three simultaneous independent primary color signals for each video frame of a background image; and
combining the foreground and background sets of signals to form a composite set of three simultaneous independent primary color signals.

8. The method of claim 7 wherein each of the producing steps comprises exposing the photosensitive element of a video camera to a foreground or background scene, respectively.

9. The method of claim 8, using sequential-readout storage means in the form of a monochrome video tape:
said method also comprising impressing color-black information onto the monochrome tape; and
wherein the transfering step comprises transfering signals from all three of the parallel channels to the monochrome tape, and spacing the sequential frames apart on the monochrome tape so that they are separated by approximately full frames of color-black information; and
wherein the generating, recording and transfering steps are carried out using substantially 24-frame-per-second video format, bandwidth exceeding eight megahertz, and at least 655 raster lines per frame, without interlacing and without color encoding or subcarrier; and the recording step is carried out using a carrier frequency of at least ten megahertz.

10. The method of claim 9, in combination with the later step of:
using the signals edited into sequential signal frames on the monochrome tape to generate a series of corresponding sequential images on monochrome film by electron-beam recording, pulling down the film during playback of the color-black frames of the monochrome tape.

11. The method of claim 1, in combination with the later step of:
using the signals edited into sequential signal frames on the sequential-readout storage means to generate a series of corresponding sequential images on monochrome film by electron-beam recording.

12. The method of claim 11 wherein:
signals originating from all of the three storage channels are employed to generate corresponding sequential images on monochrome film, the signals from the third of the three storage channels being either:
taken from that channel substantially without intermediate storage, for employment in electron-beam recording; or
transfered to the sequential-readout storage means in the aforesaid transfering step of claim 1, and then used to generate film images in the aforesaid using step of claim 11;
whereby a mutually corresponding set of three monochrome film frames is produced from each video frame, each monochrome film frame carrying primary color information.

13. The method combination of claim 12, in combination with the later step of superposing the color information from each set of three corresponding monochrome film frames to construct a color film positive for projection.

14. The method combination of claim 13 wherein the superposition is by the dye-transfer process.

15. The method combination of claim 13 wherein the superposition is by exposing each frame of color negative stock to a corresponding set of three corresponding monochrome film frames, using primary color lights for each exposure which correspond substantially to the video color primaries used in the producing steps.

16. The method of claim 1, wherein such sequential-readout storage means are a video disc or an array of digital electronic registers, and wherein:
said method comprises impressing all three of such signals onto such disc or onto such register array.

17. The method of claim 1, wherein such sequential-readout storage means are a video disc or an array of digital electronic registers, and wherein:
the signals from one of such three storage channels are passed from that channel, substantially without intermediate storage, to a device for exposing monochrome film in accordance with video information; and
the signals from the other two of such three storage channels are passed from those two channels to the sequential-readout storage means, for subsequent sequential readout therefrom to the film-exposing means.

18. A video-signal recording produced by the method of any of claims 1, 2, 4, 7 through 9, 16, and 17.

19. A method of color video recording in preparation for image transfer to motion picture film, the method comprising the steps of:
generating a multiplicity of video frames in sequence, each video frame comprising a set of three simultaneous independent video primary color signals, each set containing image information that corresponds to a single visual image in color;

recording the set of three independent primary color signals for each frame simultaneously on three corresponding independent monochrome storage channels of a video signal triple parallel-readout storage medium;

the foregoing steps in combination with the later step of using the three recorded primary color signals to control the intensity of three corresponding light beams directed to photosensitive color motion-picture film, whereby said visual image information is substantially reproduced on the color film.

20. The method of claim 19, wherein the generating step comprises:

producing a set of three simultaneous independent primary color signals for each video frame of a foreground image;

producing a set of three simultaneous independent primary color signals for each video frame of a background image; and combining the foreground and background sets of signals to form a composite set of three simultaneous independent primary color signals.

21. The method of claim 20, wherein each of the producing steps comprises exposing the photosensitive element of a video camera to a foreground or background scene, respectively.

22. The method of claim 19 wherein the signal-using step comprises in effect superposing a small, generally unsynchronized a.c. signal on the vertical control signal for each light beam, to provide the visual effect of smoothing out the visual image on the film.

23. A video-signal storage medium, having impressed thereon three independent primary color video signals, without color encoding and without color subcarrier;

said three signals as impressed being adapted for simultaneous playback.

24. The medium of claim 23 wherein the signals have video frame rate of 24 frames per second.

25. The medium of claim 23 wherein the signals as impressed on the medium have signal bandwidth exceeding eight megahertz and carrier frequency exceeding ten megahertz.

26. The medium of claim 25 wherein the signals have video frame rate of 24 frames per second.

27. The medium of claim 25:

in the form of a single unitary medium with all three said color signals impressed upon it; and wherein the signals are noninterlaced and have video frame rate of 24 frames per second.

28. The medium of claim 27 wherein the signals as impressed on the medium have signal bandwidth exceeding fourteen megahertz and carrier frequency exceeding seventeen megahertz.

29. The medium of claim 23, in the form of three separate monochrome recording media adapted for synchronous operation, each of the three monochrome media having impressed upon it one of said three color signals.

30. The medium of claim 23, in the form of a single unitary medium with all three said color signals impressed upon it.

31. The medium of claim 23 wherein the signals are noninterlaced.

32. The medium of any one of claims 23 through 28, wherein the signals have at least 655 raster lines per frame.

* * * * *